(12) United States Patent
Oba

(10) Patent No.: US 12,330,671 B2
(45) Date of Patent: Jun. 17, 2025

(54) INFORMATION PROCESSING APPARATUS, MOVING APPARATUS, METHOD, AND PROGRAM

(71) Applicant: Sony Semiconductor Solutions Corporation, Kanagawa (JP)

(72) Inventor: Eiji Oba, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 394 days.

(21) Appl. No.: 17/602,258

(22) PCT Filed: Mar. 4, 2020

(86) PCT No.: PCT/JP2020/009156
§ 371 (c)(1),
(2) Date: Oct. 7, 2021

(87) PCT Pub. No.: WO2020/213280
PCT Pub. Date: Oct. 22, 2020

(65) Prior Publication Data
US 2022/0161813 A1    May 26, 2022

(30) Foreign Application Priority Data

Apr. 18, 2019  (JP) ................................. 2019-079644

(51) Int. Cl.
*G01C 22/00*     (2006.01)
*B60W 40/02*     (2006.01)
(Continued)

(52) U.S. Cl.
CPC ............ *B60W 50/14* (2013.01); *B60W 40/02* (2013.01); *B60W 40/08* (2013.01);
(Continued)

(58) Field of Classification Search
CPC ............ B60W 50/14; B60W 60/0015; B60W 60/0053; B60W 40/02; B60W 40/08; B60W 2552/00; B60W 2050/146
See application file for complete search history.

(56) References Cited

U.S. PATENT DOCUMENTS 9,581,460 B1 *  2/2017  McNew ............. G01C 21/3605
10,948,911 B2 *  3/2021  Upmanue ............. B60W 30/10
(Continued)

FOREIGN PATENT DOCUMENTS

CN    1760931 A    4/2006
CN    105564441 A    5/2016
(Continued)

OTHER PUBLICATIONS

International Preliminary Report on Patentability and English translation thereof mailed Oct. 28, 2021 in connection with International Application No. PCT/JP2020/009156.
(Continued)

*Primary Examiner* — Adam M Alharbi
(74) *Attorney, Agent, or Firm* — Wolf, Greenfield & Sacks, P.C.

(57) ABSTRACT

A configuration that generates driving zone display data that allows identification of at least an automated driving allowed zone and a manual driving zone on a driving route of a vehicle and that presents the driving zone display data to a user (driver) is provided. A data processing section that generates driving zone display data that allows identification of at least an automated driving allowed zone and a manual driving zone on a driving route of a vehicle is included. The data processing section generates time linear display data representing time (t) and a display position (h) in a proportional relation for a proximate zone and a remote zone. The data processing section generates display data in which a distance per unit display length of the remote zone is made
(Continued)

longer than a distance per unit display length of the proximate zone. Regarding an intermediate-distance zone between the proximate zone and the remote zone, the data processing section generates display data having a time axis that changes gradually at a predetermined rate from the first time axis corresponding to the proximate zone to a second time axis corresponding to the remote zone.

16 Claims, 44 Drawing Sheets

(51) Int. Cl.
    *B60W 40/08* (2012.01)
    *B60W 50/14* (2020.01)
    *B60W 60/00* (2020.01)

(52) U.S. Cl.
    CPC .... *B60W 60/0015* (2020.02); *B60W 60/0053* (2020.02); *B60W 2050/146* (2013.01); *B60W 2552/00* (2020.02)

(56) References Cited

U.S. PATENT DOCUMENTS

| | | | |
|---|---|---|---|
| 11,077,753 B2 * | 8/2021 | Nishizaki | G09G 3/002 |
| 2016/0121907 A1 | 5/2016 | Otake | |
| 2016/0231743 A1 | 8/2016 | Bendewald et al. | |
| 2017/0363437 A1 | 12/2017 | Baracco | |
| 2017/0368936 A1 * | 12/2017 | Kojima | B60W 50/082 |
| 2018/0304750 A1 | 10/2018 | Cieler et al. | |
| 2018/0319281 A1 | 11/2018 | Nishizaki | |
| 2019/0012988 A1 | 1/2019 | Miyahara et al. | |
| 2019/0049547 A1 | 2/2019 | Serebrennikov | |
| 2019/0294163 A1 * | 9/2019 | Ueno | B60W 30/18 |

FOREIGN PATENT DOCUMENTS

| | | |
|---|---|---|
| CN | 108058713 A | 5/2018 |
| CN | 109476322 A | 3/2019 |
| EP | 1288627 A2 | 3/2003 |
| EP | 3260817 A1 | 12/2017 |
| GB | 201710425 | 8/2017 |
| GB | 2563902 A | 1/2019 |
| JP | 2016-090274 A | 5/2016 |
| JP | 2016-139204 A | 8/2016 |
| JP | 2018-538189 A | 12/2018 |
| WO | 2017/134733 A1 | 8/2017 |
| WO | 2018/025414 A1 | 2/2018 |
| WO | 2018/100725 A1 | 6/2018 |

OTHER PUBLICATIONS

Extended European Search Report issued Apr. 26, 2022 in connection with European Application No. 20792159.4.

International Search Report and Written Opinion and English translation thereof mailed May 26, 2020 in connection with International Application No. PCT/JP2020/009156.

* cited by examiner

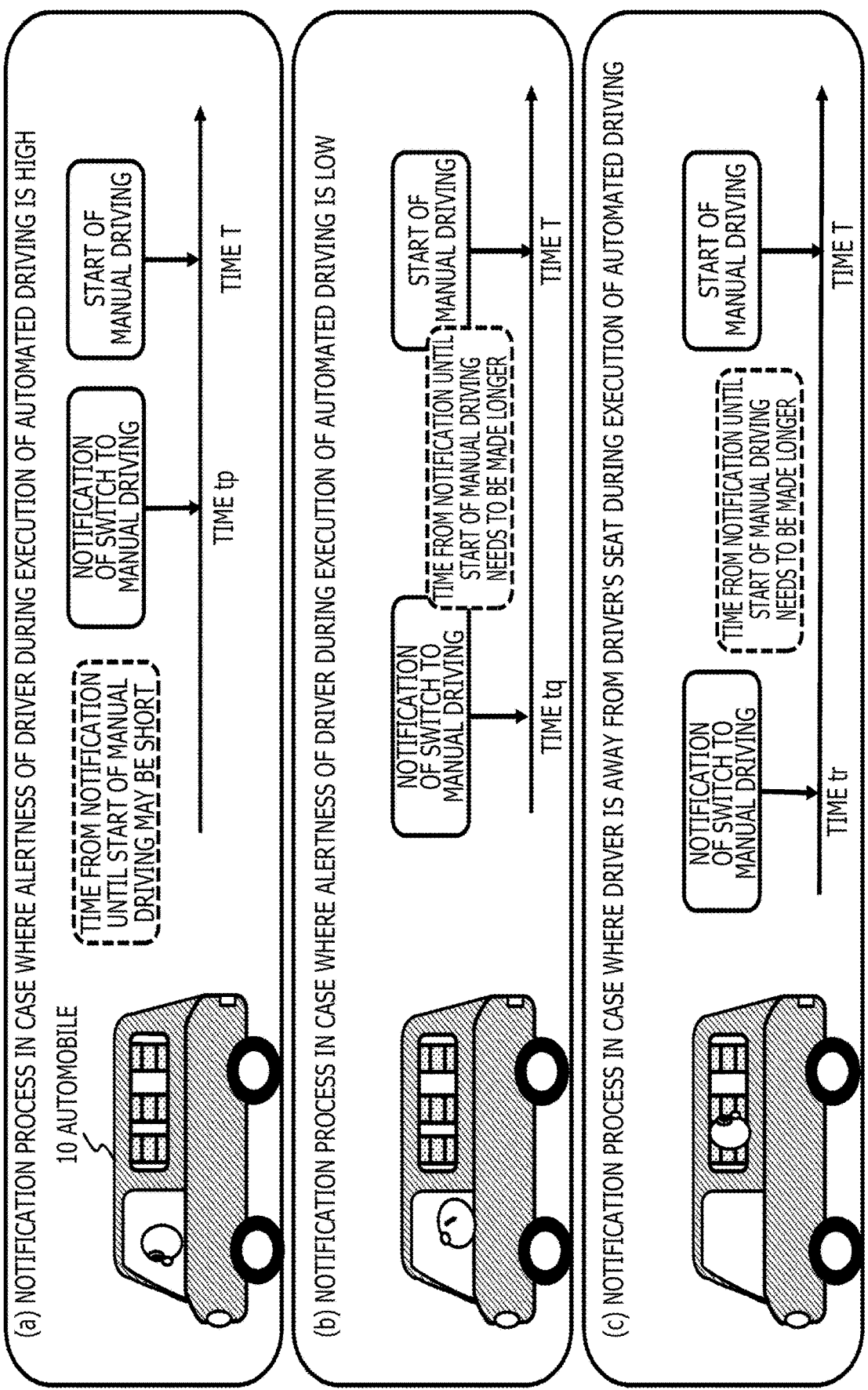

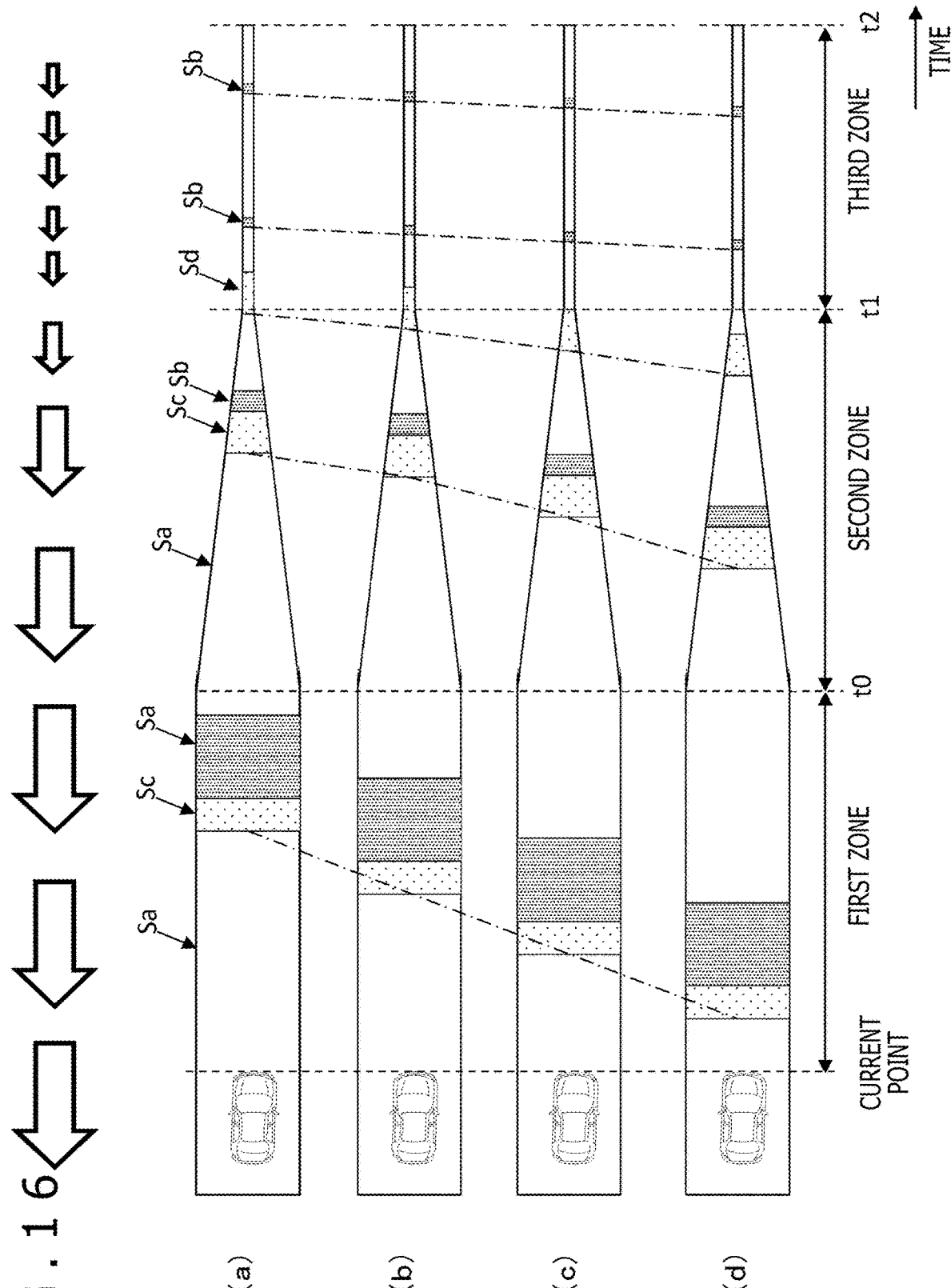
F I G . 16

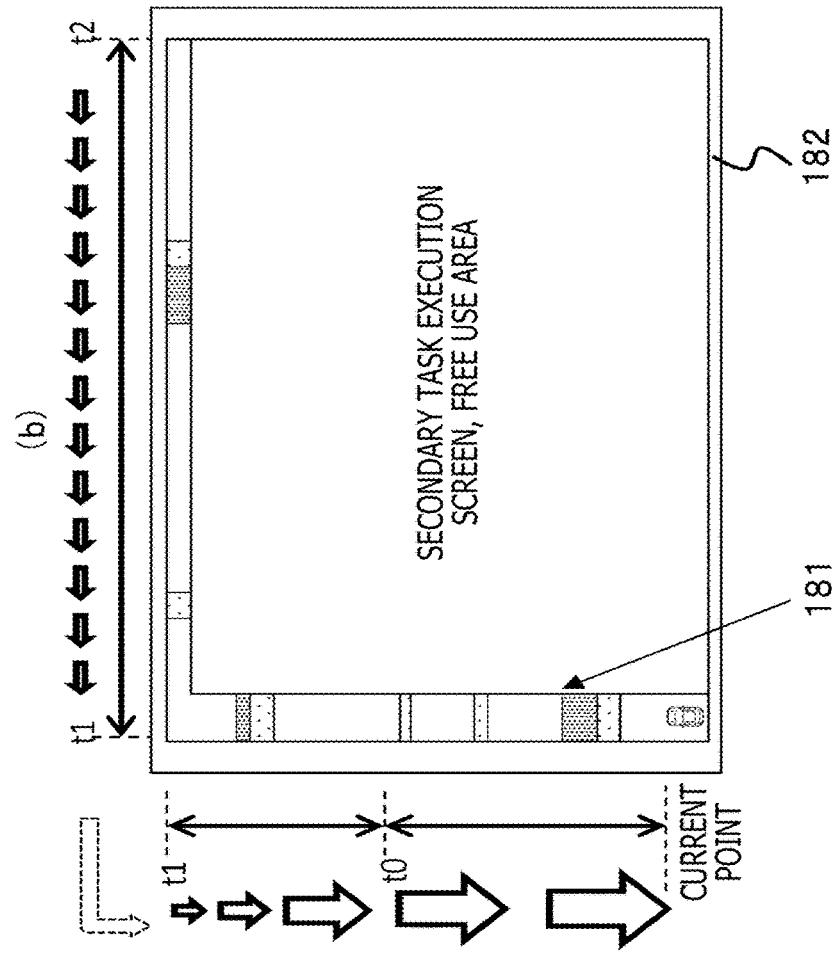
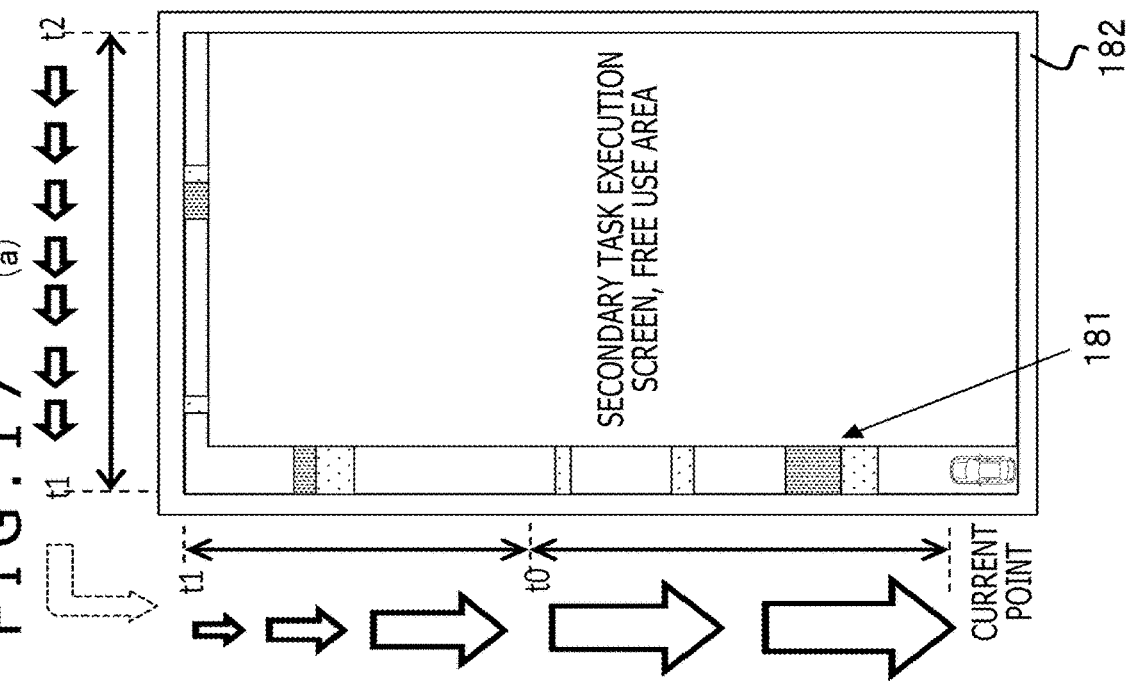

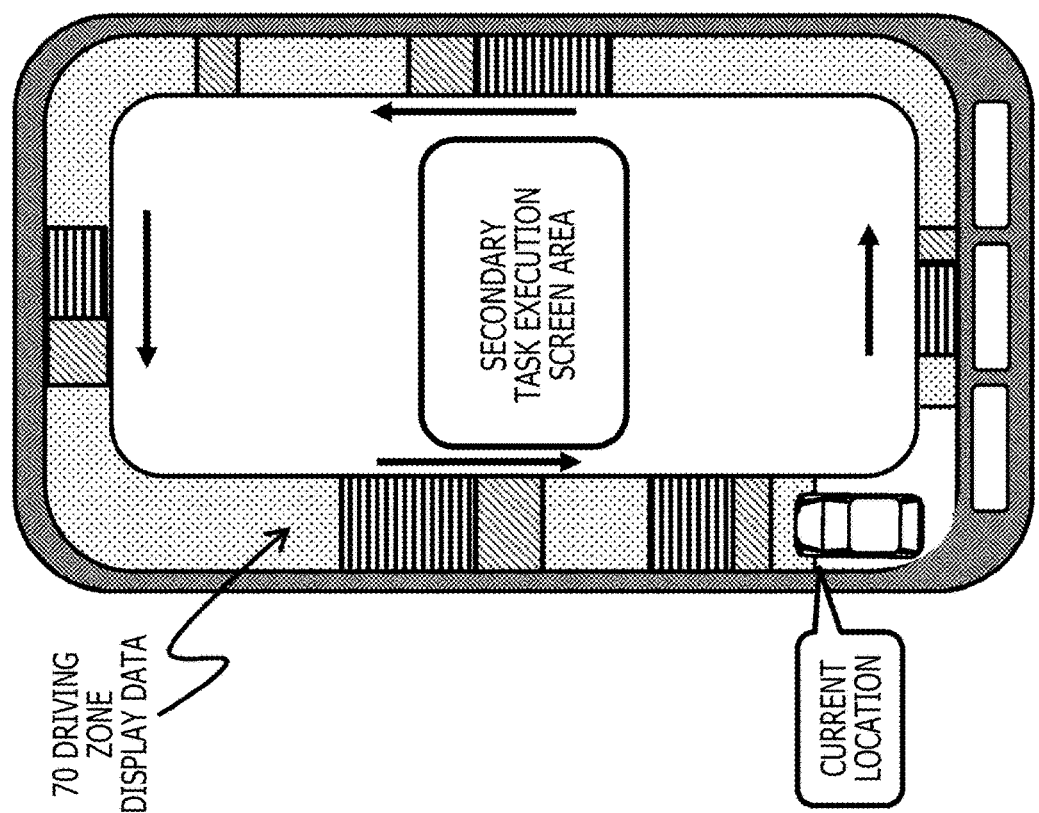
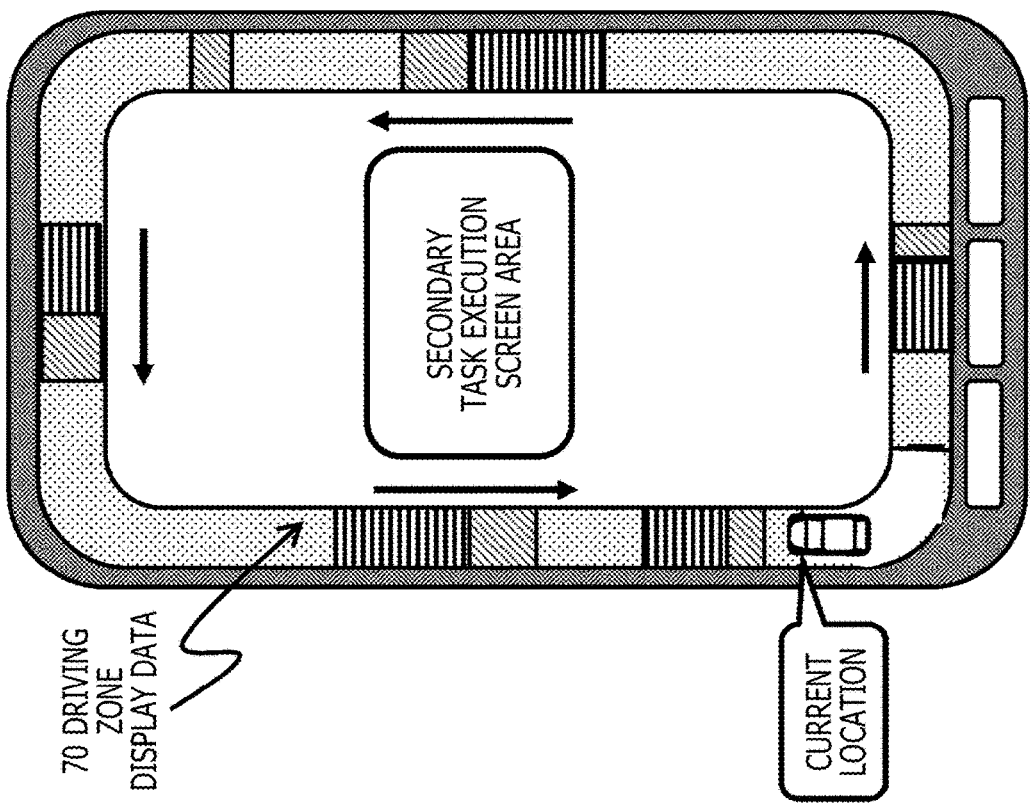
FIG. 39

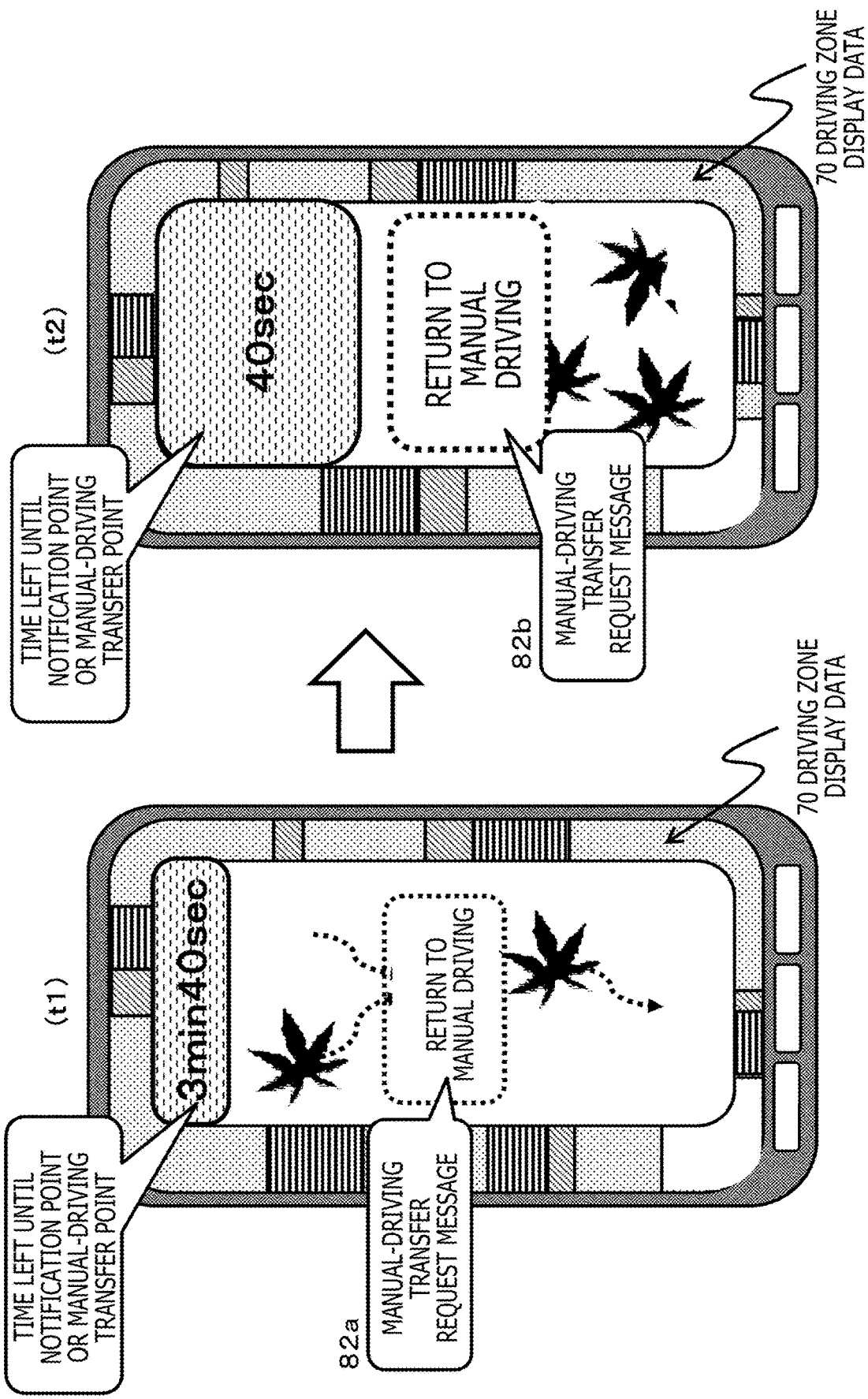

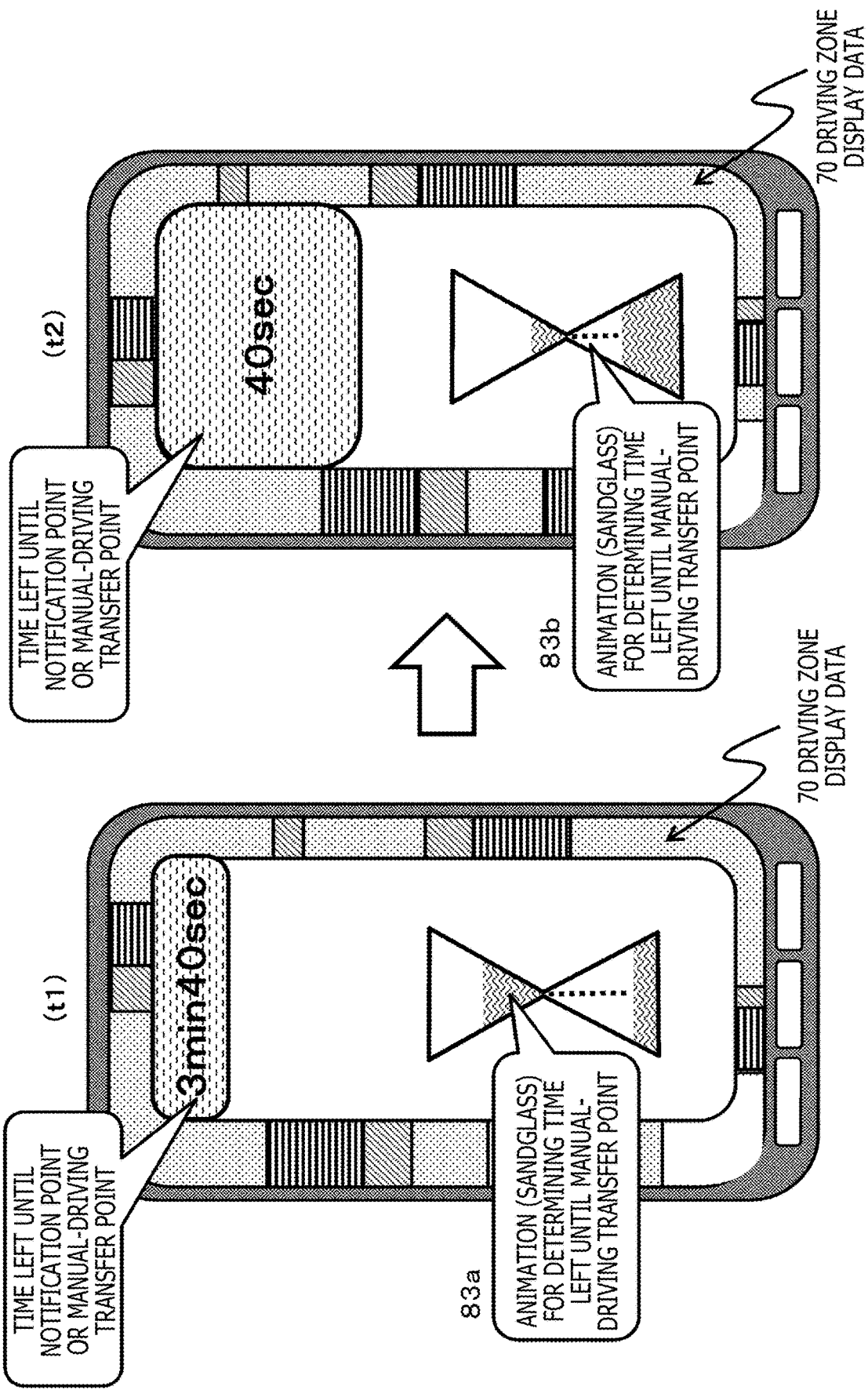

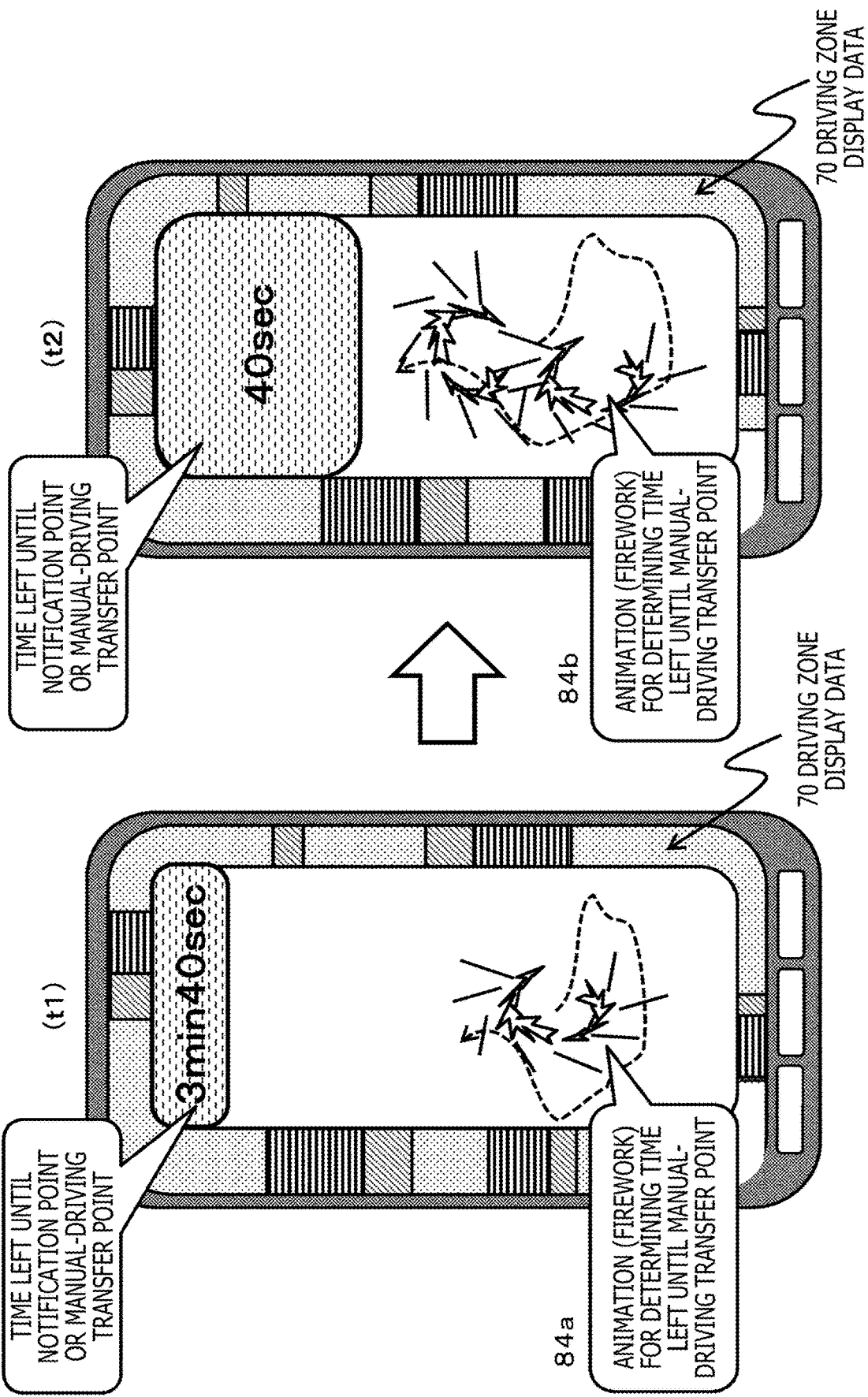

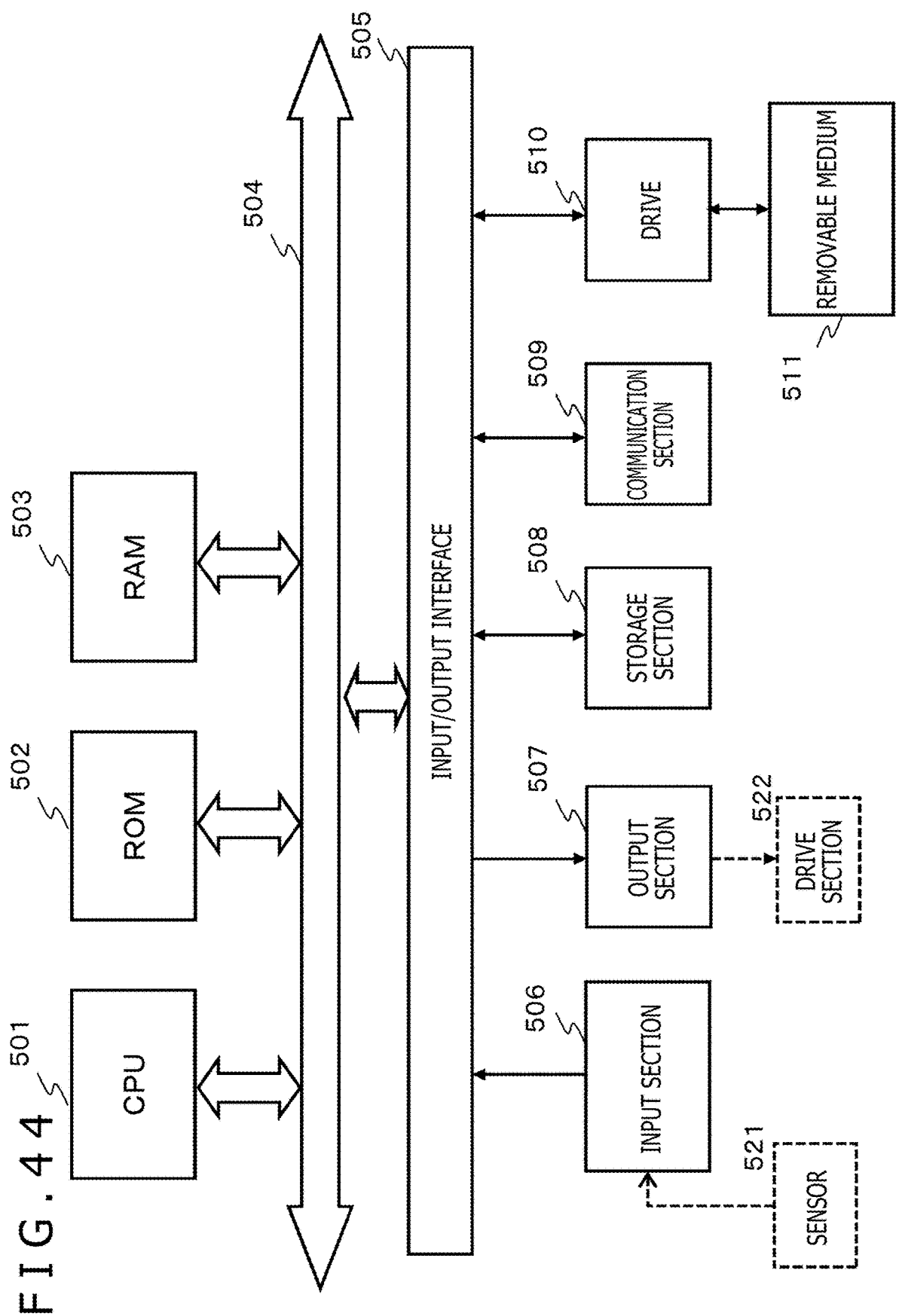
F I G . 4 4

INFORMATION PROCESSING APPARATUS, MOVING APPARATUS, METHOD, AND PROGRAM

CROSS-REFERENCE TO RELATED APPLICATIONS

This application claims the benefit under 35 U.S.C. § 371 as a U.S. National Stage Entry of International Application No. PCT/JP2020/009156, filed in the Japanese Patent Office as a Receiving Office on Mar. 4, 2020, which claims priority to Japanese Patent Application Number JP2019-079644, filed in the Japanese Patent Office on Apr. 18, 2019, each of which is hereby incorporated by reference in its entirety.

TECHNICAL FIELD

The present disclosure relates to an information processing apparatus, a moving apparatus, a method, and a program. More specifically, the present disclosure relates to an information processing apparatus, a moving apparatus, a method, and a program for performing a process of generating various types of display data for a vehicle that performs control to switch between automated driving and manual driving.

BACKGROUND ART

In recent years, active technological development related to automated driving is underway.

Automated driving technologies are technologies that make it possible to automatically drive on roads by using various sensors such as position detection means provided to a vehicle (automobile), and are predicted to rapidly come into widespread use in the coming future.

However, in the current state, as automated driving is in the development phase, it is considered that it takes time until completely automated driving becomes possible, and thus, for the meantime, automobiles are expected to be driven by being switched between automated driving and manual driving by a driver (driver) as appropriate.

For example, it is expected that a mode switch in which, while driving in the automated driving mode is performed on a straight road with a sufficient road width such as a freeway, in a case where an automobile has exited the freeway and is intended to be parked in a parking lot at a desired position, in a case where the car is driving through a mountain path with a narrow road width, or in other similar situations, the driving mode is switched to the manual driving mode, and the car is driven by an operation by the driver (driver) is necessary.

While a vehicle is executing automated driving, the driver (driver) does not have to direct his/her line of sight in the forward direction which is the driving direction of the vehicle, and is allowed to engage in such free actions as taking a nap, watching TV, reading a book, or sitting backward and having a conversation with a person on the rear seat, for example.

In a case where, in a vehicle that is driven in the diving mode which is switched between automated driving and manual driving, it becomes necessary to switch from an automated driving mode to a manual driving mode, it becomes necessary to make the driver (driver) start manual driving.

In order to make a driver (driver) start manual driving, it is necessary to give a notification at a right timing. If the driving mode is switched to a manual driving mode undesirably in a state in which a notification is given incompletely, normal manual driving cannot be started, and there is a possibility that an accident is caused in the worst case.

In order to ensure the safety of driving, it is necessary to make a return-to-manual-driving request to a driver surely at a right timing.

In addition, it is also important to make a driver surely recognize that a manual driving zone is approaching. This is because, in order to start manual driving, a predetermined preparatory process is necessary, and it is necessary to perform the preparation early enough before the start of manual driving. In a case where a length of time until the return to manual driving is insufficient, there is a possibility that an accident occurs, and this is dangerous.

In order to avoid such a danger, for example, it is also possible to automatically perform an emergency stop or deceleration of a vehicle, or driving to move to a pull-over location, but such a process causes a problem such as an occurrence of a traffic jam.

For example, PTL 1 (Japanese Patent Laid-open No. 2016-139204) discloses a technology of displaying the risks of plural dangers regarding driving scheduled roads of a user's vehicle. In addition, for example, PTL 2 (Japanese Patent Laid-open No. 2016-090274) discloses a technology of informing a driver who is concentrating her/his mind on a mobile terminal that she/he is in a situation where manual driving should be started in a case where the driver is to be caused to start manual driving during automated driving, by displaying information to that effect on the screen of the mobile terminal.

CITATION LIST

Patent Literature

[PTL 1]
Japanese Patent Laid-open No. 2016-139204
[PTL 2]
Japanese Patent Laid-open No. 2016-090274

SUMMARY

Technical Problems

There are known technologies as those in PTL 1 and PTL 2 in which notifications of particular information are given. However, the state of a driving route of an automated driving vehicle changes from moment to moment. Specifically, there is a possibility that settings of automated driving allowed zones and manual driving zones, and the like change. For example, it is predicted that a zone setting is changed due to an occurrence of an accident or engineering work. Accordingly, it is important to surely inform a user (driver) of latest information at an earlier phase, but there are no conventional technologies that disclose a configuration that enables such an information provision process.

The present disclosure has been made in view of the problems described above, for example, and an object thereof is to provide an information processing apparatus, a moving apparatus, a method, and a program that make it possible to present various types of information including zone information of automated driving allowed zones and manual driving zones on a driving route to a user (driver) of a vehicle that switches between automated driving and manual driving.

Solution to Problems

A first aspect according to the present disclosure is an information processing apparatus including a data processing section that generates driving zone display data that allows identification of at least an automated driving allowed zone and a manual driving zone on a driving route of a vehicle, in which the data processing section generates one piece of driving zone display data that is generated by linking plural pieces of display data having different time axes according to driving scheduled time periods of the vehicle.

Further, a second aspect according to the present disclosure is a moving apparatus that is capable of being switched between automated driving and manual driving, the moving apparatus including a driver information acquiring section that acquires driver information of a driver of the moving apparatus; an environment information acquiring section that acquires surrounding environment information of the moving apparatus; and a data processing section that generates driving zone display data that allows identification of at least an automated driving allowed zone and a manual driving zone on a driving route of a vehicle, in which the data processing section generates one piece of driving zone display data that is driving zone display data that allows identification of at least an automated driving allowed zone and a manual driving zone on the driving route of the vehicle and that is generated by linking plural pieces of display data having different time axes according to driving scheduled time periods of the vehicle.

Further, a third aspect according to the present disclosure is an information processing method executed in an information processing apparatus, in which a data processing section generates one piece of driving zone display data that is driving zone display data that allows identification of at least an automated driving allowed zone and a manual driving zone on a driving route of a vehicle and that is generated by linking plural pieces of display data having different time axes according to driving scheduled time periods of the vehicle.

Further, a fourth aspect according to the present disclosure is an information processing method executed in a moving apparatus, in which the moving apparatus is capable of being switched between automated driving and manual driving, the information processing method includes a driver-information acquisition step, performed by a driver information acquiring section, of acquiring driver information of a driver of the moving apparatus and an environment information acquisition step, performed by an environment information acquiring section, of acquiring surrounding environment information of the moving apparatus, and a data processing section generates one piece of driving zone display data that is driving zone display data that allows identification of at least an automated driving allowed zone and a manual driving zone on a driving route of a vehicle and that is generated by linking plural pieces of display data having different time axes according to driving scheduled time periods of the vehicle.

Furthermore, a fifth aspect according to the present disclosure is a program that causes information processing to be executed in an information processing apparatus, in which a data processing section is caused to generate one piece of driving zone display data that is driving zone display data that allows identification of at least an automated driving allowed zone and a manual driving zone on a driving route of a vehicle and that is generated by linking plural pieces of display data having different time axes according to driving scheduled time periods of the vehicle.

Note that the program according to the present disclosure is a program that can be provided by a storage medium or a communication medium that provides the program in a computer-readable format to an information processing apparatus or a computer system that can execute various programs and codes, for example. By providing such a program in the computer-readable format, processes according to the program are realized on the information processing apparatus or the computer system.

Still other objects, features, and advantages of the present disclosure will become apparent from more detailed explanations based on embodiments and attached drawings of the present disclosure described below. Note that a system in the present specification has a logical collective configuration of plural apparatuses, and is not limited to one that includes apparatuses of configurations that are housed within a single housing.

The configuration of one embodiment according to the present disclosure realizes a configuration that generates driving zone display data that allows identification of at least an automated driving allowed zone and a manual driving zone on a driving route of a vehicle and that presents the driving zone display data to a user (driver).

Specifically, for example, a data processing section that generates driving zone display data that allows identification of at least an automated driving allowed zone and a manual driving zone on a driving route of a vehicle is included. The data processing section generates time linear display data representing time (t) and a display position (h) in a proportional relation for a proximate zone and a remote zone. The data processing section generates display data in which a distance per unit display length of the remote zone is made longer than a distance per unit display length of the proximate zone. Regarding an intermediate-distance zone between the proximate zone and the remote zone, the data processing section generates display data having a time axis that changes gradually at a predetermined rate from a first time axis corresponding to the proximate zone to a second time axis corresponding to the remote zone.

This configuration realizes a configuration that generates driving zone display data that allows identification of at least an automated driving allowed zone and a manual driving zone on a driving route of a vehicle and that presents the driving zone display data to a user (driver).

Note that advantages described in the present specification are presented merely for illustrative purposes, and not for limiting the advantages. There may be additional advantages.

BRIEF DESCRIPTION OF DRAWINGS

FIG. 4 depicts diagrams for explaining a process executed by the moving apparatus according to the present disclosure.

FIG. 16 depicts diagrams illustrating an example of changes (scroll example) of a driving zone display that are seen along with the passage of time.

FIG. 17 depicts diagrams illustrating examples of a display of driving zones on a driving route displayed on a screen of tablet terminal equipment (hereinafter, simply denoted as a "tablet").

FIG. 39 depicts diagrams for explaining an example of display data on a terminal such as a smartphone.

FIG. 41 depicts diagrams for explaining an example of display data on a terminal such as a smartphone.

FIG. 42 depicts diagrams for explaining an example of display data on a terminal such as a smartphone.

FIG. 43 depicts diagrams for explaining an example of display data on a terminal such as a smartphone.

FIG. 44 is a diagram for explaining a hardware configuration example of an information processing apparatus.

DESCRIPTION OF EMBODIMENT

Figure 1:
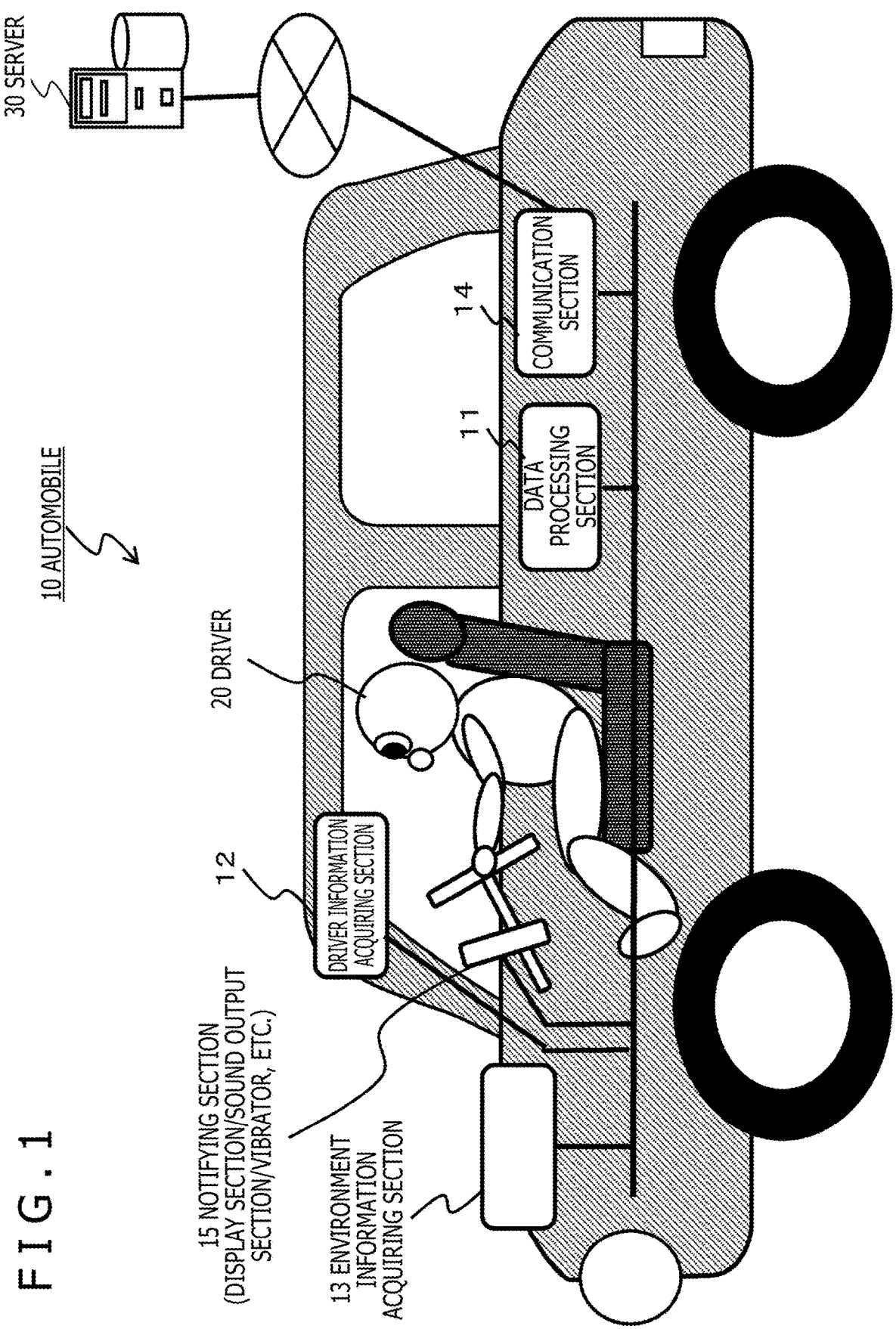
FIG. 1 is a diagram for explaining one configuration example of a moving apparatus according to the present disclosure.

Hereinafter, details of an information processing apparatus, a moving apparatus, a method, and a program according to the present disclosure are explained with reference to the figures. Note that the explanation is given according to the following items.

1. Overview of Configurations and Processes of Moving Apparatus and Information Processing Apparatus
2. Specific Configuration and Process Examples of Moving Apparatus
3. Sequence of Mode Switch from Automated Driving Mode to Manual Driving Mode
4. Operation Sequence Example of Automated Driving
5. Information Provided to User (Driver) and Process of Notification to User
5-1. Detailed Configuration of Driving Zone Display Data, and Process of Updating Driving Zone Display Data
5-2. Display Example of Additional Information for Driving Zone Display Data
5-3. Examples of Processes of Notification and Warning Using Animations
5-4. Other Display Process Examples
6. Configuration Example of Information Processing Apparatus
7. Summary of Configuration of Present Disclosure 1. Overview of Configurations and Processes of Moving Apparatus and Information Processing Apparatus First, with reference to FIG. 1 and the subsequent figures, the overview of the configurations and processes of a moving apparatus and an information processing apparatus is explained.

The moving apparatus according to the present disclosure is, for example, an automobile that can be driven in a driving mode that is switched between automated driving and manual driving.

In a case where, in such an automobile, it becomes necessary to switch from an automated driving mode to a manual driving mode, it becomes necessary to make the driver (driver) start manual driving.

However, there are various processes (secondary tasks) that drivers perform during execution of automated driving.

For example, in some cases, drivers are only taking their hands off steering wheels and are gazing at spaces in front of automobiles as they do when they are driving the automobiles, and, in some other cases, they are reading books or taking naps.

Due to differences between these processes, the alertness (consciousness levels) of drivers varies.

For example, if a driver takes a nap, the alertness of the driver is lowered. That is, the consciousness level gets low. Normal manual driving cannot be performed in such a state where the alertness is lowered, and if the driving mode is switched to the manual driving mode in that state, there is a possibility that the driver causes an accident in the worst case.

In order to ensure the safety of driving, it is necessary to make the driver start manual driving in a state in which the alertness of the driver is high, that is, the driver has a high consciousness.

For this purpose, it is necessary to change a notification timing of making a request to switch from automated driving to manual driving, according to the alertness of the driver during execution of automated driving.

For example, in a case where a driver is looking forward and staring at a road during execution of automated driving, the alertness of the driver is high, that is, the driver can start manual driving at any time.

In such a case, a notification for a switch to manual driving may be given at a timing immediately before the time when manual driving is necessary. This is because the driver can start safe manual driving promptly.

However, in a case where the driver is taking a nap during execution of automated driving, the alertness of the driver is extremely low.

In such a case, if a notification for a switch to manual driving is given at a timing immediately before the time when manual driving is necessary, the driver inevitably has to start manual driving in a state in which the driver has a low consciousness. As a result, the possibility that the driver causes an accident increases. Accordingly, in such a case where the alertness is low, it is necessary to give a notification for a switch to manual driving at an earlier phase.

A moving apparatus according to the present disclosure or an information processing apparatus according to the present disclosure that can be mounted on a moving apparatus controls the timing of a notification for a switch to manual driving, according to the alertness of a driver, for example.

With reference to FIG. 1 and the subsequent figures, the configurations and processes of the moving apparatus according to the present disclosure and the information processing apparatus according to the present disclosure that can be installed on a moving apparatus are explained.

FIG. 1 is a diagram depicting one configuration example of an automobile 10 which is an example of the moving apparatus according to the present disclosure.

The information processing apparatus according to the present disclosure is installed on the automobile 10 depicted in FIG. 1.

The automobile 10 depicted in FIG. 1 is an automobile that can be driven in two driving modes which are a manual driving mode and an automated driving mode.

In the manual driving mode, driving based on an operation by a driver (driver) 20, that is, an operation (steering) of a steering wheel and an operation of an accelerator, a brake, and the like, is performed.

On the other hand, in the automated driving mode, an operation by the driver (driver) 20 is not required, and, for example, driving based on sensor information of position sensors, other surrounding environment information detection sensors, and the like is performed.

The position sensors include a GPS receiver and the like, for example, and the surrounding environment information detection sensors include cameras, ultrasonic sensors, radars, LiDARs (Light Detection and Ranging, Laser Imaging Detection and Ranging), sonars, and the like, for example.

Note that FIG. 1 is a diagram for explaining the overview of the present disclosure, and schematically depicts main constituent elements. Detailed configurations are explained in the following paragraphs.

As depicted in FIG. 1, the automobile 10 has a data processing section 11, a driver information acquiring section 12, an environment information acquiring section 13, a communication section 14, and a notifying section 15.

The driver information acquiring section 12 acquires information for determining alertness of the driver, operation information of the driver, and the like, for example. Specifically, for example, the driver information acquiring section 12 includes a camera that captures images of a face of the driver, operation information acquiring sections that acquires respective pieces of operation information regarding operation sections (the steering wheel, the accelerator, the brake, etc.), and the like.

The environment information acquiring section 13 acquires driving environment information of the automobile 10. For example, the driving environment information includes information of images of spaces in front of, behind, and on the left and right sides of the automobile; positional information from a GPS; information regarding surrounding obstacles from LiDARs (Light Detection and Ranging, Laser Imaging Detection and Ranging), sonars, and the like; and the like.

The data processing section 11 receives, as inputs, the driver information acquired by the driver information acquiring section 12 and the environment information acquired by the environment information acquiring section 13, and computes a safety index value representing whether or not the driver inside the vehicle performing automated driving can execute safe manual driving, and further, whether or not the driver who is performing manual driving is executing safe driving or the like.

Further, in a case where it becomes necessary to switch from an automated driving mode to a manual driving mode, for example, the data processing section 11 executes a process of giving a notification for a switch to a manual driving mode, via the notifying section 15.

The timing of the notification process is an optimum timing computed by receiving inputs from the driver information acquiring section 12 and the environment information acquiring section 13, for example.

That is, it is a timing that allows the driver 20 to start safe manual driving.

Specifically, the process is performed in such a manner that, in a case where the alertness of the driver is high, the notification is given immediately before the time of the start of manual driving, for example, five seconds before the time, and in a case where the alertness of the driver is low, the notification is given 20 seconds before the time of the start of manual driving, leaving extra time, or in other similar manners. Specific computations of timings optimum for notifications are described later.

The notifying section 15 includes a display section, a sound output section or a vibrator on the steering wheel or a seat that gives the notification.

Figure 2:
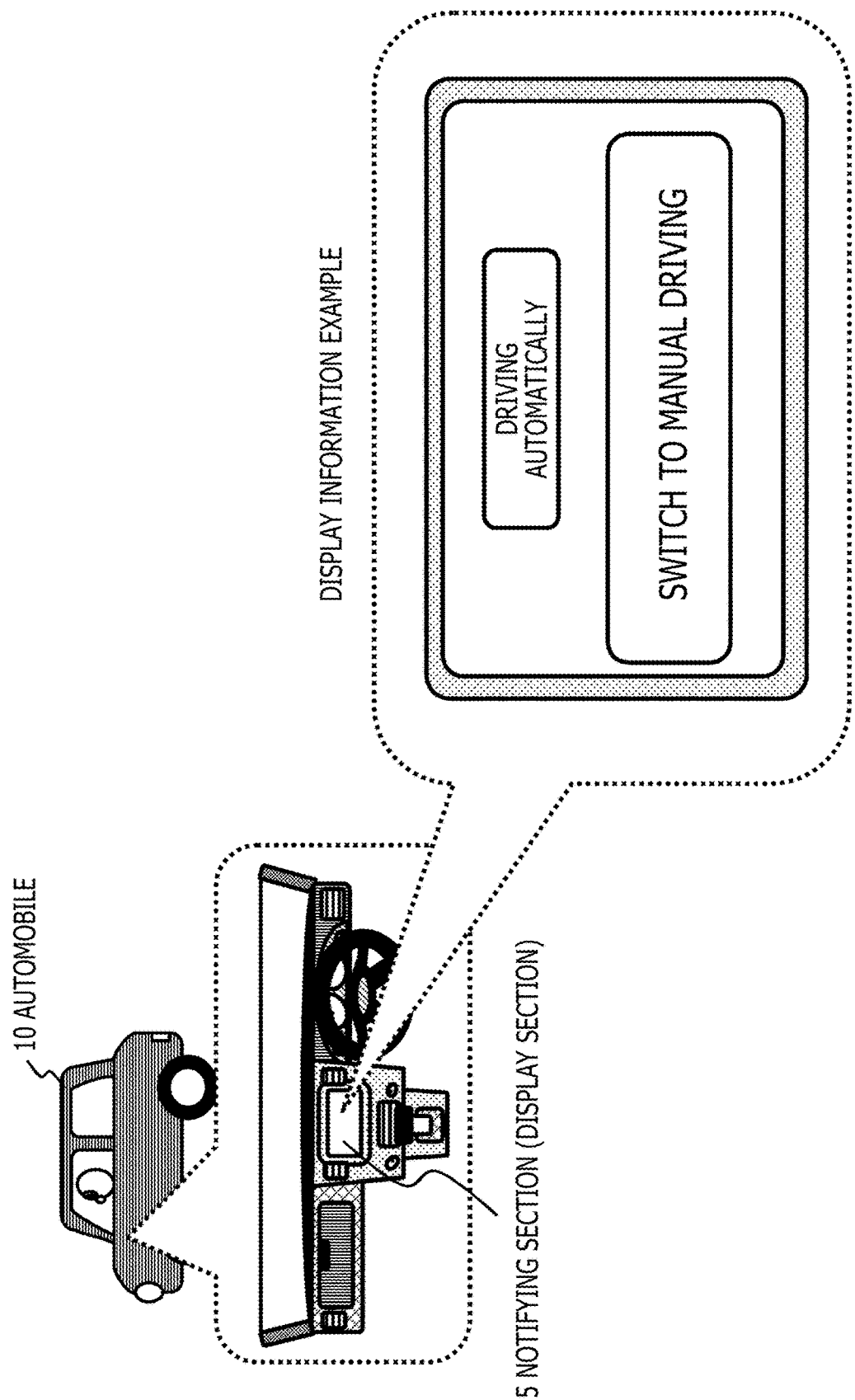
FIG. 2 is a diagram for explaining an example of data displayed on a display section of the moving apparatus according to the present disclosure.

An example of a warning display on the display section included in the notifying section 15 is depicted in FIG. 2.

As depicted in FIG. 2, a display section 30 presents the following information as the display.

Driving mode information="Driving Automatically"
Warning display="Switch to Manual Driving"

In the display area of the driving mode information, "Driving Automatically" is displayed at the time of execution of the automated driving mode, and "Driving Manually" is displayed at the time of execution of the manual driving mode.

The display area of the warning display information is a display area where the following information is displayed while the automobile is executing automated driving in the automated driving mode. Note that, while the entire display screen is used in the present embodiment, part of the screen may be used for the display.

"Switch to Manual Driving"

Note that, while an explanation is stated explicitly in a sentence in this example, the display is not limited to such a text display, and may include symbols such as pictograms, for example.

Note that the automobile 10 is configured to be capable of communicating with a server 30 via the communication section 14 as depicted in FIG. 1.

For example, part of the process of computing a proper time of the notification output by the data processing section 11, specifically, a learning process, can be performed at the server 30.

A specific example of this is described later.

Figure 3:
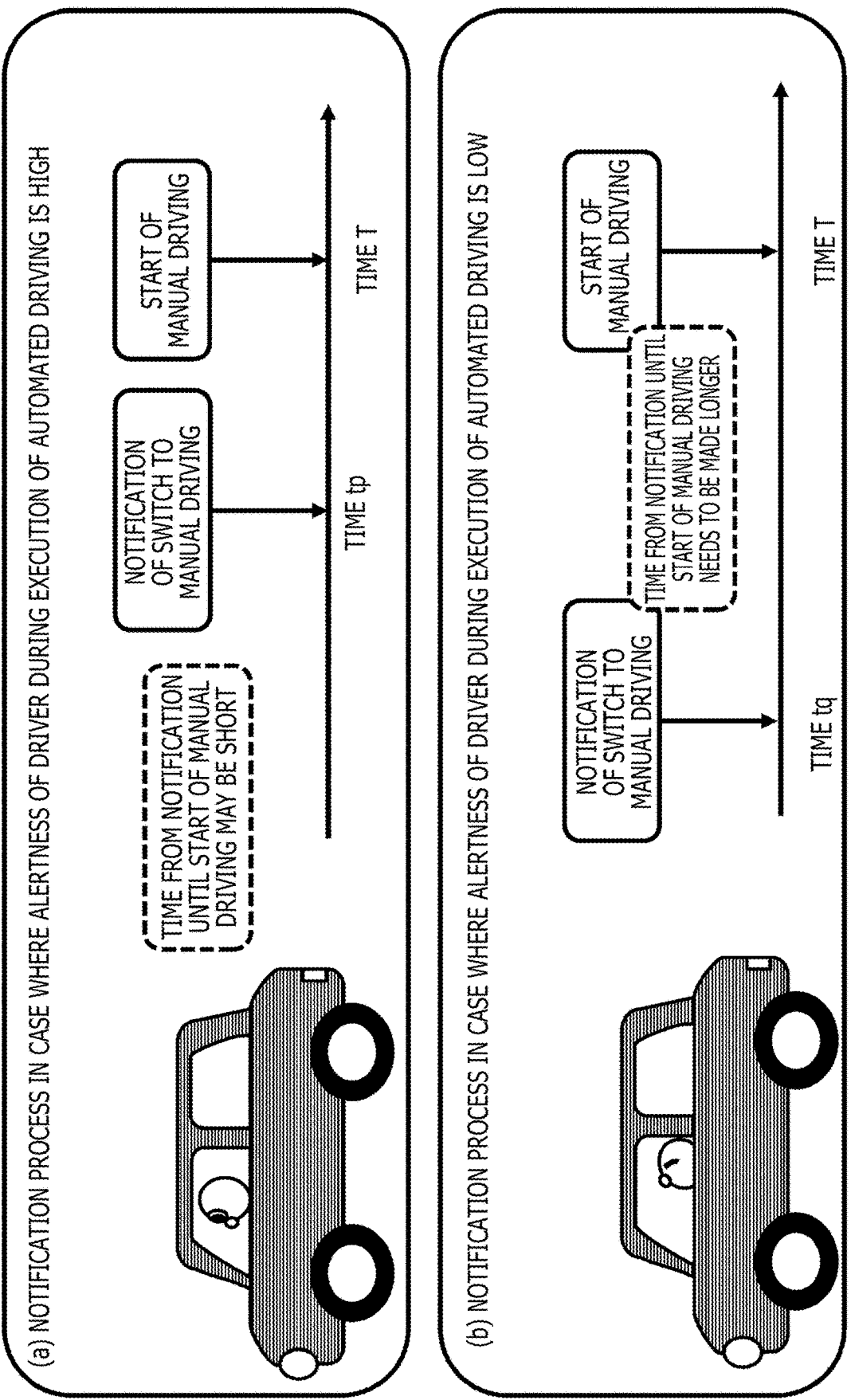
FIG. 3 depicts diagrams for explaining a process executed by the moving apparatus according to the present disclosure.

FIG. 3 depicts diagrams illustrating specific examples of processes executed by the moving apparatus and the information processing apparatus according to the present disclosure.

FIG. 3 depicts diagrams illustrating examples of setting of proper timings of notifications requesting a switch to manual driving while the automobile is executing automated driving in the automated driving mode, and depicts notification process examples in the following two examples.

(a) Notification process in case where alertness of driver during execution of automated driving is high (b) Notification process in case where alertness of driver during execution of automated driving is low The example of (a) is an example in which the driver is looking forward and staring at a road during execution of automated driving. In this case, the alertness of the driver is high, that is, the driver can start manual driving at any time.

In such a case, even if a notification for a switch to manual driving is given at a timing immediately before the time when manual driving is necessary, the driver can start safe manual driving promptly.

In the example of (b), in a case where the driver is taking a nap during execution of automated driving, the alertness of the driver is extremely low.

In such a case, if a notification for a switch to manual driving is given at a timing immediately before the time when manual driving is necessary, the driver inevitably starts manual driving in a state in which the driver has a low consciousness, and the possibility that the driver causes an accident increases. Accordingly, in such a case where the alertness is low, it is necessary to give a notification for a switch to manual driving at an earlier phase.

Further, in a case of such a vehicle as a delivery vehicle, for example, which has a box and allows a driver to move into the box during execution of automated driving and perform work therein, notification timings to make requests for a switch to manual driving are preferably set in different manners depending on the following three types of cases as depicted in FIG. 4, for example.

(a) Notification process in case where alertness of driver during execution of automated driving is high (b) Notification process in a case where alertness of driver during execution of automated driving is low (c) Notification process in case where a driver is away from driver's seat during execution of automated driving The example of (a) is an example in which the driver is looking forward and staring at a road during execution of automated driving. In this case, the alertness of the driver is high, that is, the driver can start manual driving at any time.

In such a case, even if a notification for a switch to manual driving is given at a timing immediately before the time when manual driving is necessary, the driver can start safe manual driving promptly.

In the example of (b), the driver is taking a nap during execution of automated driving, and the alertness of the driver is extremely low in this case.

In such a case, if a notification for a switch to manual driving is given at a timing immediately before the time when manual driving is necessary, the driver inevitably starts manual driving in a state in which the driver has a low consciousness, and the possibility that the driver causes an accident increases. Accordingly, in such a case where the alertness is low, it is necessary to give a notification for a switch to manual driving at an earlier phase.

In the example of (c), the driver is performing work away from the driver's seat during execution of automated driving, and in such a case, it takes time for the driver to return to the driver's seat.

In such a case, if a notification for a switch to manual driving is given at a timing immediately before the time when manual driving is necessary, there is a possibility that the vehicle undesirably enters a manual driving zone before the driver returns to the driver's seat. Accordingly, in such a case where the driver is away from the driver's seat, it is necessary to give a notification for a switch to manual driving at an earlier phase.

In addition, in a case where the driver (driver) 20 who is in the automobile 10 is away from the driver's seat, the driver 20 cannot notice a notification even if the notification is displayed on the notifying section (display section) 15 of the driver's seat in such a manner as that explained with reference to FIG. 2 earlier.

Figure 5:
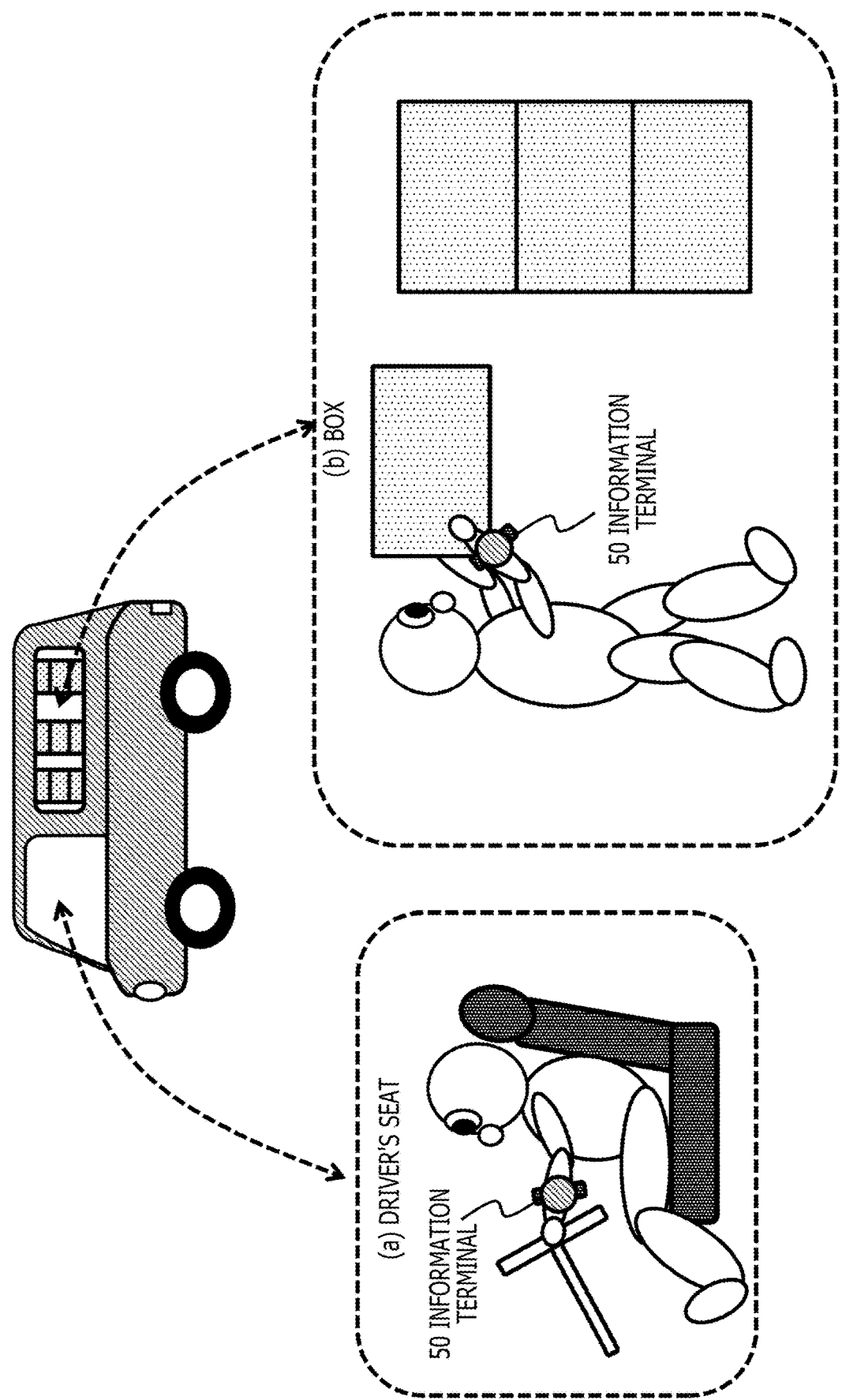
FIG. 5 depicts diagrams for explaining an action example of a driver in the moving apparatus according to the present disclosure.

In order to solve this, notification and information provision are performed via an information terminal 50 worn on an arm of the driver (driver) 20, for example, a wristwatch type information terminal 50 as the one depicted in FIG. 5. The information terminal 50 performs a process of displaying display data similar to the one explained with reference to FIG. 2, and further displays approach information regarding zones of a road on which the automobile 10 is driving (automated driving zones and manual driving zones), and the like. Furthermore, the information terminal 50 has alarm output, sound output, and vibration functionalities, and informs the driver 20 of various notifications and warnings.

FIG. 5 depicts diagrams illustrating use examples of the information terminal 50. The driver (driver) 20 who is in the automobile 10 is at the driver's seat as depicted in FIG. 4(a) while the automobile 10 is executing automated driving in some cases, but is away from the driver's seat and performing work in the box as depicted in FIG. 4(b) in some other cases. However, the driver 20 is always wearing the information terminal 50 on her/his arm, and it becomes possible for the driver 20 to notice display information displayed on the information terminal 50 as well as output sounds, alarms, vibrations, and the like. In addition, such a wearable information terminal 50 operates together with the driver information acquiring section 12 of the vehicle, and has a response input functionality as acknowledgment means. This configuration enables a recognition response to a notification and a warning. In addition, it is also possible to send, to the vehicle system, a notification of rejection to an early return to manual driving described later.

Figure 6:
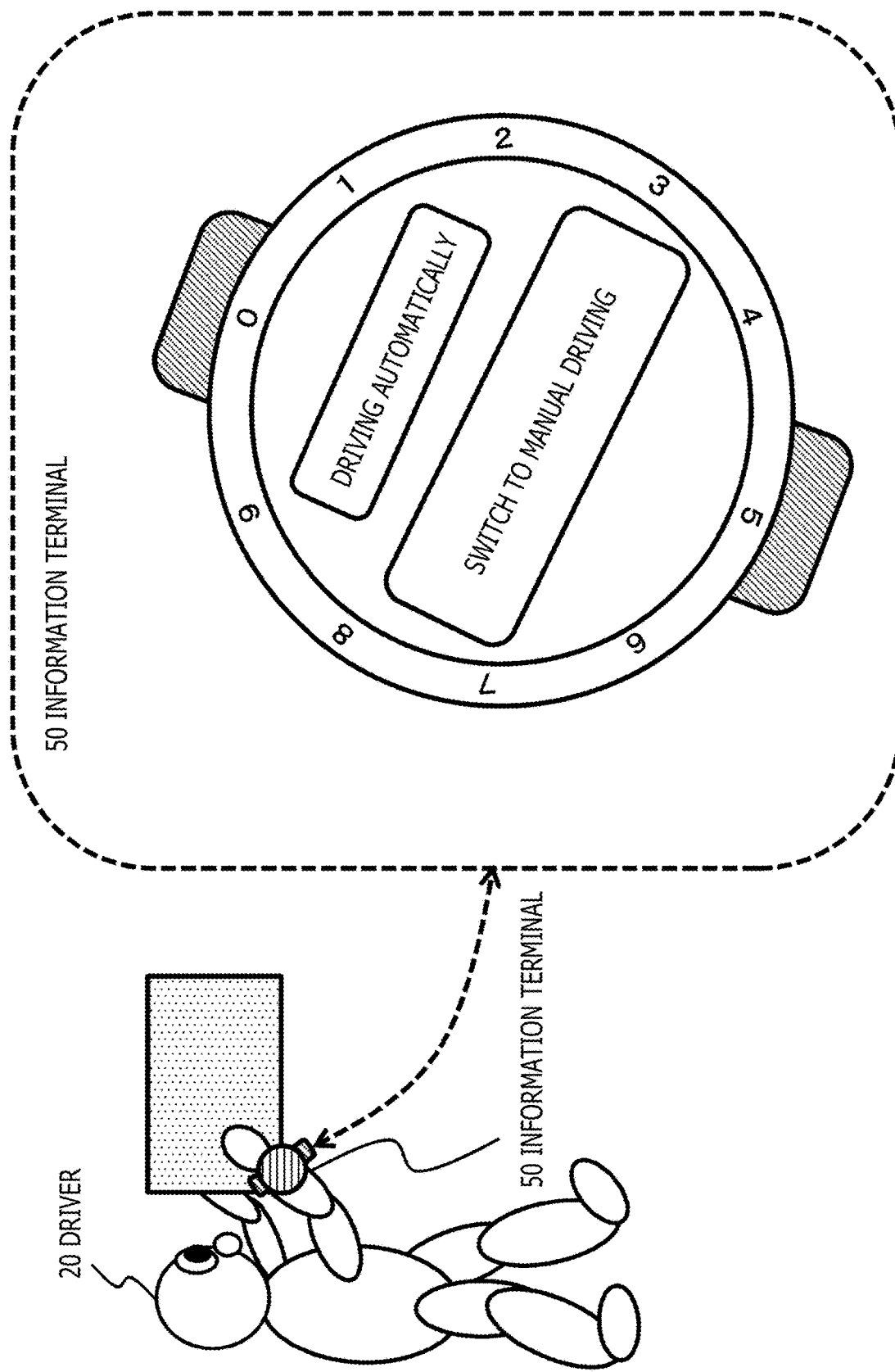
FIG. 6 is a diagram for explaining an example of a data display on a terminal held by a driver.

FIG. 6 is a diagram depicting an example of display information of the information terminal 50. The example depicted in FIG. 6 illustrates a display example similar to the display example of the notifying section (display section) 15 explained with reference to FIG. 2 earlier. The information terminal 50 displays the following information.

Driving mode information="Driving Automatically"
Warning display="Switch to Manual Driving"

It becomes possible for the driver 20 to check the display no matter where she/he is.

Figure 7:
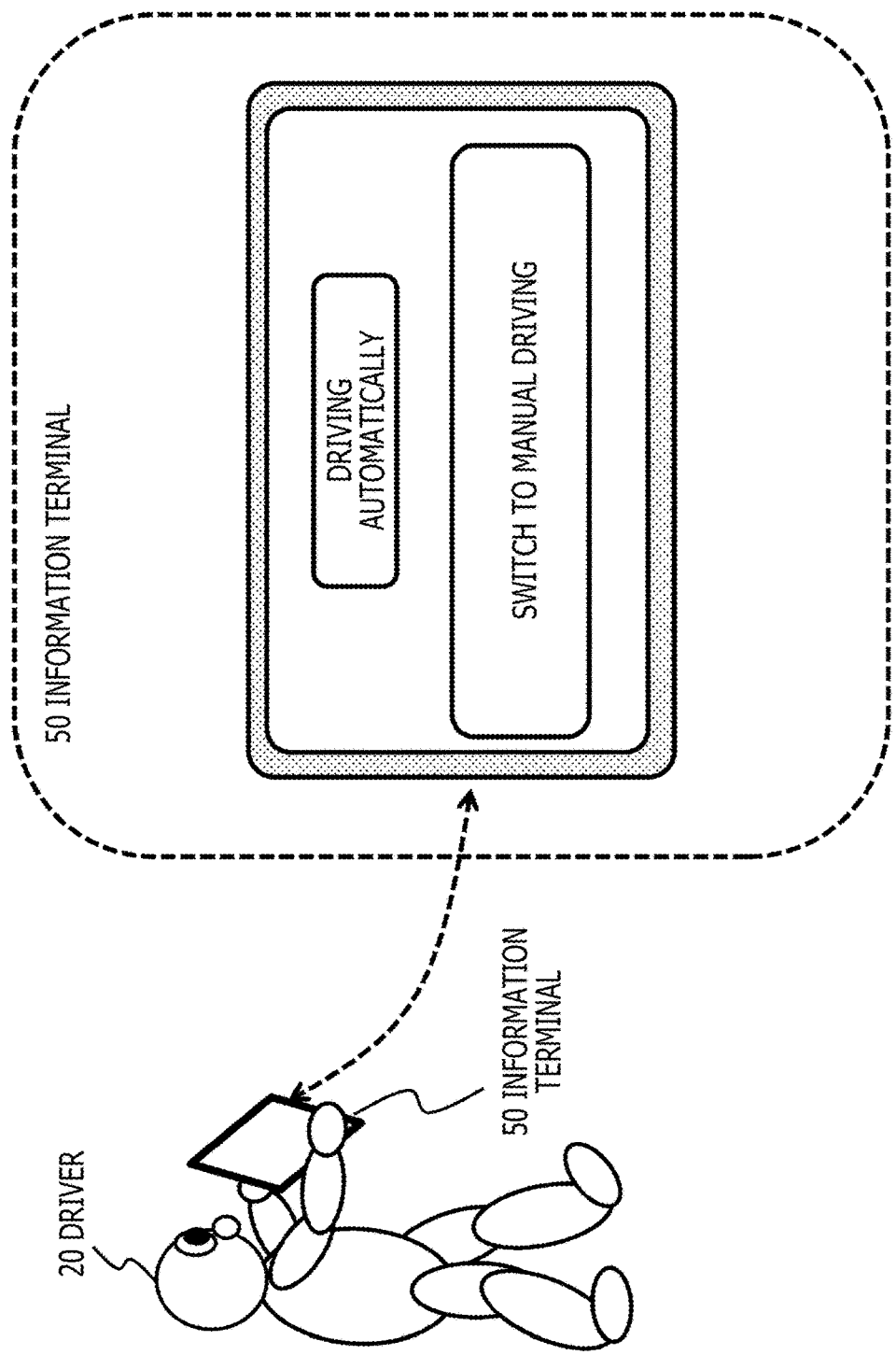
FIG. 7 is a diagram for explaining an example of a data display on a terminal held by the driver.

Furthermore, in another possible configuration, a tablet type information terminal 50 as the one depicted in FIG. 7 may be used to perform notification and information provision.

2. Specific Configuration and Process Examples of Moving Apparatus

Next, the specific configuration and process examples of the moving apparatus according to the present disclosure are explained with reference to FIG. 8 and the subsequent figures.

Figure 8:
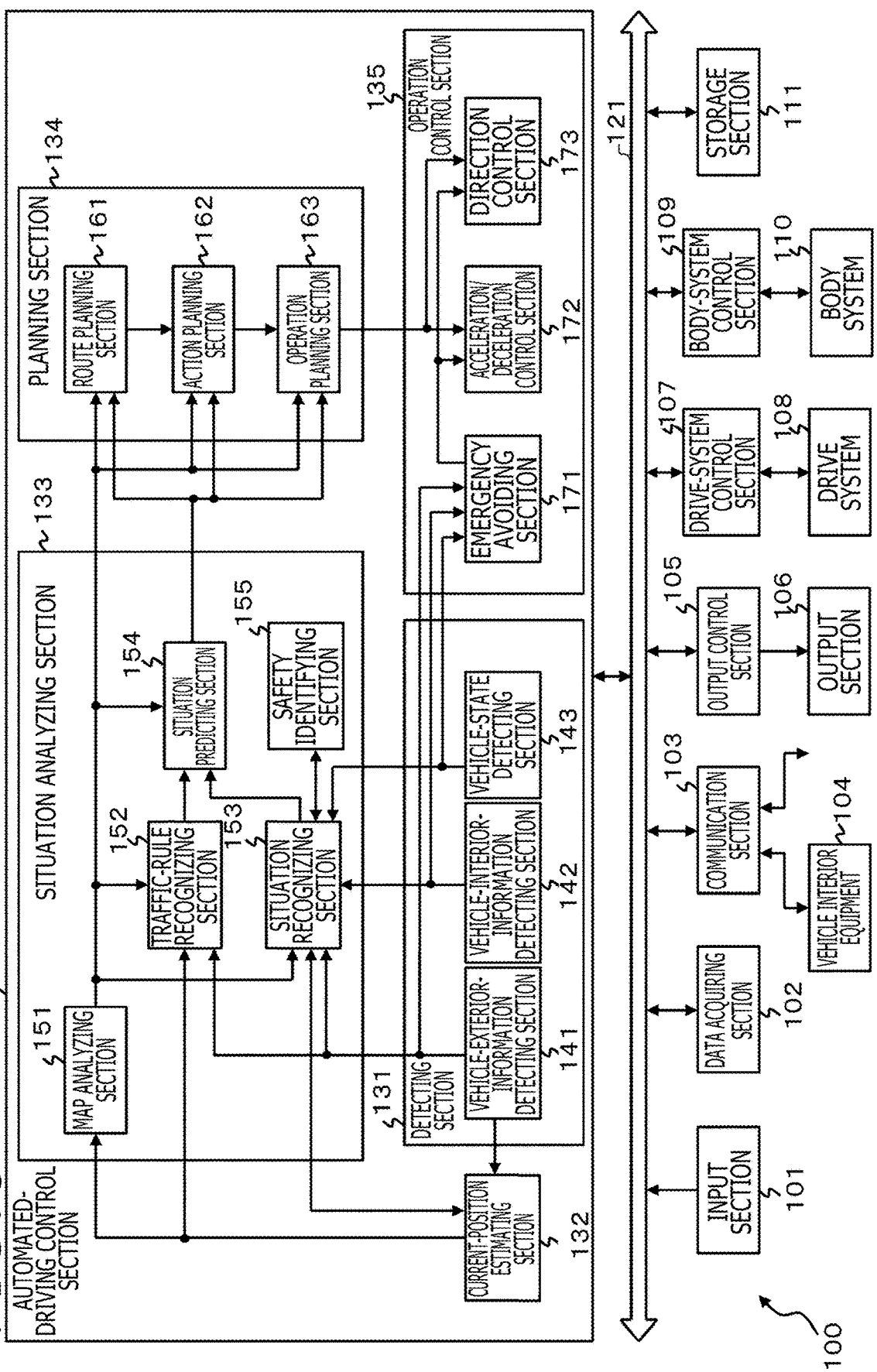
FIG. 8 is a diagram for explaining a configuration example of the moving apparatus according to the present disclosure.

FIG. 8 depicts a configuration example of a moving apparatus 100. Note that, hereinafter, in a case where distinctions are made between a vehicle provided with the moving apparatus 100 and other vehicles, the former is referred to as a user's automobile or a user's vehicle.

The moving apparatus 100 includes an input section 101, a data acquiring section 102, a communication section 103, vehicle interior equipment 104, an output control section 105, an output section 106, a drive-system control section 107, a drive system 108, a body-system control section 109, a body system 110, a storage section 111, and an automated-driving control section 112.

The input section 101, the data acquiring section 102, the communication section 103, the output control section 105, the drive-system control section 107, the body-system control section 109, the storage section 111, and the automated-driving control section 112 are interconnected via a communication network 121. The communication network 121 includes an in-vehicle communication network, a bus, or the like conforming to a certain standard such as a CAN (Controller Area Network), a LIN (Local Interconnect Network), a LAN (Local Area Network), or FlexRay (registered trademark), for example. Note that sections of the moving apparatus 100 are connected directly without using the communication network 121 in some cases.

Note that, hereinafter, in a case where sections of the moving apparatus 100 perform communication via the communication network 121, descriptions regarding the communication network 121 are omitted. For example, in a case where the input section 101 and the automated-driving control section 112 perform communication via the communication network 121, it is simply described that the input section 101 and the automated-driving control section 112 perform communication.

The input section 101 includes an apparatus used by a passenger to input various types of data, instruction, and the like. For example, the input section 101 includes operation devices such as a touch panel, buttons, a microphone, switches, or levers; operation devices by which information can be input by a method other than a manual operation, by sounds, gestures, or the like; and the like. In addition, for example, the input section 101 may be a remote-control apparatus that uses infrared rays or other radio waves, or externally-connected equipment such as mobile equipment or wearable equipment that supports operation of the moving apparatus 100. The input section 101 generates an input signal on the basis of data, an instruction, or the like input by a passenger, and supplies the input signal to sections of the moving apparatus 100.

The data acquiring section 102 includes various types of sensors and the like that acquire data to be used for processes by the moving apparatus 100, and supplies the acquired data to sections of the moving apparatus 100.

For example, the data acquiring section 102 includes various types of sensors for detecting the state of the user's automobile and the like. Specifically, for example, the data acquiring section 102 includes a gyro sensor; an acceleration sensor; an inertial measurement unit (IMU); sensors for detecting an accelerator pedal operation amount, a brake pedal operation amount, a steering wheel steering angle, an engine rotation speed, a motor rotation speed, a wheel rotation speed, and the like; and the like.

In addition, for example, the data acquiring section 102 includes various types of sensors for detecting information regarding the outside of the user's automobile. Specifically, for example, the data acquiring section 102 includes image capturing apparatuses such as a ToF (Time Of Flight) camera, a stereo camera, a monocular camera, an infrared camera, or other types of cameras. In addition, for example, the data acquiring section 102 includes an environment sensor for detecting weather conditions, atmospheric phenomena, or the like; and a surrounding environment information detection sensor for detecting objects around the user's automobile. The environment sensor includes a raindrop sensor, a fog sensor, a sunshine sensor, a snow sensor, and the like, for example. The surrounding environment information detection sensor includes an ultrasonic sensor, a radar, a LiDAR (Light Detection and Ranging, Laser Imaging Detection and Ranging), a sonar, and the like, for example.

Figure 9:
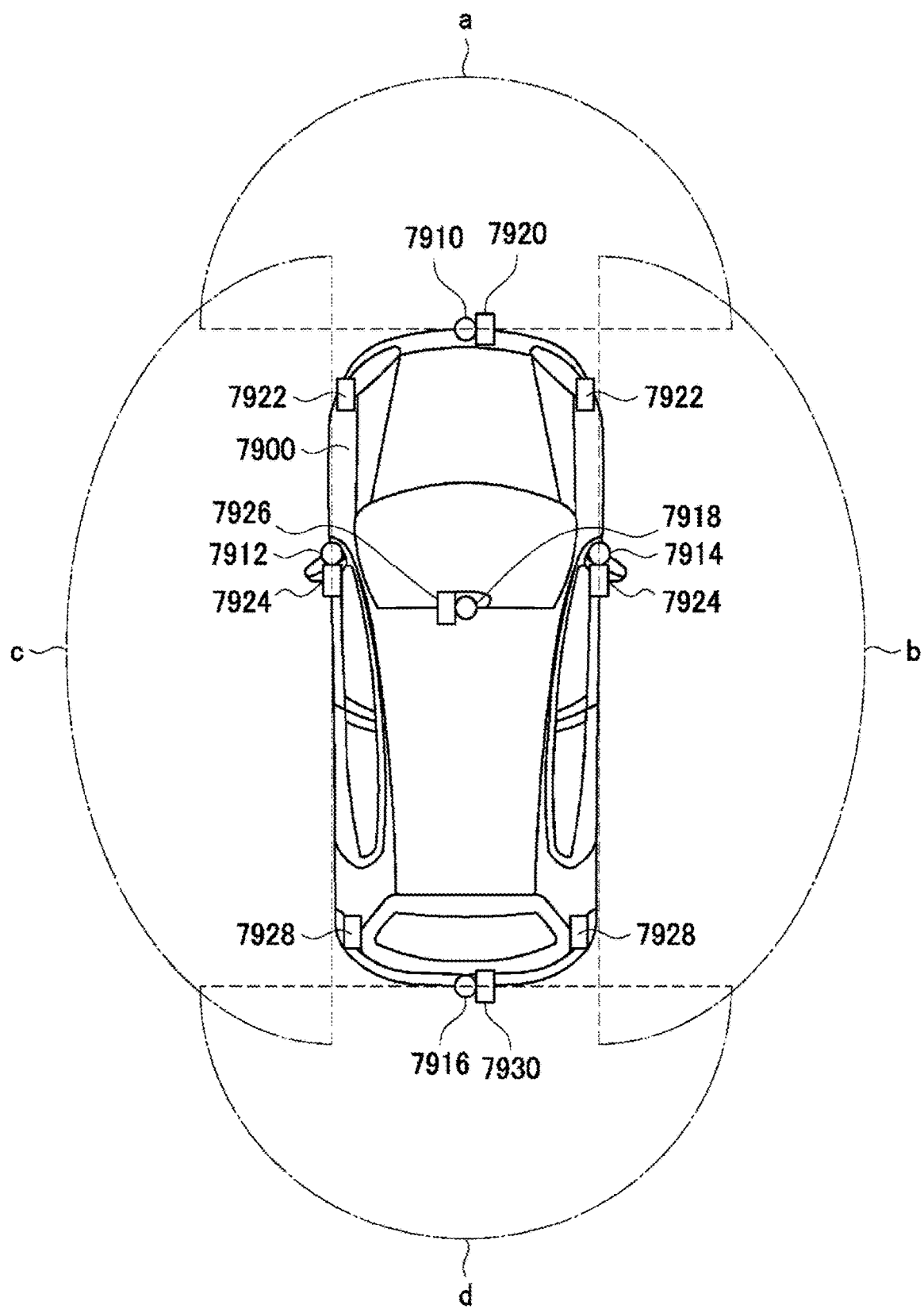
FIG. 9 is a diagram for explaining a configuration example of the moving apparatus according to the present disclosure.

For example, FIG. 9 depicts an installation example of various types of sensors for detecting information regarding the outside of the user's automobile. Image capturing apparatuses 7910, 7912, 7914, 7916, and 7918 are provided at at least one position of, for example, a front nose, side mirrors, a rear bumper, and a back door of a vehicle 7900 and an upper section of the windshield in the interior of the vehicle.

The image capturing apparatus 7910 provided at the front nose and the image capturing apparatus 7918 provided at the upper section of the windshield in the interior of the vehicle mainly acquire images of the space in front of the vehicle 7900. The image capturing apparatuses 7912 and 7914 provided at the side mirrors mainly acquire images of the spaces on the sides of the vehicle 7900. The image capturing apparatus 7916 provided at the rear bumper or the back door mainly acquires images of the space behind the vehicle 7900. The image capturing apparatus 7918 provided at the upper section of the windshield in the interior of the vehicle is mainly used for detection of preceding vehicles, pedestrians, obstacles, traffic lights, traffic signs, lanes, and the like. In addition, in automated driving in the coming future, their use may be expanded to cover wider ranges at the time when the vehicle makes a right or left turn, to cover pedestrians who are crossing the road ahead when the vehicle makes a right or left turn, and further to cover the ranges of objects approaching crosswalks.

Note that FIG. 9 depicts an example of the image capturing ranges of the image capturing apparatuses 7910, 7912, 7914, and 7916. An image-capturing range a represents the image-capturing range of the image capturing apparatus 7910 provided at the front nose, image-capturing ranges b and c represent the image-capturing ranges of the image capturing apparatuses 7912 and 7914 provided at the side mirrors, and an image-capturing range d represents the image-capturing range of the image capturing apparatus 7916 provided at the rear bumper or the back door. For example, by superimposing pieces of data of images captured by the image capturing apparatuses 7910, 7912, 7914, and 7916 on one another, a bird's-eye view image of the vehicle 7900 as seen from above, further, an all-around stereoscopic display image surrounding the periphery of the vehicle with a curved plane, and the like are obtained.

Sensors 7920, 7922, 7924, 7926, 7928, and 7930 provided at the front, rear, sides, and corners of the vehicle 7900 and the upper section of the windshield in the interior of the vehicle may be ultrasonic sensors or radars, for example. The sensors 7920, 7926, and 7930 provided at the front nose, rear bumper, and back door of the vehicle 7900 and the upper section of the windshield interior of the vehicle may be LiDARs, for example. The sensors 7920 to 7930 are mainly used for detection of preceding vehicles, pedestrians, obstacles, and the like. Results of the detection may further be applied for improvement of the stereoscopic display of the bird's-eye view display or all-around stereoscopic display.

Returning to FIG. 8, the explanation of constituent elements is continued. The data acquiring section 102 includes various types of sensors for detecting the current position of the user's automobile. Specifically, for example, the data acquiring section 102 includes a GNSS (Global Navigation Satellite System) receiver that receives GNSS signals from GNSS satellites and the like.

In addition, for example, the data acquiring section 102 includes various types of sensors for detecting information of the interior of the vehicle. Specifically, for example, the data acquiring section 102 includes an image capturing apparatus that captures images of the driver; a vital sensor that detects vital information of the driver; a microphone that collects sounds in the interior of the vehicle; and the like. For example, the vital sensor is provided on a seat surface, a steering wheel, or the like, and detects the seated state of a passenger sitting on the seat or vital information of the driver holding the steering wheel. Vital signals that can be used include various types of observable data such as heart rate, pulse rate, blood flow, respiration, psychosomatic correlation, visual stimulus, brain waves, sweating state, head posture behavior, eyes, steady gaze, blinking, saccade, microsaccade, fixation, drift, gaze, or iris pupil reaction. The vital activity observable information reflecting observable driving states is aggregated as observable evaluation values estimated from observation, and is used for computation of a return notification timing at a safety identifying section 155 described later, as return-delay-case-specific characteristics of the relevant driver, from return-delay-time characteristics associated with the log of the evaluation values.

Figure 10:
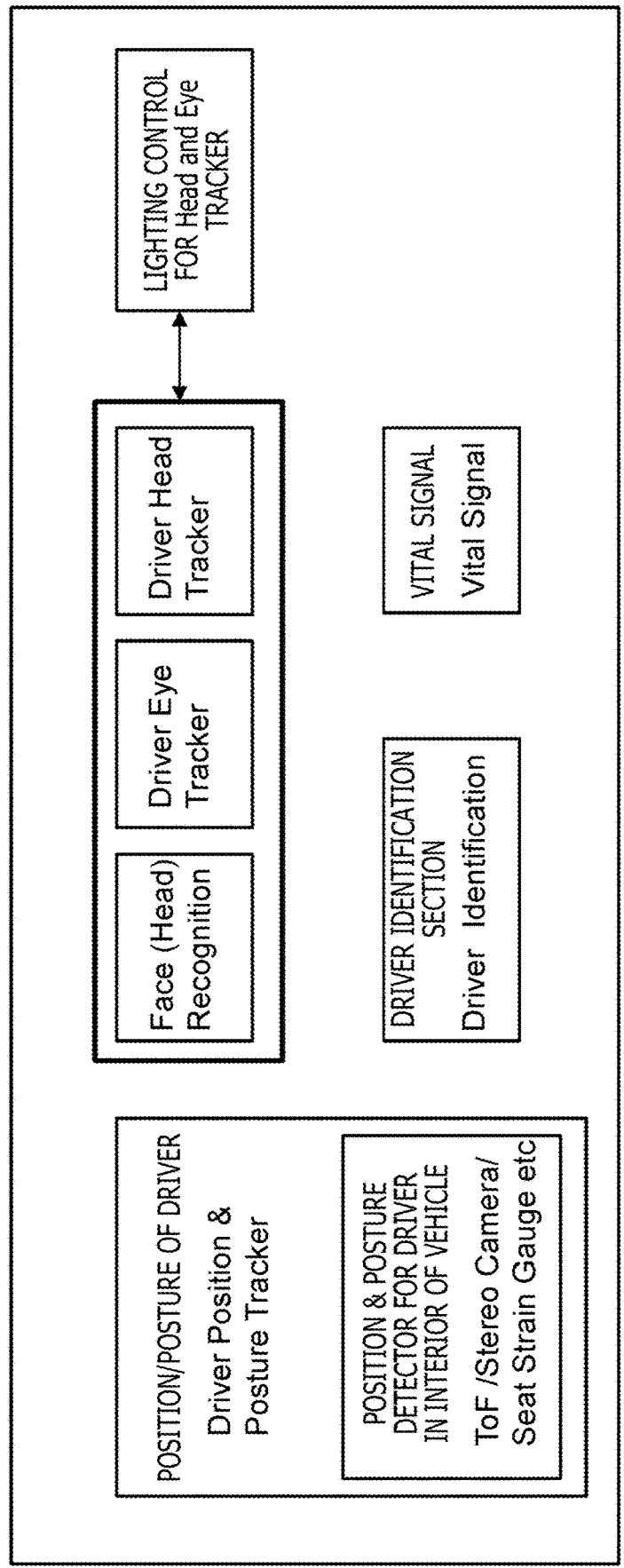
FIG. 10 is a diagram for explaining a sensor configuration example of the moving apparatus according to the present disclosure.

FIG. 10 depicts an example of various types of sensors that are included in the data acquiring section 102 and are for obtaining information of the driver in the interior of the vehicle. For example, the data acquiring section 102 includes a ToF camera, a stereo camera, a seat strain gauge (Seat Strain Gauge), and the like as detectors for detecting the position and posture of the driver. In addition, the data acquiring section 102 includes, as detectors for obtaining vital activity observable information of the driver, a face recognizer (Face (Head) Recognition), a driver eye tracker (Driver Eye Tracker), a driver head tracker (Driver Head Tracker), and the like.

Further, the data acquiring section 102 includes a vital signal (Vital Signal) detector as a detector for obtaining vital activity observable information of the driver. In addition, the data acquiring section 102 includes a driver identification (Driver Identification) section. Note that, other than knowledge-based identification using passwords, PIN numbers, and the like, examples of the method of identification that can be used include vital identification using faces, fingerprints, the irises of pupils, voiceprints, and the like.

The communication section 103 communicates with the vehicle interior equipment 104, various types of equipment, servers, base stations, and the like outside the vehicle, transmits data supplied from sections of the moving apparatus 100, and supplies received data to sections of the moving apparatus 100. Note that communication protocols supported by the communication section 103 are not particularly limited to any kind, and it is also possible for the communication section 103 to support multiple types of communication protocols.

For example, the communication section 103 performs wireless communication with the vehicle interior equipment 104 by wireless LAN, Bluetooth (registered trademark), NFC (Near Field Communication), WUSB (Wireless USB), and the like. In addition, for example, the communication section 103 performs wired communication with the vehicle interior equipment 104 via connection terminals (and cables if necessary), which are not depicted, by a USB (Universal Serial Bus), an HDMI (registered trademark) (High-Definition Multimedia Interface), an MHL (Mobile High-definition Link), and the like.

Further, for example, the communication section 103 communicates with equipment (e.g., application servers or control servers) on external networks (e.g., the Internet, cloud networks, or business-operator-specific networks) via base stations or access points. In addition, for example, the communication section 103 communicates with terminals (e.g., terminals of pedestrians or stores, or MTC (Machine Type Communication) terminals) that are near the user's automobile by using a P2P (Peer To Peer) technology.

Further, for example, the communication section 103 performs V2X communication such as vehicle to vehicle (Vehicle to Vehicle) communication, vehicle to road (Vehicle to Infrastructure) communication, vehicle to home (Vehicle to Home) communication, or vehicle to pedestrian (Vehicle to Pedestrian) communication. In addition, for example, the communication section 103 includes a beacon receiving section, receives radio waves or electromagnetic waves emitted from wireless stations and the like installed on roads, and acquires information regarding the current position, traffic jams, traffic regulations, required length of time, and the like. Note that the communication section may be used to perform pairing with a vehicle that is in front of the user's vehicle driving in a zone and that can be a leading vehicle, and information acquired from a data acquiring section mounted on the forward vehicle may be acquired as prior driving information and used to complement data of the data acquiring section 102 of the user's automobile. Particularly, this serves as means for ensuring the higher safety for following vehicles when those vehicles are driving in a line led by a leading automobile, or in another similar situation.

For example, the vehicle interior equipment 104 includes mobile equipment (a tablet, a smartphone, etc.) or wearable equipment carried by a passenger; information equipment that is carried into or attached to the user's automobile; a navigation apparatus that performs searches for routes to certain destinations; and the like. Note that, considering that occupants will not necessarily be fixed to seating fixed positions if automated driving is used more widely, in the future, the vehicle interior equipment 104 that can be used may be expanded to a video player, a gaming console, and other equipment that can be used attachably to and detachably from an installation position in the vehicle. While information presentation regarding a geographical point where the intervention by the driver becomes necessary is performed only to the relevant driver in the example described in the present embodiment, the information provision may be performed further to a following vehicle when the vehicles are driving in a line or in another similar situation, and further, by always providing information to an operation management center for passenger transportation shared buses and long-distance logistics commercial vehicles, it may be used in combination with remote drive assistance as appropriate.

The output control section 105 controls output of various types of information to passengers of the user's automobile or to the outside of the vehicle. For example, the output control section 105 generates output signals including at least one of visual information (e.g., image data) and auditory information (e.g., sound data), and supplies them to the output section 106, to thereby control output of visual information and auditory information from the output section 106. Specifically, for example, the output control section 105 synthesizes pieces of data of images captured by different image capturing apparatuses of the data acquiring section 102, generates a bird's-eye view image, a panoramic image, or the like, and supplies output signals including the generated image to the output section 106. In addition, for example, the output control section 105 generates sound data including a beep, a warning message, or the like regarding a danger such as collision, contact, or entrance into a danger zone, and supplies output signals including the generated sound data to the output section 106.

The output section 106 includes an apparatus that can output visual information or auditory information to passengers of the user's automobile or to the outside of the vehicle. For example, the output section 106 includes a display apparatus; an instrument panel; an audio speaker; headphones; a wearable device such as an eye-glass-type display worn by a passenger; a projector; a lamp; and the like. Other than an apparatus having a normal display, for example, the display apparatus included in the output section 106 may be an apparatus that displays visual information within the visual field of the driver such as a head-up display, a transmission display, or an apparatus having an AR (Augmented Reality) display functionality.

The drive-system control section 107 generates various types of control signals, and supplies them to the drive system 108, to thereby perform control of the drive system 108. In addition, as necessary, the drive-system control section 107 supplies the control signals to sections other than the drive system 108, and gives a notification regarding the control state of the drive system 108 and the like.

The drive system 108 includes various types of apparatuses related to the drive system of the user's automobile. For example, the drive system 108 includes a driving force generating apparatus such as an internal combustion engine or a drive motor for generating driving force; a driving force transmission mechanism for transmitting the driving force to wheels; a steering mechanism that adjusts the steering angle; a braking apparatus that generates braking force; an ABS (Antilock Brake System); an ESC (Electronic Stability Control); an electric power steering apparatus; and the like.

The body-system control section 109 generates various types of control signals, and supplies them to the body system 110, to thereby perform control of the body system 110. In addition, as necessary, the body-system control section 109 supplies the control signals to sections other than the body system 110, and gives a notification regarding the control state of the body system 110, and the like.

The body system 110 includes various types of apparatuses related to the body system mounted on the vehicle body. For example, the body system 110 includes a key-less entry system; a smart key system; a power window apparatus; power seats; a steering wheel; an air-conditioning apparatus; various types of lamps (e.g., head lamps, back lamps, brake lamps, blinkers, fog lamps, etc.); and the like.

For example, the storage section 111 includes magnetic storage devices such as a ROM (Read Only Memory), a RAM (Random Access Memory), or an HDD (Hard Disc Drive); a semiconductor storage device; an optical storage device; a magneto-optical storage device; and the like. The storage section 111 stores various types of programs, data, and the like used by sections of the moving apparatus 100. For example, the storage section 111 stores such map data as a three-dimensional high-precision map such as a dynamic map, a global map that has precision lower than that of the high-precision map but covers a large area, or a local map including information regarding the area around the user's automobile.

The automated-driving control section 112 performs control related to automated driving such as autonomous driving or driving assistance. Specifically, for example, the automated-driving control section 112 performs coordinated control for the purpose of realizing functionalities of an ADAS (Advanced Driver Assistance System) including collision avoidance or impact mitigation of the user's automobile, following driving based on inter-vehicle distances, vehicle speed maintenance driving, collision warning of the user's automobile, lane deviation warning of the user's automobile, or the like. In addition, for example, the automated-driving control section 112 performs coordinated control for the purpose of automated driving of autonomously driving without being dependent on an operation by the driver and the like. The automated-driving control section 112 includes a detecting section 131, a current-position estimating section 132, a situation analyzing section 133, a planning section 134, and an operation control section 135.

The detecting section 131 performs detection of various types of information necessary for control of automated driving. The detecting section 131 includes a vehicle-exterior-information detecting section 141, a vehicle-interior-information detecting section 142, and a vehicle-state detecting section 143.

The vehicle-exterior-information detecting section 141 performs a process of detecting information regarding the outside of the user's automobile on the basis of data or signals from sections of the moving apparatus 100. For example, the vehicle-exterior-information detecting section 141 performs processes of detecting, recognizing, and tracking objects around the user's automobile and a process of detecting the distances to and relative speeds of the objects. For example, objects to be detection targets include vehicles, humans, obstacles, structures, roads, traffic lights, traffic signs, road markings, and the like.

In addition, for example, the vehicle-exterior-information detecting section 141 performs a process of detecting environments around the user's automobile. For example, environments around the user's automobile to be detection targets include weather, temperature, humidity, brightness, the state of a road surface, and the like. The vehicle-exterior-information detecting section 141 supplies data representing results of the detection processes to the current-position estimating section 132, a map analyzing section 151, a traffic-rule recognizing section 152, and a situation recognizing section 153 of the situation analyzing section 133, an emergency avoiding section 171 of the operation control section 135, and the like.

Information acquired by the vehicle-exterior-information detecting section 141 can be supplied mainly by infrastructures if the user's automobile is driving in zones where local dynamic maps (LDM) which are constantly updated are supplied from the infrastructures, as zones where it is prioritized to allow automated driving. Alternatively, in some other possible cases, the user's automobile may drive while constantly receiving updated information in advance before entering the zones, from vehicles or a vehicle group driving in the relevant zones earlier. In addition, in a case where latest local dynamic maps are not constantly updated by infrastructures or in other similar cases, for the purpose of obtaining road information immediately before an entrance zone for higher safety especially while driving in a line and so on, road environment information obtained from a leading vehicle having entered the zone may further be used complementarily. In many cases, whether automated driving is allowed in a zone is determined on the basis of whether or not there is prior information provided from infrastructures. An updated and new local dynamic map (LDM) included in information representing whether automated driving is allowed or prohibited on a route provided from an infrastructure is equivalent to providing an invisible trajectory as what is generally called "information." Note that, while, for convenience, the vehicle-exterior-information detecting section 141 is depicted as being mounted on the user's vehicle as a premise, the prior predictability at the time of driving may be enhanced further by using information captured as "information" by front vehicles.

The vehicle-interior-information detecting section 142 performs a process of detecting information regarding the interior of the vehicle on the basis of data or signals from sections of the moving apparatus 100. For example, the vehicle-interior-information detecting section 142 performs processes of identifying and recognizing the driver, a process of detecting the state of the driver, a process of detecting a passenger, a process of detecting the environment of the interior of the vehicle, and the like. For example, the state of the driver to be detection targets includes physical conditions, alertness, concentration, fatigue, line-of-sight direction, detailed eye behaviors, and the like.

Further, it is expected that, in the future use of automated driving, the driver is completely disengaged from the driving steering work, the driver takes a nap temporarily, or starts working on other tasks, making it necessary for a system to recognize to what extent a return to the alertness of the consciousness necessary for a return to driving has been made. That is, in driver monitoring systems that have conventionally been considered, detection means is mainly responsible for detecting a decline in consciousness such as sleepiness, but in the coming future, the driver will not intervene in the driving steering at all. Accordingly, a system will no longer have means for directly observing the degree of intervention by the driver in driving from the steering stability of steering equipment or the like, and it is necessary for the system to observe the transition of a return to consciousness necessary for driving from a state in which the accurate consciousness state of the driver is unknown and to proceed with an intervention transfer from automated driving to manual driving of steering by identifying the accurate internal alertness state of the driver.

In view of this, the vehicle-interior-information detecting section 142 mainly has roles at two major stages. The first role is passive monitoring of the state of the driver during automated driving, and the second role is detection determination of the periphery cognition, perception, determination, and further, steering-equipment actuation ability of the driver until, after a return request is given from the system, a level at which the driver is capable of manual driving before the arrival at a zone of driving with attention is reached. As control, self-diagnosis of malfunctions of the entire vehicle may be performed further, and similarly in a case where lowering of the automated driving functionality has occurred due to a partial functionality malfunction of the automated driving as well, the driver may be urged to make an early return to manual driving. Passive monitoring mentioned here means detection means of a type that does not ask a driver to respond and react consciously, but does not exclude one that emits physical radio waves, light, or the like from equipment, and detects a response signal. That is, passive methods mean state monitoring of the driver who is unconscious while taking a nap and so on, and involve classification not of cognitive responses and reactions of the driver. It does not exclude an active response device that analyzes and evaluates reflected or diffused signals as a result of emission of radio waves, infrared rays, or the like. On the contrary, monitoring that asks the driver to respond consciously with responses and reactions is called active monitoring.

For example, the environment of the interior of the vehicle to be detection targets includes temperature, humidity, brightness, smell, and the like. The vehicle-interior-information detecting section 142 supplies data representing results of the detection processes to the situation recognizing section 153 of the situation analyzing section 133 and the operation control section 135. Note that, in a case where it is found that the driver is unable to achieve manual driving within right period time after an instruction for a return to the driving is given by the system to the driver, and it is determined that the transfer will be too late even if it is attempted to make extra time by performing deceleration control while staying in automated driving, an instruction is given to the emergency avoiding section 171 or the like of the system to start a procedure for decelerating, pulling over, and stopping for pulling over the vehicle. That is, even if, as initial states, situations are the same in that it is too late, arrival time for arrival at the transfer limit can be made longer by decelerating the vehicle early. By making arrival time for arrival at the transfer limit longer, spare time is generated for handling of events by the system, and it becomes possible to take measures for ensuring safety. It should be noted, however, that the application of this is restricted because, as described later, excessively decelerating or slowing down the automobile increases traffic-jam triggering factors and the risk of rear-end collisions.

The vehicle-state detecting section 143 performs a process of detecting the state of the user's automobile on the basis of data or signals from sections of the moving apparatus 100. For example, the state of the user's automobile to be detection targets includes speed; acceleration; steering angle; whether or not there are abnormalities; contents of abnormalities; the state of a driving operation; the position and inclination of power seats; the state of door locks; the state of other in-vehicle equipment; and the like. The vehicle-state detecting section 143 supplies data representing results of the detection processes to the situation recognizing section 153 of the situation analyzing section 133, the emergency avoiding section 171 of the operation control section 135, and the like.

On the basis of data or signals from sections of the moving apparatus 100 such as the vehicle-exterior-information detecting section 141 and the situation recognizing section 153 of the situation analyzing section 133, the current-position estimating section 132 performs a process of estimating the position and posture of the user's automobile and the like. In addition, as necessary, the current-position estimating section 132 generates a local map (hereinafter, referred to as a map for current position estimation) used for estimating the current position.

For example, the map for current position estimation is a highly precise map using such a technology as SLAM (Simultaneous Localization and Mapping). The current-position estimating section 132 supplies data representing results of the estimation processes to the map analyzing section 151, the traffic-rule recognizing section 152, and the situation recognizing section 153 of the situation analyzing section 133 and the like. In addition, the current-position estimating section 132 causes the storage section 111 to store the map for current position estimation.

The situation analyzing section 133 performs a process of analyzing the situation of and around the user's automobile. The situation analyzing section 133 includes the map analyzing section 151, the traffic-rule recognizing section 152, the situation recognizing section 153, a situation predicting section 154, and the safety identifying section 155.

While using data or signals from sections of the moving apparatus 100 such as the current-position estimating section 132 or the vehicle-exterior-information detecting section 141 as necessary, the map analyzing section 151 performs a process of analyzing various types of maps stored in the storage section 111, and constructs a map including information necessary for processes of automated driving. The map analyzing section 151 supplies the constructed map to the traffic-rule recognizing section 152, the situation recognizing section 153, the situation predicting section 154, a route planning section 161, an action planning section 162, and an operation planning section 163 of the planning section 134, and the like.

On the basis of data or signals from sections of the moving apparatus 100 such as the current-position estimating section 132, the vehicle-exterior-information detecting section 141, or the map analyzing section 151, the traffic-rule recognizing section 152 performs a process of recognizing traffic rules around the user's automobile. By this recognition process, for example, the positions and states of signals around the user's automobile, the contents of traffic regulations around the user's automobile, lanes on which the user's automobile is allowed to drive, and the like are recognized. The traffic-rule recognizing section 152 supplies data representing results of the recognition process to the situation predicting section 154 and the like.

On the basis of data or signals from sections of the moving apparatus 100 such as the current-position estimating section 132, the vehicle-exterior-information detecting section 141, the vehicle-interior-information detecting section 142, the vehicle-state detecting section 143, or the map analyzing section 151, the situation recognizing section 153 performs a process of recognizing the situation related to the user's automobile. For example, the situation recognizing section 153 performs a process of recognizing the situation of the user's automobile, the situation around the user's automobile, the situation of the driver of the user's automobile, and the like. In addition, the situation recognizing section 153 generates a local map (hereinafter, referred to as a map for situation recognition) to be used for recognition of the situation around the user's automobile, as necessary. The map for situation recognition is an occupancy grip map (Occupancy Grid Map), for example.

For example, the situation of the user's automobile to be recognition targets includes the position, posture, and movement (e.g., speed, acceleration, moving direction, etc.) of the user's automobile; vehicle-specific situations and further cargo-loading-specific situations that determine motion characteristics of the user's automobile such as a cargo loading amount, the movement of the center of gravity of the vehicle body due to cargo loading, tire pressure, the braking distance movement due to the wear conditions of braking pads, permitted maximum deceleration braking to prevent cargo movement that causes load braking, the centrifugal-force-reduction limit speed when driving on a curve with a liquid load, or the like; and road-specific situations such as the frictional coefficient of a road surface, the curve of a road, or the slope of a road. Because even if the road environment is totally the same, a return start timing that is required for control varies depending on characteristics of the vehicle itself, and further, loads or the like, it is necessary to make an optimum timing for performing control reflect those various conditions by collecting and learning the various conditions. When determining a control timing on the basis of the type and load of the vehicle, simply observing and monitoring whether or not there are abnormalities of the user's vehicle, the contents of abnormalities, and the like is insufficient. Parameters that determine additional extra time until returns that is desirable for ensuring a certain level of safety may be set as fixed values in advance according to load-specific characteristics in the logistics industry and the like, and a method in which all the notification timing determination conditions are set uniformly by self-accumulative learning may not necessarily be adopted.

For example, the condition around the user's automobile to be recognition targets include the types and positions of surrounding stationary objects; the types, positions, and motions of surrounding moving objects (e.g., speed, acceleration, moving direction, etc.); the configurations and surface states of surrounding roads; the weather, temperature, humidity, and brightness of the space around the user's automobile; and the like. For example, the state of the driver to be recognition targets includes physical conditions, alertness, concentration, fatigue, motion of a line of sight, a driving operation, and the like. For safe driving of the vehicle, there are significantly different control start points at which handling is required, according to different vehicle-specific states such as a loading amount, a chassis-fixedstate of a mounting section, a center-of-gravity biased state, a maximum deceleration possible acceleration value, a maximum load possible centrifugal force, a return response delay amount according to the state of the driver, and the like.

The situation recognizing section 153 supplies data representing results of the recognition process (including the map for situation recognition, as necessary) to the current-position estimating section 132, the situation predicting section 154, and the like. In addition, the situation recognizing section 153 causes the storage section 111 to store the map for situation recognition.

On the basis of data or signals from sections of the moving apparatus 100 such as the map analyzing section 151, the traffic-rule recognizing section 152, or the situation recognizing section 153, the situation predicting section 154 performs a process of predicting the situation related to the user's automobile. For example, the situation predicting section 154 performs a process of predicting the situation of the user's automobile, the situation around the user's automobile, the situation of the driver, and the like.

For example, the situation of the user's automobile to be prediction targets includes a behavior of the user's automobile, the occurrence of an abnormality, the drivable distance, and the like. For example, the situation around the user's automobile to be prediction targets includes behaviors of moving objects around the user's automobile, changes of the states of signals, changes of the environment such as weather, and the like. For example, the situation of the driver to be prediction targets includes a behavior and the physical conditions of the driver and the like.

The situation predicting section 154 supplies data representing results of the prediction process to the route planning section 161, the action planning section 162, and the operation planning section 163 of the planning section 134 and the like, along with the data from the traffic-rule recognizing section 152 and the situation recognizing section 153.

The safety identifying section 155 learns optimum return timings according to return action patterns of the driver, vehicle characteristics, and the like, and provides the learned information to the situation recognizing section 153 and the like. As a result, for example, it becomes possible to present, to the driver, a statistically-determined optimum timing necessary for the driver to normally return to manual driving from automated driving at a certain preset ratio or higher.

On the basis of data or signals from sections of the moving apparatus 100 such as the map analyzing section 151 or the situation predicting section 154, the route planning section 161 plans a route to a destination. For example, on the basis of a global map, the route planning section 161 sets a route from the current position to a specified destination. In addition, for example, the route planning section 161 changes the route as appropriate on the basis of a traffic jam, an accident, traffic regulations, conditions such as engineering work, the physical conditions of the driver, and the like. The route planning section 161 supplies data representing the planned route to the action planning section 162 and the like.

On the basis of data or signals from sections of the moving apparatus 100 such as the map analyzing section 151 or the situation predicting section 154, the action planning section 162 plans actions of the user's automobile for safely driving a route planned by the route planning section 161 within a planned length of time. For example, the action planning section 162 plans starts; stops; advancing directions (e.g., moving forward, moving backward, turning left, turning right, changing directions, etc.); driving lanes; driving speeds; passing other vehicles; and the like. The action planning section 162 supplies data representing the planned actions of the user's automobile to the operation planning section 163 and the like.

On the basis of data or signals from sections of the moving apparatus 100 such as the map analyzing section 151 or the situation predicting section 154, the operation planning section 163 plans operation of the user's automobile for realizing actions planned by the action planning section 162. For example, the operation planning section 163 plans acceleration; deceleration; driving trajectories; and the like. The operation planning section 163 supplies data representing the planned operation of the user's automobile to an acceleration/deceleration control section 172 and a direction control section 173 of the operation control section 135 and the like.

The operation control section 135 performs control of the operation of the user's automobile. The operation control section 135 includes the emergency avoiding section 171, the acceleration/deceleration control section 172, and the direction control section 173.

On the basis of detection results of the vehicle-exterior-information detecting section 141, the vehicle-interior-information detecting section 142, and the vehicle-state detecting section 143, the emergency avoiding section 171 performs a process of detecting emergencies such as collision, contact, entrance into a danger zone, an abnormality of the driver, or an abnormality of the vehicle. In a case where the occurrence of an emergency is detected, the emergency avoiding section 171 plans operation of the user's automobile for avoiding the emergency, such as a sudden stop or a quick turn. The emergency avoiding section 171 supplies data representing the planned operation of the user's automobile to the acceleration/deceleration control section 172, the direction control section 173, and the like.

The acceleration/deceleration control section 172 performs acceleration/deceleration control for realizing the operation of the user's automobile planned by the operation planning section 163 or the emergency avoiding section 171. For example, the acceleration/deceleration control section 172 calculates a control target value of a driving force generating apparatus or a braking apparatus for realizing the planned acceleration, deceleration, or sudden stop, and supplies a control command representing the calculated control target value to the drive-system control section 107. Note that there are two main cases in which an emergency can occur. That is, one of them is a case where, during automated driving on a road that originally is indicated as a safe road by a local dynamic map or the like acquired from an infrastructure on a driving route during automated driving, an unpredicted accident occurs due to an unexpected reason, and an emergency return of the driver will be too late. The other case is a case where it becomes difficult for the driver to rightly return to manual driving from automated driving.

The direction control section 173 performs direction control for realizing operation of the user's automobile planned by the operation planning section 163 or the emergency avoiding section 171. For example, the direction control section 173 calculates a control target value of a steering mechanism for realizing a driving trajectory or a quick turn planned by the operation planning section 163 or the emergency avoiding section 171, and supplies a control command representing the calculated control target value to the drive-system control section 107.

3. Sequence of Mode Switch from Automated Driving Mode to Manual Driving Mode Next, a sequence of transfer from an automated driving mode to a manual driving mode is explained.

Figure 11:
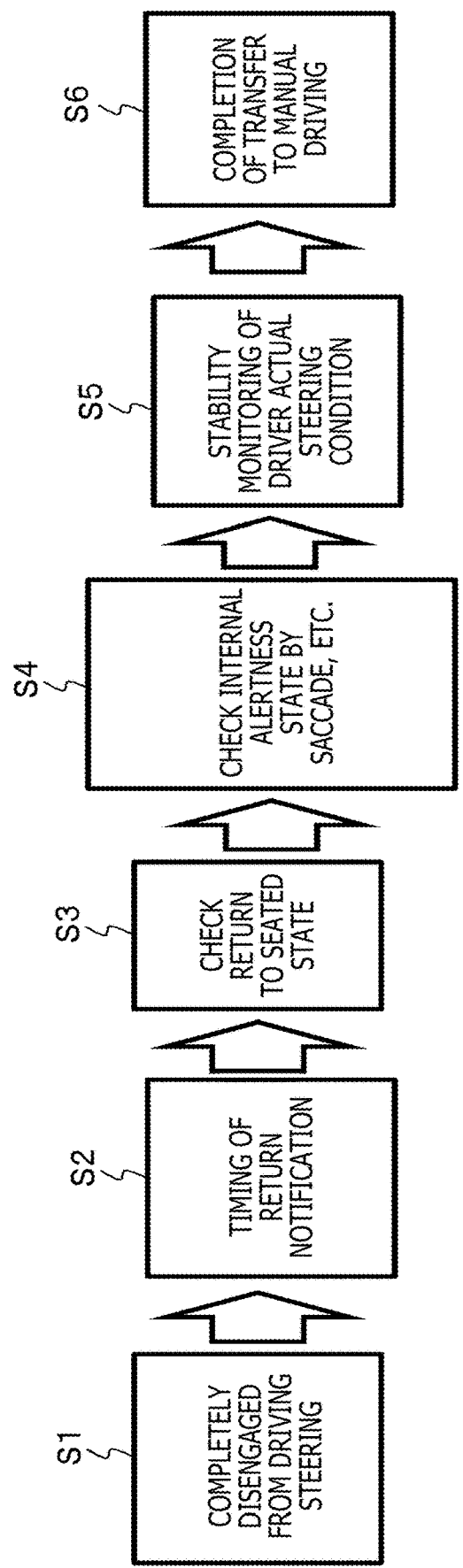
FIG. 11 is a diagram depicting an example of a sequence of a mode switch from an automated driving mode to a manual driving mode executed by the moving apparatus according to the present disclosure.

FIG. 11 schematically depicts an example of the sequence of a mode switch from the automated driving mode to the manual driving mode at the automated-driving control section 112.

In Step S1, the driver is completely disengaged from driving steering. In this state, the driver can execute a secondary task such as taking a nap, watching a video, concentrating her/his mind on a game, or engaging in work using a visual tool such as a tablet or a smartphone, for example. The work using a visual tool such as a tablet or a smartphone can be performed in a state in which the driver's seat is moved out of position, or in a state in which the driver is sitting on a seat other than the driver's seat, for example, in some possible cases.

Depending on the state of the driver like these, it is expected that the time required for the driver to return to manual driving when the automobile has approached a zone, on a route, where the automobile is required to return to manual driving varies significantly according to work contents that the driver is engaging in at that point of time. There is not enough time for the driver to return to manual driving if a notification is given immediately before an event approaches in some cases, or in a case where a notification is given too early in an attempt to leaving extra time before an event approaches, the time until the timing at which the driver is actually required to return to manual driving becomes too long, in some other cases. As a result, if situations where notifications are not given at right timings repeatedly occur, the driver considers notification timings of the system to be unreliable, and becomes less aware of notifications. This results in the driver becoming less attentive to right handling; as a result, the risk that the transfer is not performed well increases, and, simultaneously, this also becomes a factor to inhibit comfortable execution of the secondary task. In view of this, the system needs to optimize notification timings in order for the driver to start right preparations for returning to driving in response to notifications.

Step S2 corresponds to a timing of a return-to-manual-driving request notification as the one explained with reference to FIG. 2 earlier. In a dynamic and haptic manner using vibrations or the like, or in a visual or auditory manner, the driver is notified that the driver is requested to return to driving. For example, the automated-driving control section 112 monitors the steady state of the driver and identifies a timing to give a notification, and a notification is given at an appropriate timing. That is, it is desirable that the state of execution of the secondary task by the driver constantly be monitored passively in the preceding passive monitoring period, the system be capable of computing the optimum timing of the notification optimum timing, the passive monitoring in the period of Step S1 constantly be performed continuously, and return timings and return notifications be determined according to driver-specific return characteristics.

That is, it is desirable that optimum return timings according to return action patterns of the driver, vehicle characteristics, and the like be learned and a statistically-determined optimum timing that is required for the driver to normally return to manual driving from automated driving at a certain preset ratio or higher be presented to the driver. In this case, in a case where the driver fails to respond to the notification in a certain length of time, a warning is given by an alarm or the like.

In Step S3, it is checked whether the driver has returned to the seated state. In Step S4, the internal alertness state of the driver is checked on the basis of the face or eye behavioral analysis regarding saccades or the like. In Step S5, the degree of stability of the actual steering situation of the driver is monitored. Then, in Step S6, the transfer from automated driving to manual driving is completed.

4. Operation Sequence Example of Automated Driving

Next, an example of an operation sequence of automated driving is explained with reference to a flowchart depicted in FIG. 12.

Figure 12:
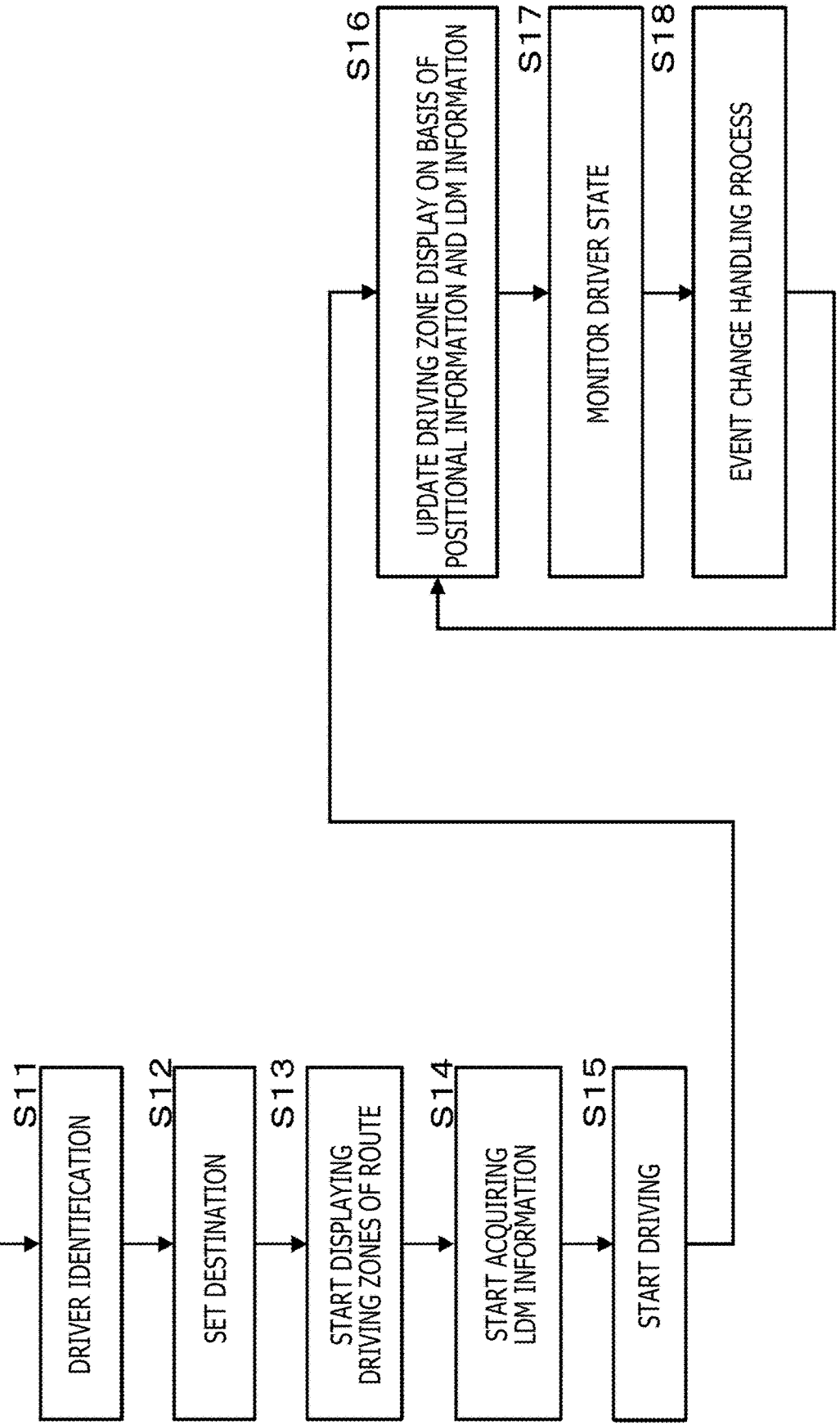
FIG. 12 is a diagram depicting a flowchart for explaining an example of an operation sequence of automated driving.

The flowchart depicted in FIG. 12 is a flowchart for explaining the operation sequence of automated driving executed by the moving apparatus 100.

First, in Step S11, driver identification is performed. This driver identification is performed by using knowledge-based identification using passwords, PIN numbers, and the like, vital identification using faces, fingerprints, the irises of pupils, voiceprints, and the like, or further, combined use of knowledge-based identification and vital identification. By performing the driver identification in such a manner, it becomes possible to accumulate information for determining a notification timing in association with each driver even in a case where plural drivers drive the same vehicle.

Next, in Step S12, the input section 101 is manipulated by a driver, and a destination is set. In this case, an input operation by the driver is performed on the basis of a display of an instrument panel.

Note that, while it is assumed that a travel plan is set after the driver gets on the vehicle in an instance of a case explained as the present embodiment, the driver may remotely make a prior reservation through a smartphone before getting on the vehicle or through a personal computer before leaving her/his home and so on, and further, the vehicle system may perform preplanning setting in line with a schedule of the driver anticipated according to a schedule table, may update and acquire LDM information of the road environment, that is, what is generally called local dynamic map (LDM) information that is highly-dense and constantly-updated driving map information of roads on which the vehicle is to drive, and the like, and further display an advice display for actual driving at or before the time when the driver gets on the vehicle as a concierge does and so on.

Next, in Step S13, a display of driving zones on a driving route is started. Other than being displayed on the instrument panel, this driving zone display is displayed also on a tablet or the like on which the driver performs a secondary task, for example, next to a work window. This makes it possible for the driver who is performing the work on the work window to easily recognize driver intervention required zones and automated driving allowed zones on the driving route along an arrival prediction time axis from the current point.

In this driving zone display, future schedules and information regarding each approaching point are presented. In this driving zone display, driver intervention required zones and automated driving allowed zones on the driving route are displayed along the arrival prediction time axis from the current point. In addition, the driver intervention required zones include manual driving zones, zones for transfer from automated driving to manual driving, and careful driving zones after return from automated driving. Details of this driving zone display are described later.

Next, in Step S14, acquisition of the LDM update information is started. Along with this acquisition of the LDM update information, it becomes possible to change contents of the driving zone display to the latest state. Then, in Step S15, driving is started. Subsequently, in Step S16, on the basis of positional information of the user's automobile and the acquired LDM update information, the display of the driving zone display keeps being updated. As a result, the driving zone display is scroll-displayed in association with the driving as if each zone comes toward the user's automobile.

Means for presenting information regarding a forward driving environment relatively approaching in association with the driving, a timing necessary for transfer in the relevant user's vehicle, and the like does not need to be limited to scrolling means, and preferably is means that presents imminent time intervals in an intuitive and explicit manner and that allows the driver to know when she/he should start preparing for a return to driving with less misunderstanding, as another method. For example, it may be performed by a method of presenting time by using a sandglass-like image, or means for directly presenting transfer remaining time t0 user-worn equipment in a chronograph-format wristwatch mode.

Next, in Step S17, monitoring of the driver state is performed. Then, in Step S18, an event change handling process is performed. This event change handling process includes a mode switching process for handling a case where a point for a switch between an automated driving mode and a manual driving mode or a careful driving zone that is already present on the driving route has approached; an event occurrence process for handling a case where a driver intervention required zone of a mode switch point or a careful driving zone has newly occurred on the driving route; and the like. Hereinafter, the processes in Step S16 to Step S18 are repeated as appropriate.

"Details of Driving Zone Display"

Figure 13:
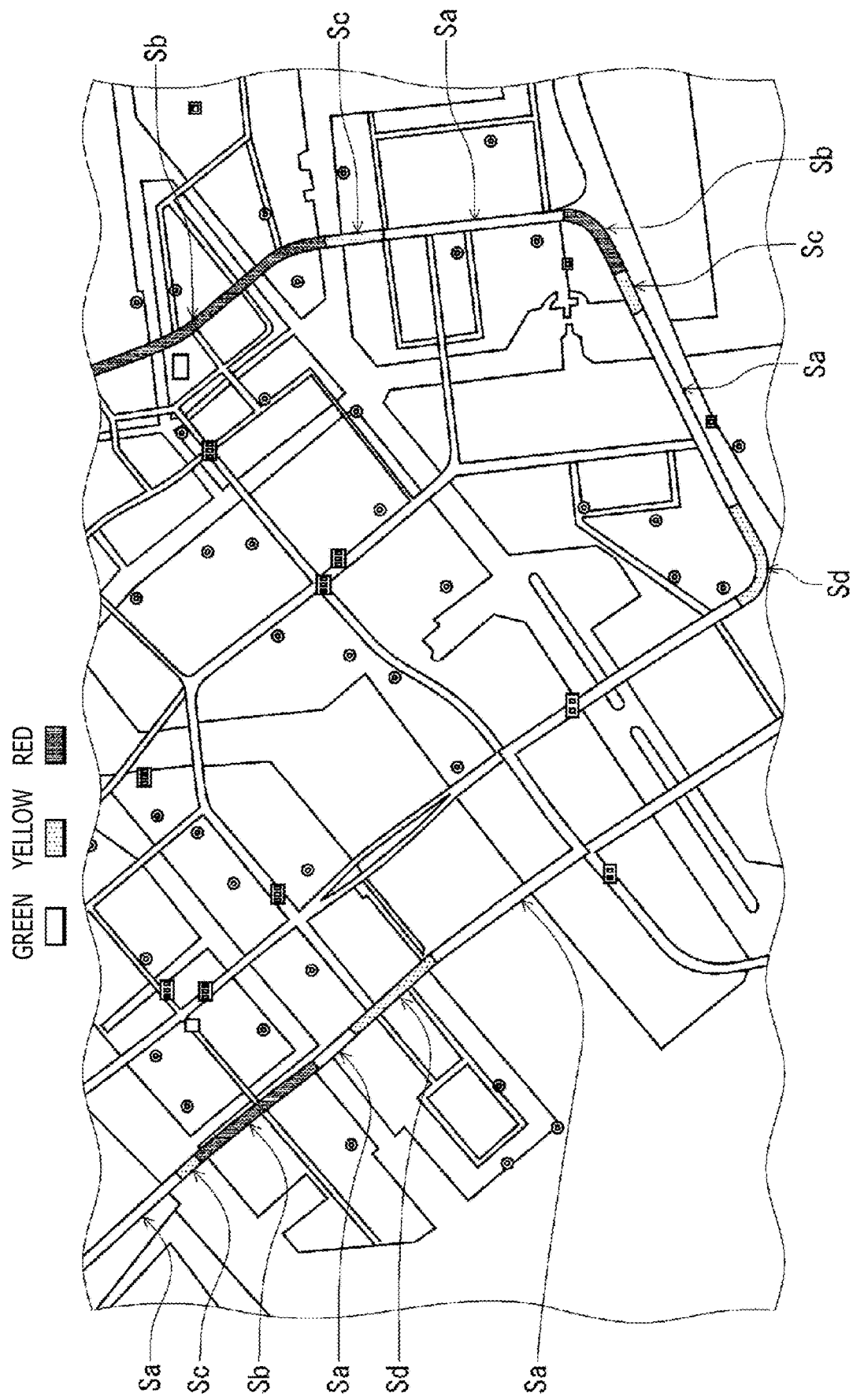
FIG. 13 is a diagram depicting an example of a driving route which is determined when a driver sets a destination and which has sporadically-set or sporadically-occurred automated driving allowed and prohibited zones.

FIG. 13 depicts an example of a driving route determined when a driver sets a destination. On this driving route, there are automated driving allowed zones Sa, manual driving zones Sb, zones Sc for transfer from automated driving to manual driving, and careful driving zones Sd after automated driving. Here, there is always a transfer zone Sc immediately before a manual driving zone Sb, and the driver is required to be at a posture for a return to manual driving in the transfer zone Sc. In addition, the careful driving zones Sd are zones where decelerated driving is possible while the vehicle is still performing automated driving under careful monitoring by the driver who is at the posture for a return to manual driving. Note that these automated driving allowed zones Sa, manual driving zones Sb, zones Sc for transfer from automated driving to manual driving, and careful driving zones Sd after automated driving are divisions used for convenience for the explanation of the technology according to the present disclosure, and they may be subdivided in association with various types of operations of automated driving in the future, or may be divided in a simplified manner. In addition, these divisions are not defined uniquely for road environments. These are zones or lanes determined on the basis of combined factors such as differences in operation as to how they are divided into lanes, characteristics of relevant vehicles, road situations, weather situations, automated driving performance of vehicles themselves due to partial functionality deterioration or the like of autonomous driving performance based on self-diagnosis information of the vehicles. These are not limited to uniquely defined zones such as the fixed zones on a map depicted in FIG. 13 of the present disclosure.

In the example depicted in the figure, the automated driving allowed zones Sa are depicted in green, the manual driving zones Sb are depicted in red, and the transfer zones Sc and the careful driving zones Sd are depicted in yellow. Note that the colors are represented by different patterns for convenience.

On the driving zone display on a center information display or a display device such as a tablet, each zone on the driving route as the ones mentioned above is displayed along the arrival prediction time axis from the current point. Data processing sections such as the data processing section 11 in the configuration depicted in FIG. 1, data processing sections in the automated-driving control section 112 in the configuration depicted in FIG. 8, for example, the detecting section 131, the situation analyzing section 133, the planning section 134, and the output control section 105 execute an information generation process for a display of driving zones on the driving route on the basis of driving route information and traffic information. Display data obtained as a result of this information processing is displayed on a display section included in the output section 106, under the control of the output control section 105.

FIG. 14(a) represents each zone on the driving route at a constant scale along a moving distance axis from the current point. FIG. 14(b) represents a flowing speed v(t) of an average road traffic at each point. FIG. 14(c) represents each zone represented along the moving distance axis after conversion into a time axis by using the speed v(t). As a result, each zone on the driving route is represented along the arrival prediction time axis from the current point. That is, the zones can be represented along the time axis corresponding to the quotients of physical distances of the driving route divided by the average speeds of the relevant zones.

In this embodiment, all the zones in the driving zone display are divided into three zones as depicted in FIG. 14(d), and the time axis of each zone is made different from each other. That is, a first zone from the current point to a first point (time t0; approximately ten minutes, for example) is displayed as a time linear display immediate zone along a first time axis. For example, time t0 is set as a length of time which is necessary and sufficient for a typical driver to end a secondary task and return to driving. The immediate zone that approaches along with the driving provides a visually intuitive effect equivalent to representation on a map as if the vehicle moves on it at a constant speed. Accordingly, this gives an advantage that the driver can start a preparation for a right return to driving as an event approaches, and can intuitively recognize a point where a return is to be started, accurately to some extent. That is, the purpose of the display of this zone is to provide a user with start determination information regarding a right returning point of a driver rightly.

In addition, as a time inverse display zone, a second zone from the first point (time t0) to a second point (time t1; approximately one hour, for example) is displayed along a time axis which gradually changes from the first time axis to a second time axis that is reduced in size at a predetermined rate from the first time axis. Regarding the purpose of the display of this second zone, mainly, if it is displayed at a scaling factor equivalent to that of the first zone mentioned earlier, displaying in a small display space for a long period of time becomes difficult, and thus, this is a device for accurately providing the driver with the road situation of a longer period with a small display. By doing so, it becomes possible for the driver to easily recognize until which point in the zones ahead that are approaching along with the driving the driver will not be asked to intervene in the driving, and this gives an advantage of enabling the driver to plan her/his engagement with a secondary task. This allows the driver to separate and keep balance between secondary tasks and driving intervention, and plays a role of information presentation which is important, for example, for planning regarding disengagement from secondary tasks of the driver in, for example, secondary tasks that accompany communication with a third party.

Here, with reference to FIG. 14(d), a method of setting the second display zone is described. If the height of a triangle is h0, time t of a point at a distance of h before the tip of the triangle is determined by the following Formula (1).

$$t = t0 * h0/h \tag{1}$$

In addition, the second time axis at the second point (time t1) is reduced from the first time axis by the rate of hs/h0. For example, this means that, in a case where hs=h0/8 holds, the reduction rate is 1/8.

The display of the second display zone depicted above is equivalent to a state in which a driving straight line expanded display zone on a map is seen in a direction inclined with respect to the advancing direction, or the forward direction of the road planar surface is seen in an inclined direction, in a case where the vehicle is driving at a constant driving speed. In other words, the visual effect of the display zone allows intuitive recognition of long and short distances at a display image height position, and thus, this display can be said to be a display that makes it possible to easily recognize a sensory distance without a display of graduations or the like for displaying accurate positions on a screen. Also, a remote zone is reduced in size, but is not a point that is reached immediately as a result of the driving. Accordingly, an approximate prediction is important, but it is not necessary for the driver to intuitively recognize arrival time information of the remote zone as strict as that for a proximate point, and thus, this is suitable also in terms of making a plan for secondary task execution.

In addition, a third zone from the second point (time t1) to a third point (time t2) is displayed along a second time axis (reduction rate hs/h0) as a time linear display remote zone. By displaying the three divided zones in such a manner, it becomes possible for the driver to get hold of information regarding a temporally immediate zone in detail, and to get hold of information regarding zones that are temporally farther, in a limited display space. Note that, if a remote section is displayed while the display mode of the second zone is maintained, it becomes equal to or lower than the visual resolution of humans and further the display resolution limit of the system, it becomes impossible to identify information necessary for plan determination of secondary tasks, and the meaning of the display functionality would be lost. In view of this, the most effective display is one that allows the driver to sufficiently get hold of a temporal sense of zones in an intuitive manner, ends the reduction of the display scale at a phase where a necessary division between an intervention zone and an unrequired zone is displayed appropriately, and displays the following zones again at a constant scale.

Note that the vehicle control system 100 includes default values of times t0, t1, and t3. Because different values of times t0, t1, and t3 may be used for long-distance driving and short-distance driving in one possible manner, the number of each default value is not limited to one, the system may include multiple types of default values, and the driver (user) or the system may selectively use them according to a driving route. In addition, it may be made possible to set the values of times t0, t1, and t3 as desired by the driver (user) in one possible manner.

FIGS. 15(a) and (b) depict examples of driving zone displays to be displayed finally. These are straight driving zone display data extending in one direction according to the driving scheduled time periods of the vehicle. Note that each of arrows depicted at a lower section represents the length equivalent to identical vehicle driving time (unit time) in the driving zone display data depicted in FIGS. 15(a) and (b). The first zone is associated with a smaller number of long arrows, and the third zone is associated with a larger number of short arrows. This means that the first zone is a zone having a short distance which requires a short time for the vehicle to drive therethrough, and the third zone is a zone having a long distance which requires a long time for the vehicle to drive therethrough. The second zone is associated with arrows which become longer as they get closer to the vehicle, and this means that the driving display data of the second zone is displayed such that it changes to correspond to distances which require shorter times for the vehicle to drive therethrough as the second zone gets closer to the vehicle.

Note that, in a case of FIG. 15(a), all the zones of the first zone, the second zone, and the third zone are displayed with a first display width.

On the other hand, in a case of FIG. 15(b), one piece of driving zone display data is generated by linking plural pieces of display data having different time axes according to driving scheduled time periods of the vehicle.

Figure 14:
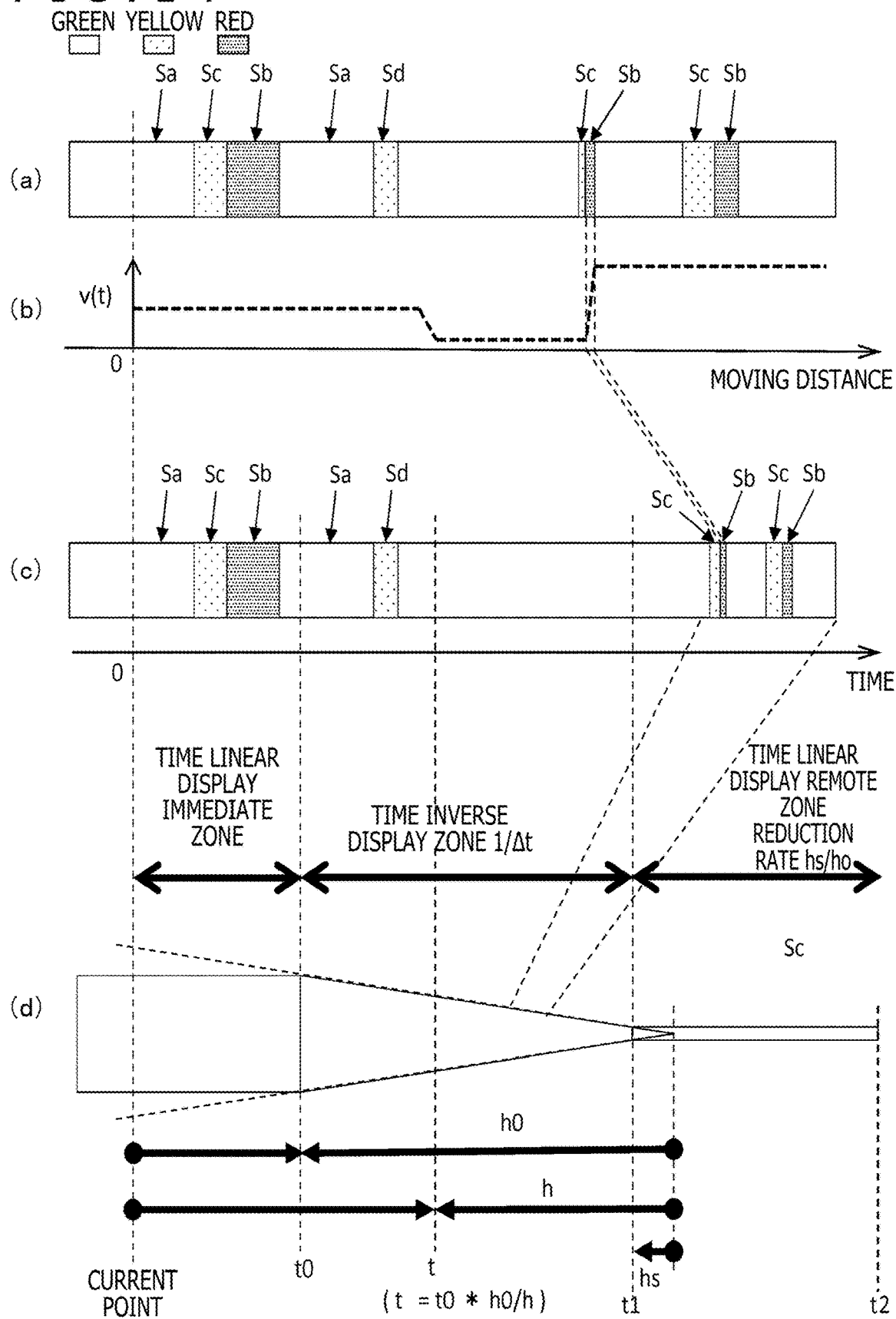
FIG. 14 depicts diagrams for explaining information processing for a display of driving zones on a driving route.

That is, the first zone whose driving scheduled time period of the vehicle comes early and which is from the current point to the first point (time t0) is displayed with the first display width, the second zone from the first point (time t0) to the second point (time t1) is displayed with a display width that changes gradually from the first display width to a second display width which is narrower than the first display width, and the third zone whose driving scheduled time period of the vehicle comes late and which is from the second point (time T1) to the third point (time T2) is displayed with the second display width. As a result, it becomes possible for the driver to visually recognize the degree of size-reduction of the time axes of the second zone and the third zone relative to that of the first zone. That is, while the display mode in FIG. 14 is a display considering only the reduction rate in the advancing direction, by further changing the display widths of a road according to long and short distances artificially in the advancing direction of the display information, the effects of visual perspective which are the same as those attained when one see in an infinite direction along a movement on a road or a map are obtained, and it becomes easier to more intuitively recognize the distribution of driving intervention required zones only by looking at a screen for a moment. In particular, if only the second zone is looked at in a state in which the second zone is rotated by 90 degrees counterclockwise, the display width of the road ahead becomes narrower as the distance becomes longer. This is a display format that provides a visual effect similar to that attained in a case where the driver looks at an actual road in front of the vehicle, and the driver can look at the display data with a sense of distance which is the same as that in a case where the driver looks at the actual road. Accordingly, this can be said to be a display mode that allows the driver to intuitively get hold of an actual sense of arrival at each point, and enables time allocation, without looking at accurate positional memories and thereby making determinations.

Note that, if zones with short time lengths are directly displayed with the time lengths in a section with a low reduction rate hs/h0 as in the third zone, for example, those zones are displayed as very thin zones, and it is predicted that it becomes difficult for the driver to recognize the zones.

Accordingly, even in a case where driver intervention zones (manual driving zones, transfer zones, careful driving zones) actually correspond to lengths of time which are equal to or shorter than a certain length of time, they are displayed as corresponding to the certain length of time. In this case, for example, in a case where there are consecutive transfer zones and manual driving zones, the display of the transfer zones is omitted in some cases. In FIGS. 15(a) and (b), the display of the first manual driving zone Sb in the third zone represents such a state. As a result, it becomes possible to display the third zone whose time axis is significantly reduced, in such a manner that the driver can recognize driver intervention required zones with short time lengths.

In addition, in a case where manual driving zones Sb occur consecutively and intermittently at short intervals in a section with a low reduction rate hs/h0 as in the third zone, they are entirely displayed as a continuous manual driving zone Sb. In FIGS. 15(a) and (b), the display of the second manual driving zone Sb in the third zone represents such a continuously displayed state. The manual driving zone Sb displayed in such a manner actually includes transfer zones Sd and automated driving allowed zones Sa with short periods in addition to manual driving zones Sb as depicted in FIG. 15(c). Note that, as described later, it is made possible to display details, for example, by double-touching the point in a state in which the driving zone display is displayed on a tablet or the like.

The display of driving zones on the driving route mentioned above is updated on the basis of positional information of the user's automobile and acquired LDM update information. Accordingly, the driving zone display is scroll-displayed as time passes as if each zone comes toward the user's automobile. FIG. 16(a) to (d) depict an example of changes of the driving zone display that are seen along with the passage of time. While this example depicts an example in which the second zone is displayed as being dwindling, the same applies also to a case that all the zones are displayed with the same width.

In this case, the movement in each zone in the first zone is fast. In addition, the movement in each zone in the second zone becomes faster as the zones get closer to the first zone than to the third zone, because the reduction of the time axis becomes less significant. Further, the movement in each zone in the third zone is slow because the reduction of the time axis is significant.

FIGS. 17(a) and (b) depict examples of a driving zone display 181 of driving zones on a driving route displayed on a screen of a tablet 182. FIG. 17(a) is an example in a case where the tablet 182 is used in a longitudinally long state. In this case, the driving zone display 181 is displayed in a state in which it is bent from the left side to and along the upper side, and is displayed next to a work window which is an execution screen of a secondary task performed with the tablet 182. FIG. 17(b) is an example in a case where the tablet 182 is used in a laterally long state. In this case as well, the driving zone display 181 is displayed in a state in which it is bent from the left side to and along the upper side, and is displayed next to a work window which is an execution screen of a secondary task performed with the tablet 182. Note that, while the driving zone display 181 is arranged in a bent state on the screen of the tablet 182 in the examples depicted in the figure, it may be arranged straight in a case where there is a sufficient arrangement space, in one possible manner.

Figure 18:
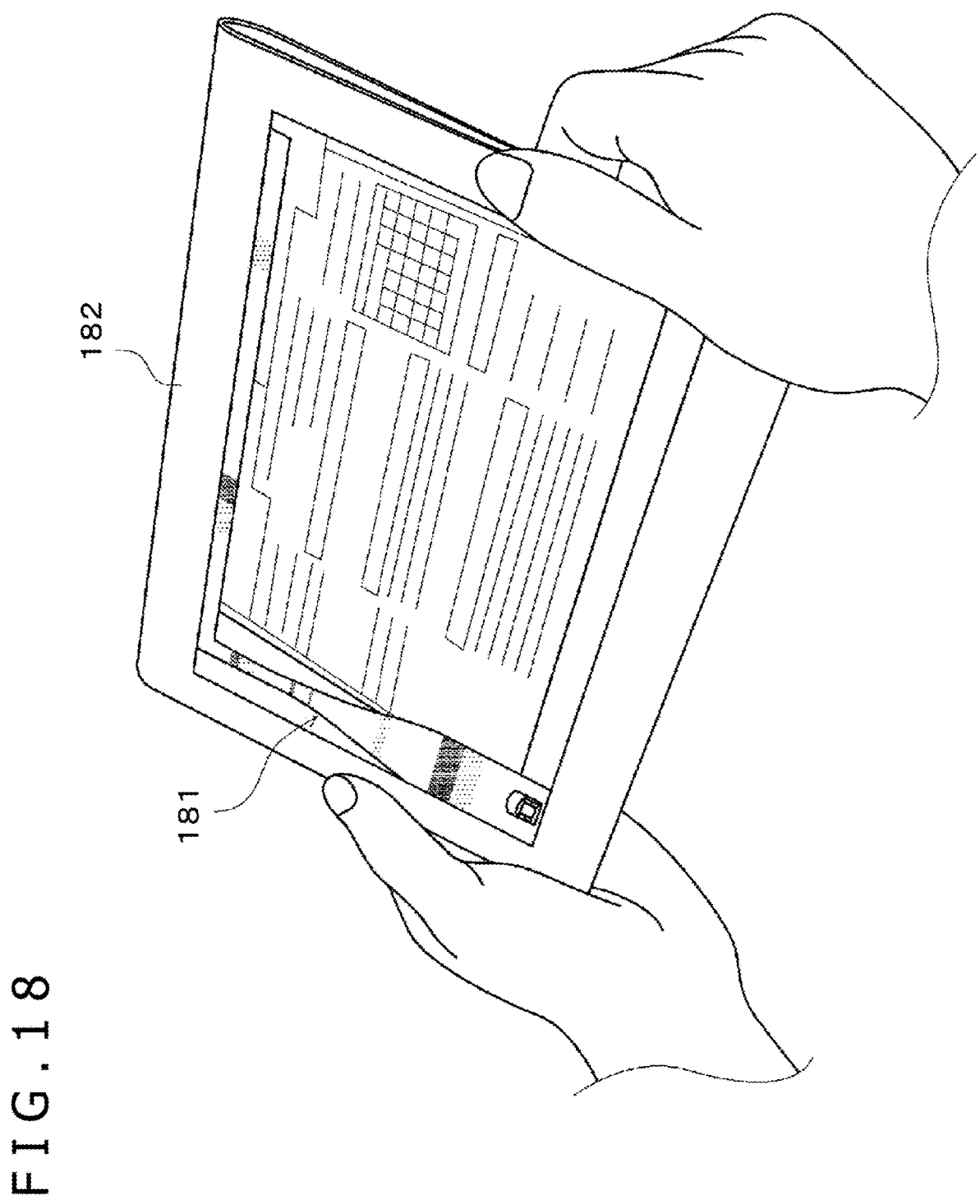
FIG. 18 is a diagram depicting an example of a state in which a driver is actually executing a secondary task by using the tablet.

FIG. 18 depicts an example of a state in which a driver is actually executing a secondary task by using the tablet 182. In this example, the tablet 182 is used in a laterally long state. On the screen of the tablet 182, the driving zone display 181 is displayed in a state in which it is bent from the left side to and along the upper side. Note that it may be made possible for the driver (user) to select, by operation, whether or not to cause the driving zone display 181 to appear on the screen. In that case, for example, in a case where the driving zone display 181 is not on the screen, a driver intervention required zone enters a certain length of time, and a notification is to be given to the driver, the driving zone display 181 may appear on the screen automatically.

In a case where a driver intervention required zone has occurred newly in a currently displayed zone in a state in which the driving zone display 181 is being displayed on the screen of the tablet 182, a display of the driver intervention required zone that has newly occurred occurs newly. In this case, the driver intervention required zone that has occurred newly is displayed as a flashing display for a certain length of time such that it is possible to make a distinction between the driver intervention required zone and the others. This flashing display may accompany an alarm sound that urges the driver to pay attention. Here, cases where driver intervention required zones occur newly include also a case where a careful driving zone changes to a manual driving zone, in addition to a case where a careful driving zone or a manual driving zone occurs newly.

Figure 19:
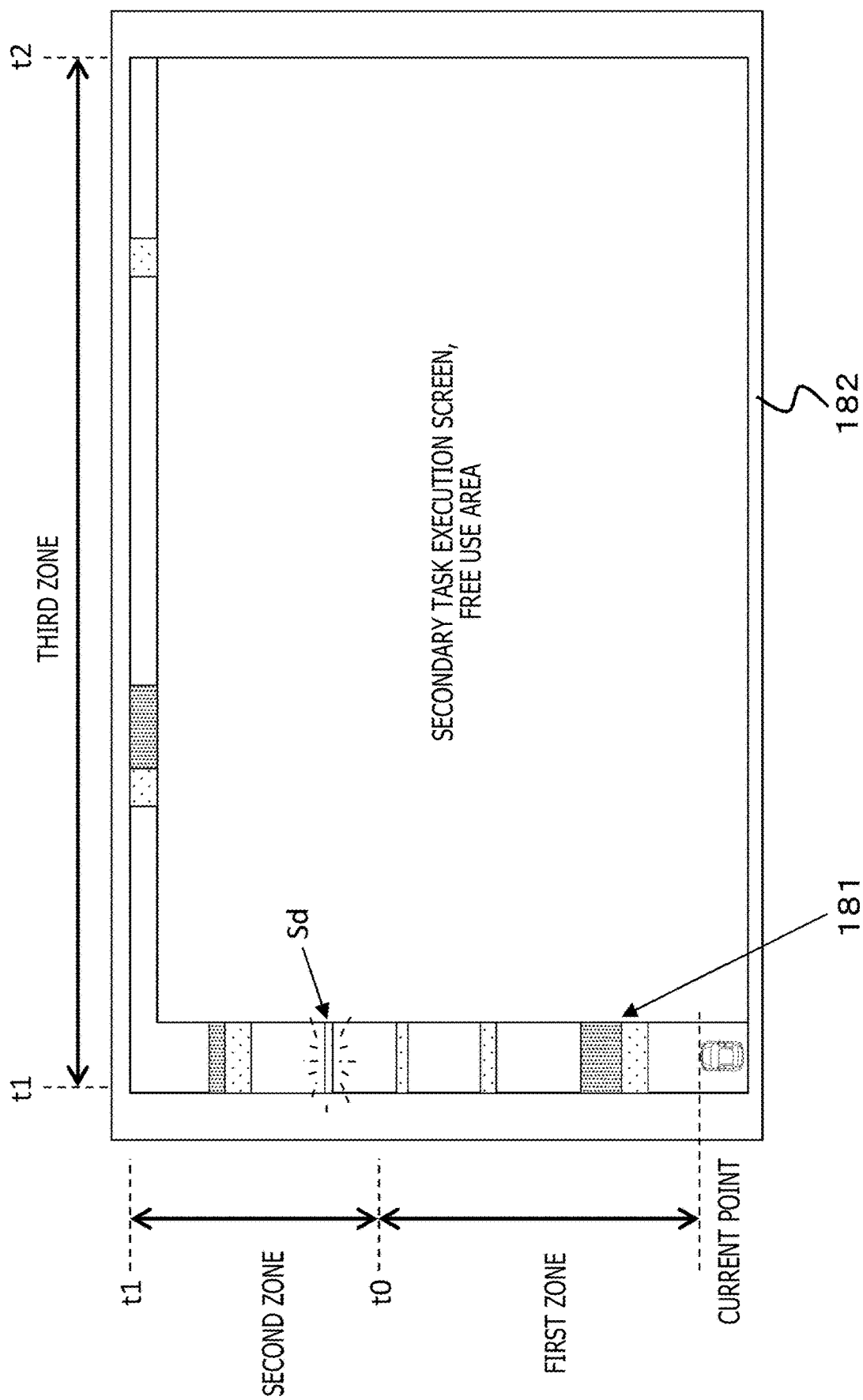
FIG. 19 is a diagram depicting a state in which a careful driving zone Sd has newly occurred in a second zone and a driver is warned of it by a flashing display.

FIG. 19 depicts a state in which a careful driving zone Sd newly occurs in a second zone and a driver is warned of it by a flashing display. Note that, in this case, it may be made possible to stop the flashing, that is, the warning state, when the driver touches a display portion of the careful driving zone Sd being displayed as a flashing display. Alternatively, it may be made possible to stop the flashing, that is, the warning state, when the driver touches an approval screen which is pop-up displayed as a small window when the driver touches the display portion of the careful driving zone Sd being displayed as a flashing display.

Figure 20:
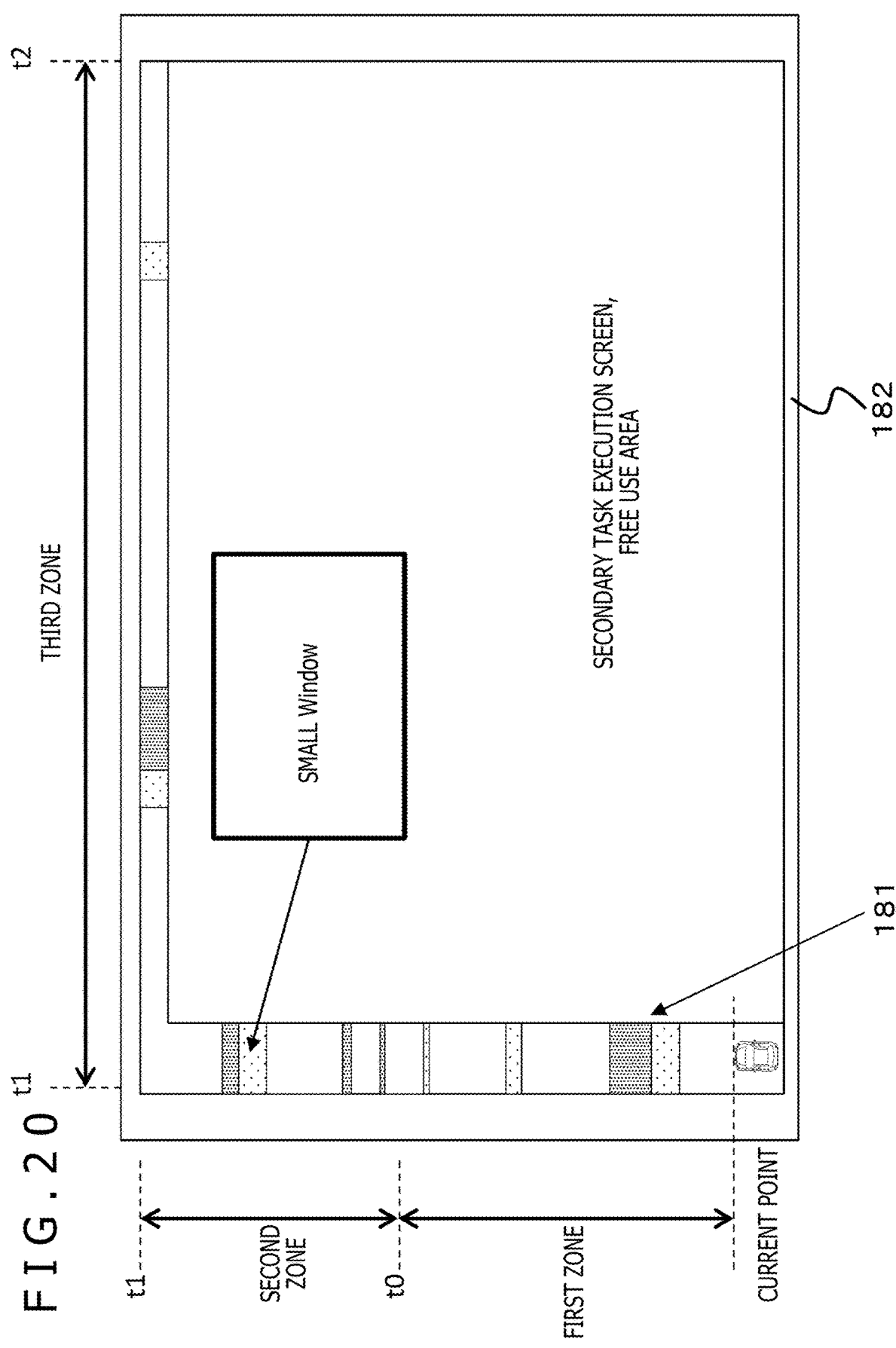
FIG. 20 is a diagram depicting a state in which a small window is displayed as a pop-up display on the screen of the tablet.

In addition, in a case where the driver (user) double-touches and specifies a certain point in a state in which the driving zone display 181 is displayed on the screen of the tablet 182, a small window is pop-up displayed, and a display associated with the point is displayed as depicted in FIG. 20, for example.

Figure 21:
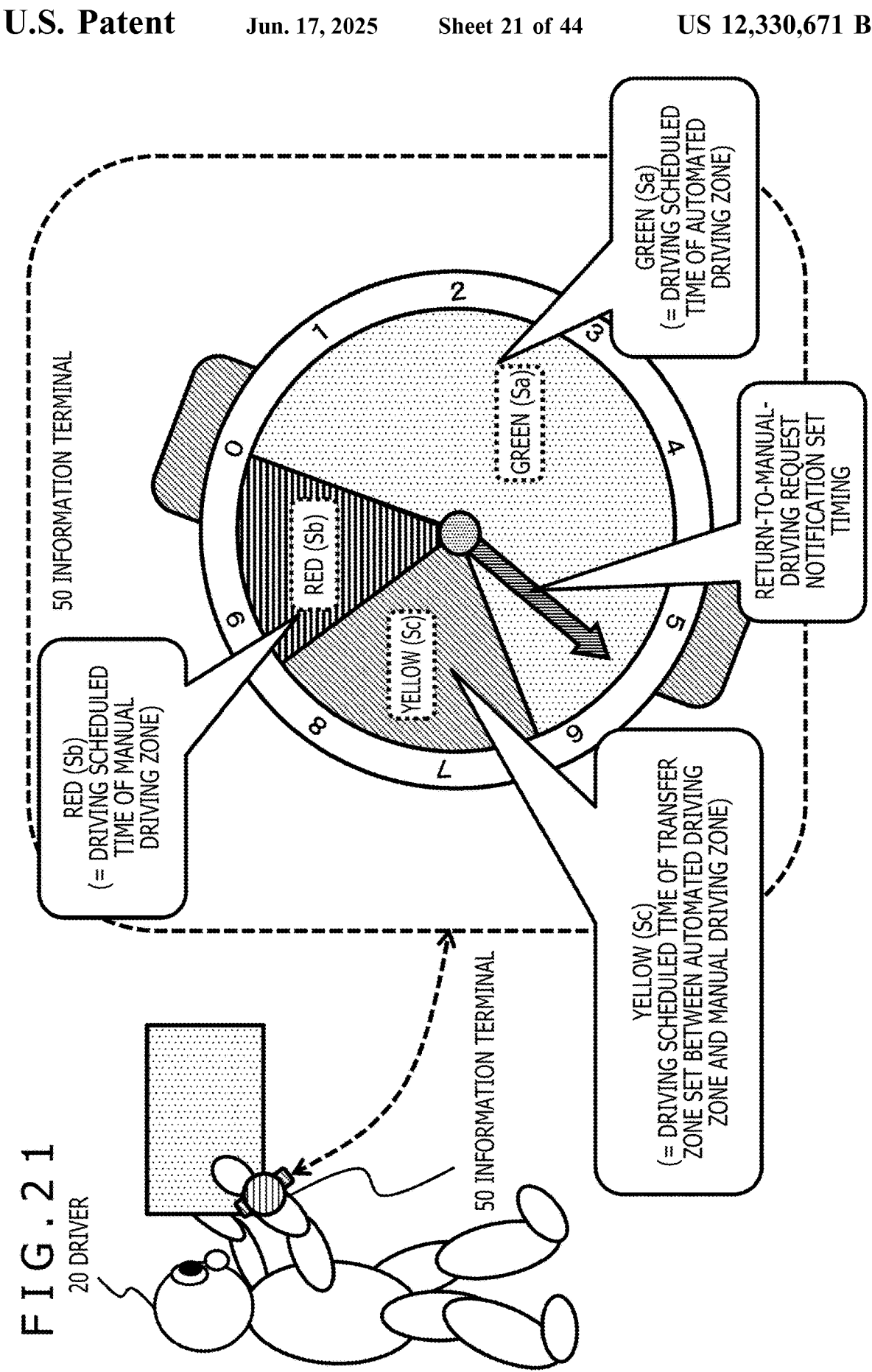
FIG. 21 is a diagram for explaining a use configuration example of a wristwatch type information terminal according to the present disclosure.

Further, as depicted in FIG. 21, in another possible configuration, a display similar to the ones explained with reference to FIG. 14 to FIG. 20 on which different zones are represented by different colors may be displayed on the wristwatch type information terminal 50 explained with reference to FIG. 5 and FIG. 6 earlier.

An example depicted in FIG. 21 is an example in which information is displayed with respect to such zones as automated driving zones or manual driving zones on a road according to a driving route that is determined when the driver sets a destination. The numerical values, 0 to 9, around the display section represent lengths of elapsed time, zero to nine minutes, after the current time. The entire display area represents zone information of a driving schedule of an automobile from the current time (0) to ten minutes thereafter.

On the driving route, there are an automated driving zone Sa and a manual driving zone Sb, and further, there are a zone Sc for transfer from automated driving to manual driving, a careful driving zone Sd set in the automated driving zone Sa, and the like. Circular driving zone display data circumferentially extending according to the driving scheduled time periods of the vehicle is displayed.

In the display example depicted in FIG. 21, the following three different display areas are set on the display section of the information terminal 50.

(Sa) Automated driving zone Sa (=green display)
(Sc) Transfer driving zone Sc (=yellow display)
(Sb) Manual driving zone Sb (=red display)

The display example depicted in FIG. 21 represents a driving schedule of the automobile for ten minutes from now. That is, the display examples represent that (Sa) the automobile is scheduled to drive through an automated driving zone Sa (=green display) from the current time point to six minutes and ten seconds thereafter, then (Sc) the automobile is scheduled to drive through a transfer driving zone Sc (=yellow display) from six minutes and ten seconds after the current time point to eight minutes and 40 seconds after the current time point, and then (Sb) the automobile is scheduled to drive through a manual driving zone Sb (=red display) eight minutes and 40 seconds after the current time point.

Note that the information terminal 50 receives, via a communication section, driving scheduled time information of each zone that is computed by the data processing section 11 in the automobile 10 on the basis of information regarding a driving speed of the automobile 10, or an average speed of vehicles on the driving route of the automobile 10, and displays the driving scheduled time information.

It becomes possible for the driver 20 to check a length of time that is left until the automobile enters a manual driving zone by looking at the display information of the information terminal 50, and to return to the driver's seat after terminating work in a box 21 so that she/he will be ready in that time.

Note that, in the example depicted in FIG. 21, the driver 20 can recognize that the automobile enters a manual driving zone approximately eight minutes and 40 seconds after the current time on the basis of the display on the information terminal 50, and proceed with work such that she/he will return to the driver's seat by then.

In addition, an arrow is displayed further on the information terminal 50 depicted in FIG. 21. This arrow is set corresponding to a time of notification of a return-to-manual-driving request, for example, a time of switch to the display depicted in FIG. 5, or a time of notification of a warning to the driver 20 by performing alarm output or vibration activation. This notification timing is determined on the basis of information regarding at least any one of the alertness of the driver and the position of the driver, on the side of the moving apparatus (automobile 10), for example. The determined notification timing information is transmitted to the information terminal 50. The time display of a notification by using an arrow is merely an example, and it is not necessary to limit means to an arrow as long as it is possible to visually present a time interval by giving means a functionality of visually urging the driver to pay attention by using a different color, a mesh display, flashing or the like, and so on. Note that a process of computing an optimum notification timing executed at the moving apparatus is described later.

The information terminal 50 executes a return-to-manual-driving request notification at a notification timing received from the moving apparatus. That is, at the notification timing determined by the moving apparatus, the information terminal 50 executes a process of at least any one of a display process, alarm output, and vibration activation explained with reference to FIG. 5 earlier. Note that the notification setting can be changed or stopped by the user.

Note that, while the display section of the information terminal 50 is depicted as a circular display section in the present embodiment, this is an example, and the shape of the display section is not limited to a circular shape, and can be set variously to an oval shape, a rectangular shape, or the like.

Figure 22:
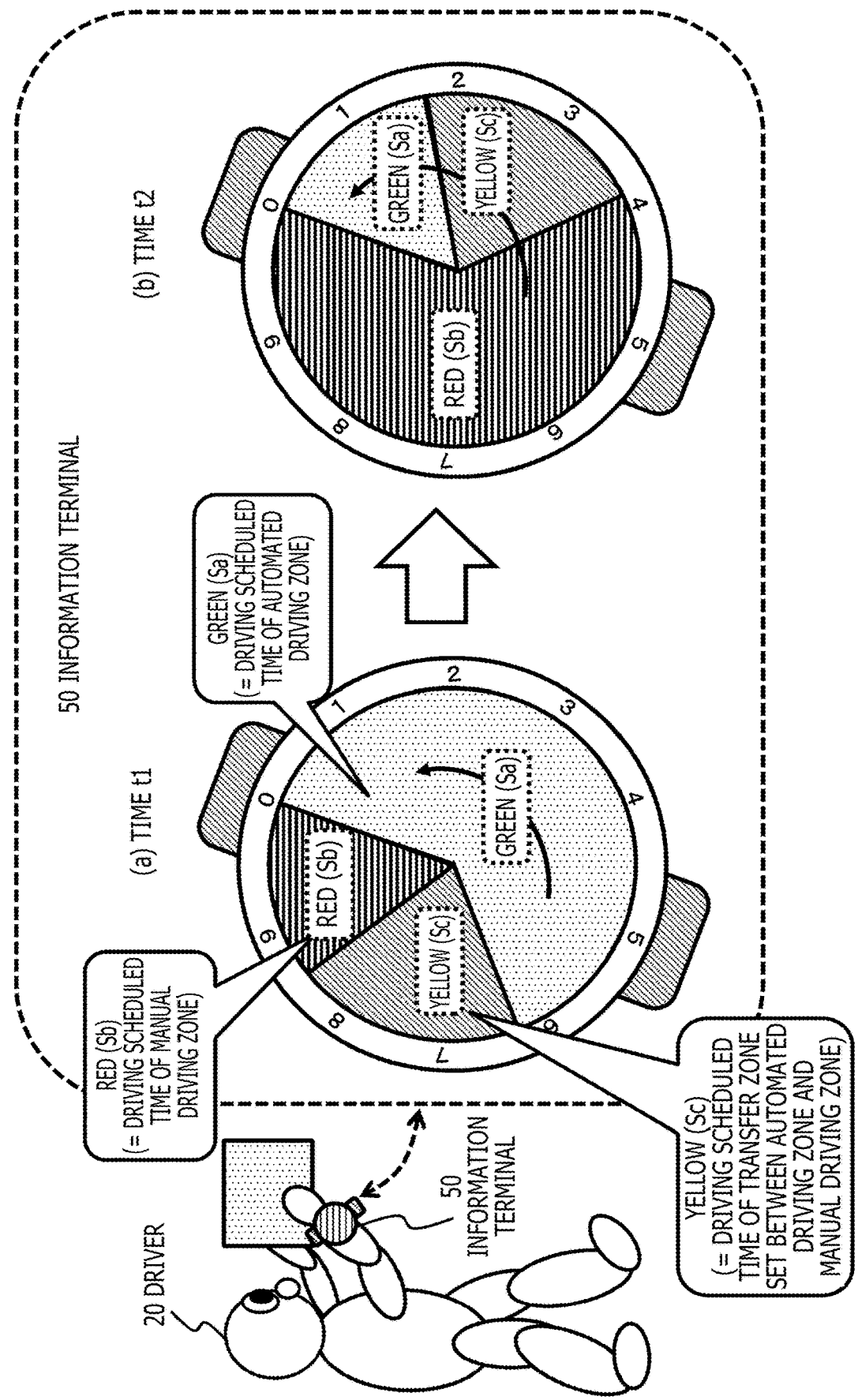
FIG. 22 is a diagram for explaining a use configuration example of the wristwatch type information terminal according to the present disclosure.

FIG. 22 is a diagram depicting a change example of display data of the information terminal along with the passage of time. FIG. 22 depicts an example of display information of the information terminal 50 at time t1 and display information of the information terminal 50 at subsequent time t2.

As an example of display data at time t2, display data as of approximately four minutes after time t1 is depicted.

The display data of time t2 represents that the automobile is scheduled to drive through a manual driving zone Sb (=red display) approximately three minutes and 50 seconds after the current time point.

At the time point of time t2, the driver 20 can recognize that the manual driving zone Sb (=red display) is approaching, on the basis of the display of the information terminal 50, end work in hurry, and start a preparation for a return to the driver's seat.

Note that the information terminal 50 has an alarm output functionality or a vibration functionality, and performs alarm output or vibration activation, for example, when a length of time that is left until the manual driving zone Sb (=red display) has become a length of time that is specified in advance (e.g., 1 minute), and gives a warning notification to the driver 20. Note that the activation time of the alarm or the vibration can be changed or stopped by user setting.

Figure 23:
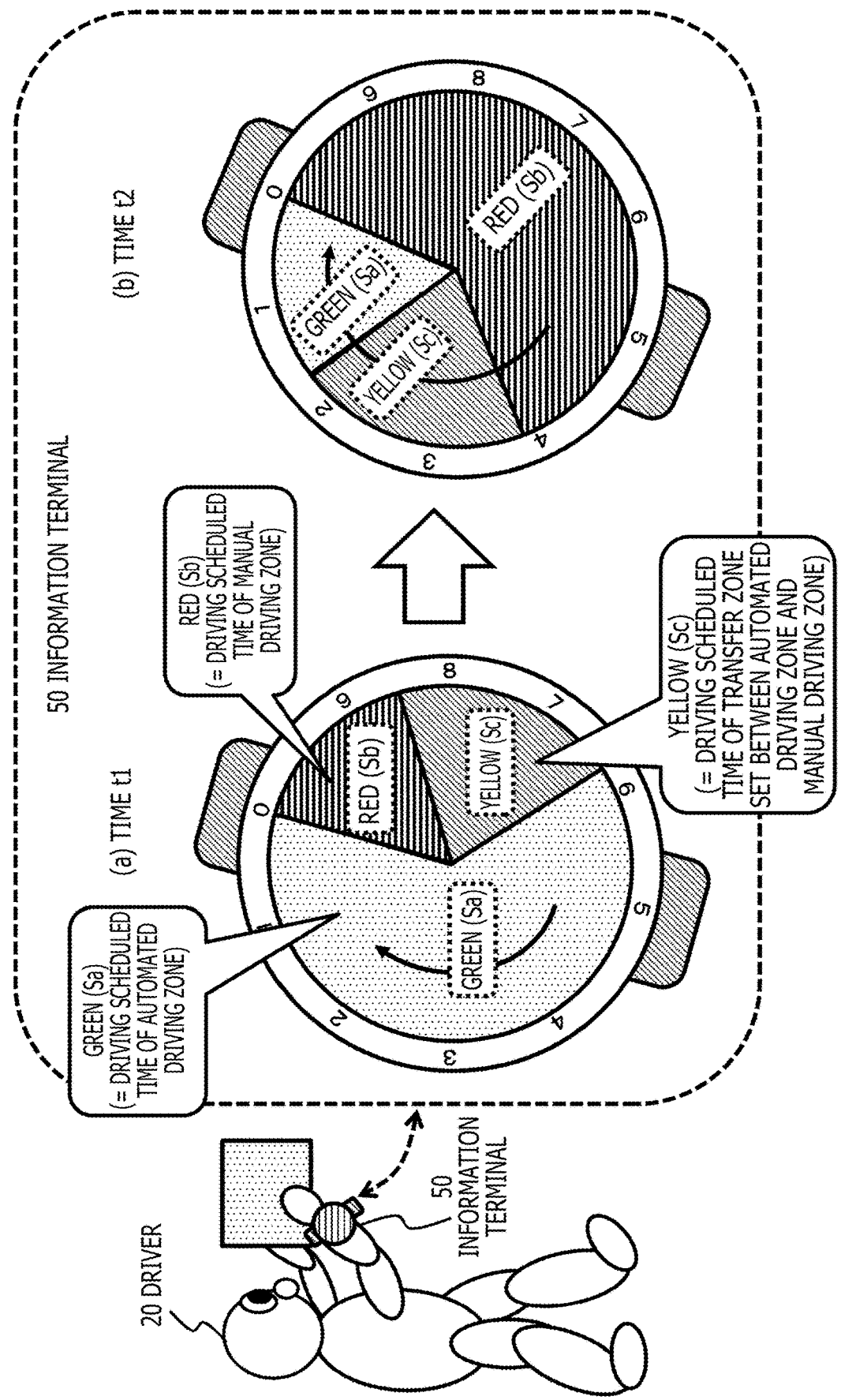
FIG. 23 is a diagram for explaining a use configuration example of the wristwatch type information terminal according to the present disclosure.

Note that, while the information terminal 50 explained with reference to FIG. 21 and FIG. 22 is configured to display display data which is rotated counterclockwise along with the passage of time, the rotation direction of the display data may be set such that it rotates clockwise as depicted in FIG. 23, for example.

5. Information Provided to User (Driver) and Process of Notification to User

Next, information provided to a user (driver) and a process of a notification to the user are explained in detail.

Hereinafter, each of items described below is explained in the following paragraphs.

5-1. Detailed Configuration of Driving Zone Display Data and Process of Updating Driving Zone Display Data
5-2. Display Example of Additional Information for Driving Zone Display Data
5-3. Examples of Processes of Notification and Warning Using Animations
5-4. Other Display Process Examples First, the importance of information provision to a user (driver) and a process of a notification to the user is explained before the explanation of the items described above.

As mentioned above, in an automated driving allowed zone where use of automated driving is allowed, it becomes possible for the driver not to perform driving steering, but to engage in a secondary task other than driving steering.

However, in a case where the automated driving allowed zone ends and the vehicle enters a manual driving zone, the driver needs to normally return to manual driving steering from the secondary task before the vehicle enters the manual driving zone.

A determination as to whether or not the driver is in a state in which she/he can normally return to manual driving steering from the secondary task is performed by the automated-driving control system of the vehicle, for example. However, it is not rare that it is difficult for the automated-driving control system to highly precisely identify the state of the driver.

Allowing the driver to return to manual driving in a state in which the automated-driving control system cannot identify the correct alertness state of the driver accompanies a danger.

In such a situation, the automated-driving control system of the vehicle starts a process aimed at accident avoidance called MRM (Minimum Risk Maneuver) of the vehicle, specifically, a pull-over action such as deceleration or a stop for pulling over the vehicle.

However, if many vehicles perform deceleration or stopping processes or the like based on the MRM control every time an automated driving allowed zone ends, there will be many decelerated or stopped vehicles at end points of automated driving allowed zones. As a result, traffic jams occur on roads. In addition, there is a possibility that roads are completely blocked if the roads are too narrow for vehicles to pull over, as in one-lane roads, and this will cause a significant negative social impact.

As a measure against such a problem of MRM, there is a measure in which pull-over lanes or the like are provided so as to allow decelerating vehicles and stopped vehicles to stay before end points of automated driving allowed zones. However, such an improvement of infrastructure requires a huge amount of costs for obtaining land and so on, and also it is not always the case that there is land where pull-over spaces can be constructed near end points of all automated driving allowed zones.

Note that automated driving functionalities are still in a development phase, and it still takes time until completely automated driving becomes available. It is expected that, until then, frequent switches between automated driving under the monitoring by a driver and manual driving are performed. In such a phase, it is considered that the level of disengagement of a driver from driving steering is limited.

However, even in such a situation, that is, even in a situation where it is expected that frequent switches between automated driving and manual driving are performed, it is necessary to check before entrance into a manual driving zone that a driver is capable of normal manual driving. In a case where it is predicted that transfer is difficult, it is required that the driver be advised to accept early abandonment, that is, the driver is prompted to agree to abandon a return to manual driving, and, on the basis of the agreement, the automated-driving control system of the vehicle takes pull-over actions that will not interfere with other following vehicles.

It is expected that, in the future, automated driving functionalities will evolve, and automated driving allowed zones will also become gradually longer. That is, it becomes possible for a driver who is a user of automated driving to stably use an automated driving functionality for a long period of time. However, it is expected that, in such a case, drivers rely excessively on automated driving functionalities, and the necessity for returning to manual driving from automated driving will be felt less.

That is, it is expected that, if drivers get used to use of automated-driving control systems, and further, the number of return-to-manual-driving requests from the systems decreases gradually, the alertness of drivers at the time of use of automated driving lowers, and the level of carefulness necessary for return to manual driving will lower gradually. In addition, there is a possibility that, if use of only automated driving without performing manual driving lasts for a long period of time like several months or one year, drivers will not even expect that they will have to return to manual driving.

As mentioned before, while a notification or a warning is given in a case where a driver is requested to return to manual driving, if unnecessary notifications are persistently and repeatedly given from a system in a case where it is not required to make a transition to manual driving or driving with attention of a driver, there is a possibility that the driver undesirably learns that notification executed by the system is not essential for actual action determinations. If the driver learns such a thing, she/he will not react to a "notification" until the driver receives a stronger stimulus such as a transfer warning, and there is a possibility that transfer event recognition and handling thereof will be late.

Accordingly, preferably, a notification process that keeps a balance between two aspects that it is not cumbersome for a driver and that it makes the driver pay attention is performed.

In a case where a driver has started a secondary task during execution of automated driving, thereafter, the driver cannot know when a return-to-manual-driving request will be given in a case where there is no information regarding points of transfer to manual driving, and the driver needs to perform the secondary task in a state in which she/he is mentally nervous or uneasy. However, the nervous or uneasy mental state is temporary, and there is a possibility that, as a sense of risks become weaker, the driver is undesirably immersed in the secondary task gradually.

Such a meaningless nervous state and immersion into a secondary task in an area proximate to a point of transfer to manual driving cannot be said to be preferred states.

In order to prevent such a situation, the automated-driving control system ergonomically preferably present manual driving transfer related information to a driver in advance, cause the driver to prepare for a start of manual driving until the time when the vehicle approaches a manual-driving transfer point and start a prompt returning procedure. That is, preferably, the driver performs the secondary task while acquiring information regarding the near future that can be known. By acquiring preliminary information regarding the future also during the secondary task execution, it becomes possible for the driver to return to manual driving smoothly after receiving a notification for a return to manual driving.

Not only humans, but many of living forms that have developed action determinations necessary for survival in the course of evolution become mentally ready in advance in order to be able to start actions with one final stimulus. Nerve firing for an action determination occurs finally, and an action is started.

Many of such processes for being mentally ready are executed unconsciously. Many living organisms sharpen a sense for identifying targets to watch for from various types of information such as ambient sounds, smells, wind directions, the movement of clouds in the sky, coldness, or behaviors of animals and the like around them, and take actions. In a similar manner, in order to make determinations for final actions faster, it is important to acquire complementary information for making determinations more multi-dimensionally, and in particular, visual and auditory information is effective. Humans use different memories for different types of information to make determination on various risks, and make final action determinations. Further, humans often check the likelihood of information used for risk determinations, and this process also provides an effect of reducing overlook and delays of handling.

Examples of action determinations made by humans by using future predictions include an example of action determinations made by humans by relying on prophecies and fortune-telling, for example. It is important in action determination to keep a risk balance, and by assuming a mental attitude with weights being given to elements that are highly influential to determination and using the mental attitude for determination, it becomes possible to make prompt and correct action determinations in response to situations that are present at those very moments.

Along with the introduction of automated driving, if users completely concentrate their minds on secondary tasks and are blocked away from any future predictive information during automated driving, it becomes difficult for the drivers to follow correct action determination criteria when they return to manual driving. Accordingly, even when the drivers receive notifications for returns to manual driving eventually, they cannot make correct situation determinations, and may even suffer from panic disorder.

Regarding the level 3 of automated driving defined by SAE (Society of Automotive Engineers), it is required that drivers always wait in a state in which they can return to manual driving. However, having to stay for a long period time in a nervous state in which a driver, not actually concentrating her/his mind on other secondary task works nor driving, places her/his hands on a steering wheel only for waiting for a return to manual driving can be regarded as a torture.

In view of this, it is preferable to provide a system that continuously provides information to a driver in advance and allows the driver to check, by her/himself, a timing when the driver needs to return to manual driving. For example, in one desirable mode, information that allows prediction of a point of switch from an automated driving allowed zone to a manual driving zone and the like is provided as appropriate, and a driver can engage in a secondary task without feeling hurried, while receiving the information.

It should be noted, however, that, even if simply a length of time left until an end point of an automated driving use allowed zone or an end point of a zone where automated driving use with attention of the driver is allowed is displayed uniformly as information to help a determination regarding actions for returning to manual driving of a driver, this cannot necessarily be said to be effective as a measure for causing the driver to be mentally prepared sufficiently.

This is because the mentality of a human for action determinations is a result of various risk balances. A human uses information regarding the situation of each of many combined factors, an accumulation of risk balance stimuli, and the like to make determinations for optimum actions. For those determinations, the human also performs detail checking and rechecking based on initial information in some cases. If a risk approaches, a group of various synapses that are to be triggered by determinations for risk avoidance is set to be in a standby state in which they are more sensitive.

Figure 24:
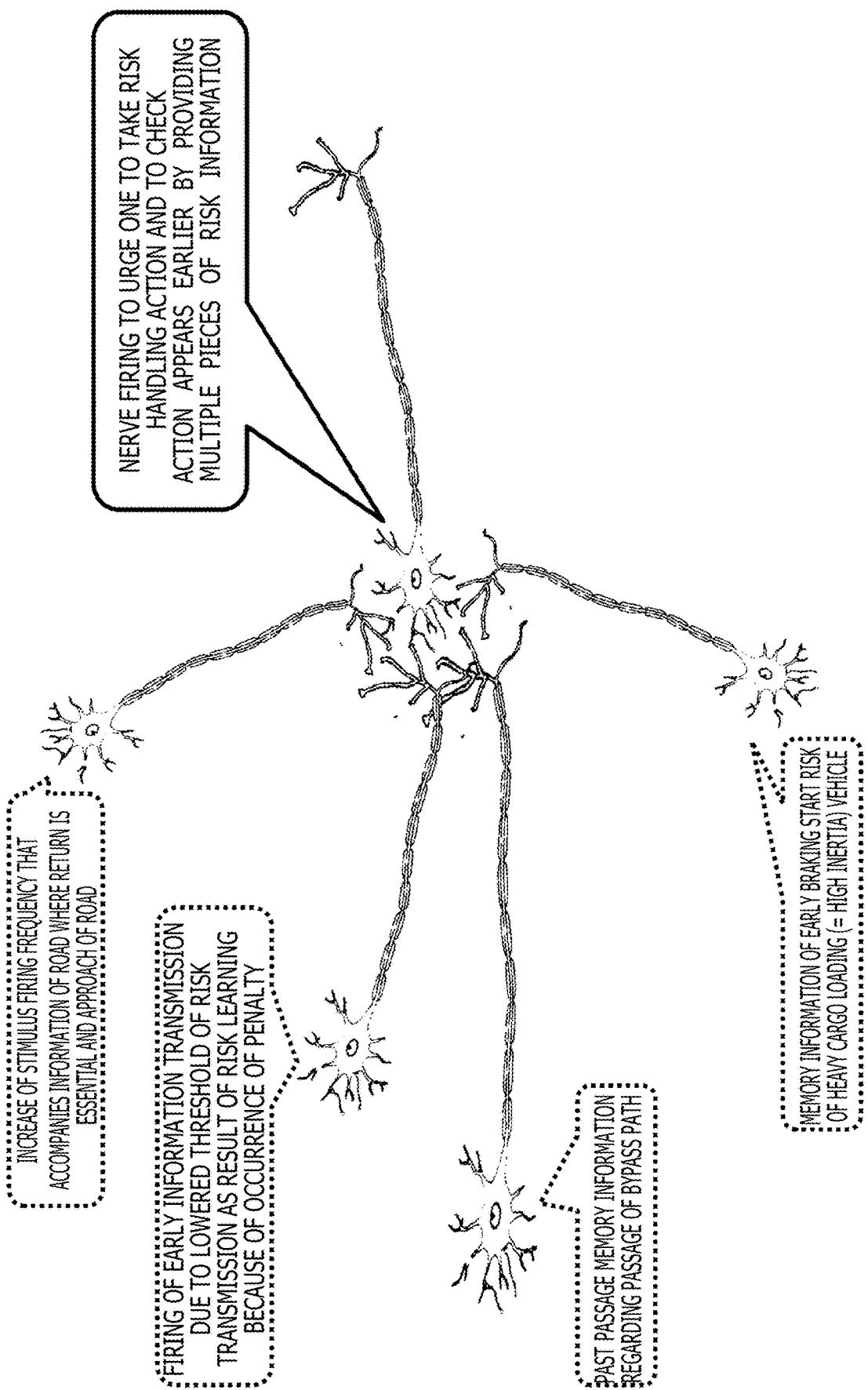
FIG. 24 is a diagram for explaining the concept of neurotransmission in which combined/hierarchical information provision enhances a consciousness level for returning.

FIG. 24 is a diagram for explaining the concept of neurotransmission in which combined/hierarchical information provision enhances a consciousness level for returning.

In other words, a driver makes determinations for optimum actions on the basis of a balance between risk information unique to the driver as an individual and results of a prediction regarding the future that follows selected actions.

However, because such action determinations based on various types of information are not made consciously in various daily action determinations, humans do not sense that the various types of information are contributing to the action determinations.

In order for a driver to perform favorable transfer when transfer from automated driving to manual driving occurs, before the driver starts commencing an actual driving action, predictive information related to the action plays an important role for smooth transfer.

For example, on a freeway, if a vehicle does not exit the freeway at an appropriate timing at an interchange (IC), the vehicle cannot exit the freeway until the next IC. If the vehicle cannot exit at an appropriate timing, this leads to unnecessary freeway driving, and generates a risk of a detour.

In order to reduce such a risk, preferably, the vehicle is moved to a lane that is optimum for exiting not immediately before the exit but well before the exit, and a preparation for exiting at the exit is done while checking a deceleration start point before the exit by looking at an exit sign or the like.

However, if prior information necessary for performing such an optimum action is insufficient, it becomes too late to make an action determination for exiting at the exit actually, resulting in being unable to exit at the exit and inevitably having to continue driving on the freeway.

Note that a person who has an experience of making a wrong determination in the past and being unable to exit at an exit at an appropriate timing accumulates information necessary for optimum determinations by checking prior exit signs and so on, in order to make right determinations earlier at the next time of use of a freeway.

Information for allowing a driver to make a determination by her/himself to end a secondary task and try to return to manual driving during secondary task execution during automated driving includes event occurrence timings, risk information of each piece of selection information, many pieces of other information that influence actions, and the like.

Each of these pieces of information becomes an additive nerve stimulus that prompts a driver to make an individual determination hierarchically, and the sum total of such various nerve stimuli causes firing of a neuron that controls determinations. Then, an optimum action determination is executed.

Ergonomically, one action determination is made on the basis of numerous unconscious risk balancing. If there is a larger amount of foreseeing prior risk information, it becomes possible to make appropriate action determinations based on the larger amount of information. In addition, weighting of risks also serves as an important influencing factor in action determinations.

Action determinations of humans are made unconsciously not only with respect to determinations according to a simple time axis, but also with respect to determinations regarding risks at the time of plural action selections in a case where an action is taken and a situation is handled, a case that an action is not taken and a situation is not handled, and other similar cases.

Accordingly, in order to allow a driver to make appropriate action determinations, it is important to provide information to the driver by using an interface that presents various risks to the driver, that is, by using an HMI (Human Machine Interface).

However, ideally, these types of predictive determination information are not uniform information, and are information that corresponds individually to each driver. For this purpose, in a preferred configuration, personal identification of a driver is performed, and information is presented to each driver according to the characteristics of each individual necessary for safe driving of a driven vehicle after converting, in terms of an arrival time, a return notification or warning point according to a length of time that is required for a safe return to manual driving for each road zone on which the vehicle is driving, avoidance selection information, and the like on the basis of a predicted driving speed in each road zone.

By using an HMI as an interface for performing such information presentation, it becomes possible to allow a driver to appropriately determine a secondary task that can be performed during automated driving, making it also possible to provide the driver with information that becomes necessary for risk determinations at each point during automated driving.

Information that is provided as the vehicle approaches a manual driving zone works on the driver as information for preparation of a cautious mentality necessary for an action determination, and it is expected that the driver is caused to perform appropriate transfer handling that is separately performed for each case, and strikes an appropriate balance.

One piece of information that is important as information provided to a driver is choice information for each risk of handling required at each manual-driving transfer point. Depending on handling executed by the driver, the system inevitably has to perform an emergency stop or an emergency pull-over operation of the vehicle in some cases. In this case, interference of passage of the following traffic occurs.

In addition, depending on handling executed by the driver, different situations at various levels according to such situations as route changes to low speed routes deviating from scheduled routes, pull-over stops at resting spaces, or imposing fines occur in the system.

If the driver understands various risks on the basis of information provided to the driver, the driver can take correct preparatory actions for not failing in transfer.

Note that preparatory actions are not necessarily limited to physical actions, and may be conscious preparations necessary for transfer. Points of switch from automated driving use zones to manual driving zones are changed according to situations of roads, driving dynamics characteristics of users' vehicles, and the like in some cases, for example. Additionally, timings for return-to-manual-driving request notifications to drivers and risks at the time of returning also change. Accordingly, drivers are required to handle situations according to determination criteria that differ depending on individual cases.

Information obtained by acquiring prediction information is important as information necessary for consciously preparing for action determinations. It should be noted, however, that in a case where road information or the like provided by the system is information lacking credibility, for example, the prediction information loses its meaning.

In view of this, it is necessary to efficiently provide dynamic information based on information regarding roads and traffic ahead on a driving route that is acquired for each zone from LDM or a group of leading vehicles in a form suited for the driver as appropriate.

Humans obtain information regarding the surrounding environment by using many sensory organs. However, if humans attempt to feed all pieces of information input simultaneously and in parallel from all those sensory organs without weighting them to the brain and to process those pieces of information, information overload occurs immediately, and the humans will be panicked, being unable to even transfer the information through nerves.

In order to prevent this, as an instinctive functionality for preventing delays of action determinations due to information overload, humans have developed a functionality of performing selective filtering of information self-defensively.

Accordingly, for example, if many pieces of information provided from a system at the time of use of a vehicle is information lacking credibility, the provided information is classified as unnecessary information that brings regarding a confusion to determinations even if those pieces of information are information which is important as factors for determinations of action risks. That is, it becomes disposal-target information of filtering, and information provision loses its meaning.

As such, transfer-related information to be provided to a driver is desirably provided with additional symbol-based information that is simple, does not require mental interpretation, and is associated with risk action determinations.

In addition, details of a transfer action become more important as the timing at which a determination needs to be made becomes sooner. Thus, for example, if all pieces of information are presented at the planning phase that is before driving is started and at which a driving schedule is determined, the driver is unable to catch up with the thinking and gets confused.

Accordingly, information provision is preferably performed in a form that relevant information at approximately several minutes to approximately several dozens of minutes in driving is kept being provided as needed. Relevant information beyond the time range is presented in a simplified form. For example, only information of each zone and summarized information of transfer importance are presented at a compressed scale. Note that, in another possible configuration, a temporary expanded display or detailed display may be displayed according to an input of a driver as necessary.

In addition, in a case where automated driving allowed zones, manual driving zones, further, switching points between zones, and the like are displayed as display information, index information to serve as milestones on a map is also presented preferably along with displays of individual points at an arrival-time scale that is calculated by simple division by a road average traffic speed for each road zone. By such a display process, it becomes easier for a driver to associate the information with memory information, and this is effective for enhancing the consciousness for necessity of transfer in the consciousness of the driver. In particular, if a vehicle is driving on a familiar road, pieces of the memory information complement with each other even if the importance of transfer that is demanded at each point varies depending on the situation of traffic jams on the road. Thus, the consciousness level regarding transfer required times/points/geographical points can be kept higher.

As mentioned thus far, in order for transfer from automated driving to manual driving to be carried out successfully at a high probability, it is necessary to heighten the consciousness of a driver in transfer preparation to the level necessary for manual driving in advance before a point at which the transfer is necessary, that is, before an automated driving use allowed zone ends.

In order for transfer to be carried out successfully at a high probability, it is necessary to make a driver ready for a start of manual driving effectively before arrival at a transfer start point. For this purpose, a technique as the one that provides, for example, symbolic information that enables action risk determinations along an arrival time axis is effective as an HMI technology, for example.

In summary, in a case where a driver uses a vehicle in an automated driving mod and executes a secondary task that can be executed during that time, it is effective to perform processes based on the following information as processes for appropriately generating the consciousness of the driver for returning and keeping the consciousness.

(Information 1) Driver-specific return delay time information that is obtained by self-learning of driver-specific states that are required for returning (return time, actions of checking return notifications, actual return behaviors/action histories, etc.)

(Information 2) Return proper geographical point information influenced by zone-specific characteristics of roads (transfer success rate expected value (RRR: Requested Recovery Rate), risks of curves or the like, avoidance choices, penalties at the time when avoidance is impossible, etc.), and vehicle-specific characteristics (Information 3) Choice information in a case where returning is impossible On the basis of these types of information, a manual return notification timing for a driver is determined.

Further, in a case where a driver does not start an appropriate action for returning to manual driving in response to a return notification, in a case where the start or a procedure thereof is late, or in a case where a system performs a preventive process such as deceleration or accident avoidance due to deterioration of the return quality, a penalty is generated for the driver and recorded.

In addition, plural layers of information with which risks can be associated, to be choice information regarding returning determination actions that a driver can take before an end point of an automated driving use zone is presented. By this information presentation process, it is possible to give the driver knowledge information necessary for risk determinations for different returning actions. That is, a sudden transfer notification is not given to the driver, and information with different risk levels is constantly provided.

In addition, information regarding work risks that arise when a secondary task is continued is also presented along with the information described above, to enhance the consciousness for returning of the driver at an early stage. If a secondary task is continued, the return-to-manual-driving quality after a transfer notification is affected. Because of this, work risks that arise when the secondary task is continued are given intentionally. For example, in a case where the driver forcibly continues a secondary task that is carried out with information input equipment such as a tablet terminal, visual interference with work data being executed or loss of information being treated is generated. By carrying out information provision linked with such a penalty, an early risk determination for avoiding the loss of information is made by the driver, and it becomes possible to gradually put a consciousness improvement habit for prioritizing returning into the mind of the driver.

By performing information presentation to intuitively link operation of lowering the return quality such as a returning delay of manual driving and a penalty to be imposed as an influence of it in such a manner, a user (driver) of automated driving can be conscious of acquisition of information regarding a start of manual driving even at a phase where she/he has not received a direct return-to-manual-driving request notification. As a result, instead of starting transfer preparation for the first time after receiving a notification of a manual driving transfer request, the driver can acquire in advance priority information regarding an action determination with respect to a notification on the basis of choice information predicted in advance, make an action determination, and start a preparation for transfer to manual driving at an earlier phase.

In addition, humans recheck risks according to the severity of prior information to which the driver needs to pay attention, with respect to information that can be risks on the basis of experiences and prior information up to that time point. If something appears suddenly when one has not obtained prior information at all, the brain cannot make an immediate determination, and takes a simple reflexive avoidance action. In view of this, in order to avoid such sudden information input, habitually, humans regularly recheck information that can approach in normal life actions as appropriate, and makes action predictions. That is, whether a person acquires information necessary for a prediction regarding an approaching risk depends on the frequency and a checking method of rechecking information according to the necessity for prior information that arises from the risk. While information itself such as LDM obtained from the environment of a road on which the vehicle is driving includes information that affects risk determinations, by further giving a penalty as artificial risk provision to secondary task work contents in a case where handling of transfer to manual driving is delayed, it becomes possible to imaginarily generate the necessity for prior checking. In such a manner, by actively providing the driver with multiple types of risk information, the driver starts rechecking risks as a situation that requires a return to manual driving approaches, deterioration of the return quality due to return delays or the like is prevented, and a safer return is realized.

By taking into consideration the situations of a road, the state of a driver, the ability for returning, the dynamic behavior of a vehicle, and the like in combination, and further providing adaptive risk action determination information according to driver-specific return characteristics, it becomes possible for the driver to make appropriate risk determinations and make appropriate action determinations.

From a micro point of view, prior information provided as prediction information and penalty information provide an effect of lowering a threshold for starting an action for a return to manual driving when a driver makes an information determination in her/his brain, and further, provides an effect of making the driver prepared for necessary handling early.

For example, by providing prior information that allows a driver to easily predict a length of time that is left until a start of manual driving or the like, it becomes possible for the driver to keep the consciousness level for a return to manual driving high also during execution of a secondary task. In addition, by using a penalty functionality in combination, the user starts having a habit of checking provided information with attention. As a result, the driver is expected to voluntarily recognize situations without receiving system notifications. That is, it is expected that the careful mental loop of the driver is activated continuously, and overlook or delays of handling of transfer is/are prevented.

Note that the HMI technology according to the present disclosure provides a driver with hierarchical information regarding choices associated with a transfer point necessary for a return. Note that, in a case where the driver does not return to manual driving appropriately after a manual return notification, a penalty that urges the driver to improve the return quality is given.

Note that, in order for the penalty to function effectively, it is necessary for the system to correctly recognize the return quality in response to the notification, and to evaluate the return quality quantitatively.

As this evaluation process, for example, in a case where the driver is seated on the driver's seat and is at a posture where she/he can drive, the state recognition ranging from, for example, the alertness state of the driver to the line of sight until the driver normally performs steering for actual manual driving is performed.

In addition, in a case where the seated posture of the driver is not a posture at which she/he can perform normal manual driving, a 2D camera or equipment that is capable of three-dimensional posture detection is used to detect a return to a normal posture or the tracking of a posture and to evaluate the posture.

Further, in a case where the driver is away from the seat, in the same manner, a 2D camera or tracking equipment that is capable of three-dimensional posture detection is used for an action of a return from the state in which the driver is away from the seat, to detect the transition of the posture return, a predicted length of time until a return is measured, and a delayed return relative to the time of a favorable return is evaluated.

In such a manner according to the situation of the driver, observation including tracking information of a returning action is performed, and it is evaluated whether there is deterioration of the return quality. Note that, in another possible configuration, in order to quantitatively evaluate the return quality, each driver may be identified as an individual, driver-specific return characteristics may be learned, and an evaluation process may be performed by using the learning data.

For example, learning data of each individual and observation data of a returning action that occurs at each event are compared, it is determined, for example, whether or not the observation data represents a delay as compared to a prediction based on the learning data, and the return quality is evaluated according to the characteristics of the individual.

Note that there are a wide variety of contents of secondary tasks of automated driving users, it is difficult to unconditionally and uniquely define return transitions, and preferably, evaluations are performed by using individual-specific learning data. Particularly, a technique for tracking returning actions of a driver when she/he is away from the seat is required to be flexible to some extent.

A delay of a return to manual driving has a significant influence. Thus, the system performs a return-to-manual-driving request notification beforehand, taking into consideration a predicted length of time required for a return. Further, delay time until an actual return time is also treated as an evaluation target.

In a case where a driver does not take a prompt returning action after a notification, and a returning start is delayed because, for example, she/he did not suspend, but continued a secondary task and so on, it is predicted that the driver attempts to promptly execute some or all of returning actions for minimizing a penalty.

Such an action taken in hurry for recovering the delay becomes a cause of an accident.

The validity of such a returning action also needs to be evaluated. When performing action tracking of a driver, for example, the system uses observation equipment such as a ToF (Time of Flight) sensor that is capable of three-dimensional observation of the operation speed of a body, to observe actions of the driver. The system self-learns the action history and generates a learning dictionary of returning actions.

An action that is taken in hurry when a driver returns to manual driving with a delay after a notification for a return to manual driving and an action that is taken promptly and calmly after a notification are compared, and return qualities are recorded quantitatively.

For quality evaluations in a case where the driver returns to manual driving after a state in which she/he is away from the driver's seat, a belt or clock-type equipment worn by the driver can be used, for example. For example, information acquired by equipment having an in-vehicle position measuring apparatus that is capable of identifying an in-vehicle position of the driver is used to acquire and evaluate information regarding movement of the driver in the interior of the vehicle.

In addition, return milestones such as a seating sensor of the driver's seat, detection of fastening of the seat belt or of holding of the steering wheel, or further, access to pedals and the like may be used as detection points of the return quality.

In addition, action evaluating information that can be used includes whether and how the driver got up from a bed such as a nap space that is at a position away from a driver's seat; whether and how the driver got up from the driver's seat or the like; whether and how the driver got up from a non-driver's seat; whether and how the driver moved from a seat to a seat; whether and how the driver walked; whether and how the driver rotated the body or a seat, or slid the body or a seat in the lateral direction; whether and how the driver suspended work; whether and how an arrangement change of feet to a manual driving mode is detected; whether and how the driver took a visual action of moving a line of sight to driving information presentation equipment; whether and how specified checking behavior is detected; and the like.

Note that there is a secondary advantage of treating histories that are obtained when the driver performs impulsive returns by converting those histories into return quality evaluation values that it becomes unnecessary to keep user information as simple captured image data of the user, and recording is possible without privacy-related recording restrictions. Accordingly, it becomes easier to make operations and management regarding inappropriate steering actions and the like.

[5-1. Detailed Configuration of Driving Zone Display Data and Process of Updating Driving Zone Display Data]

Next, the detailed configuration of driving zone display data and a process of updating the driving zone display data are explained.

As mentioned above, in an automated driving allowed zone where use of automated driving is allowed, it becomes possible for the driver not to perform driving steering, but to engage in a secondary task other than driving steering.

However, in a case where the automated driving allowed zone ends and the vehicle enters a manual driving zone, the driver needs to normally return to manual driving steering from the secondary task.

Notification to the driver that a manual driving zone is approaching needs to be executed surely.

Figure 15:
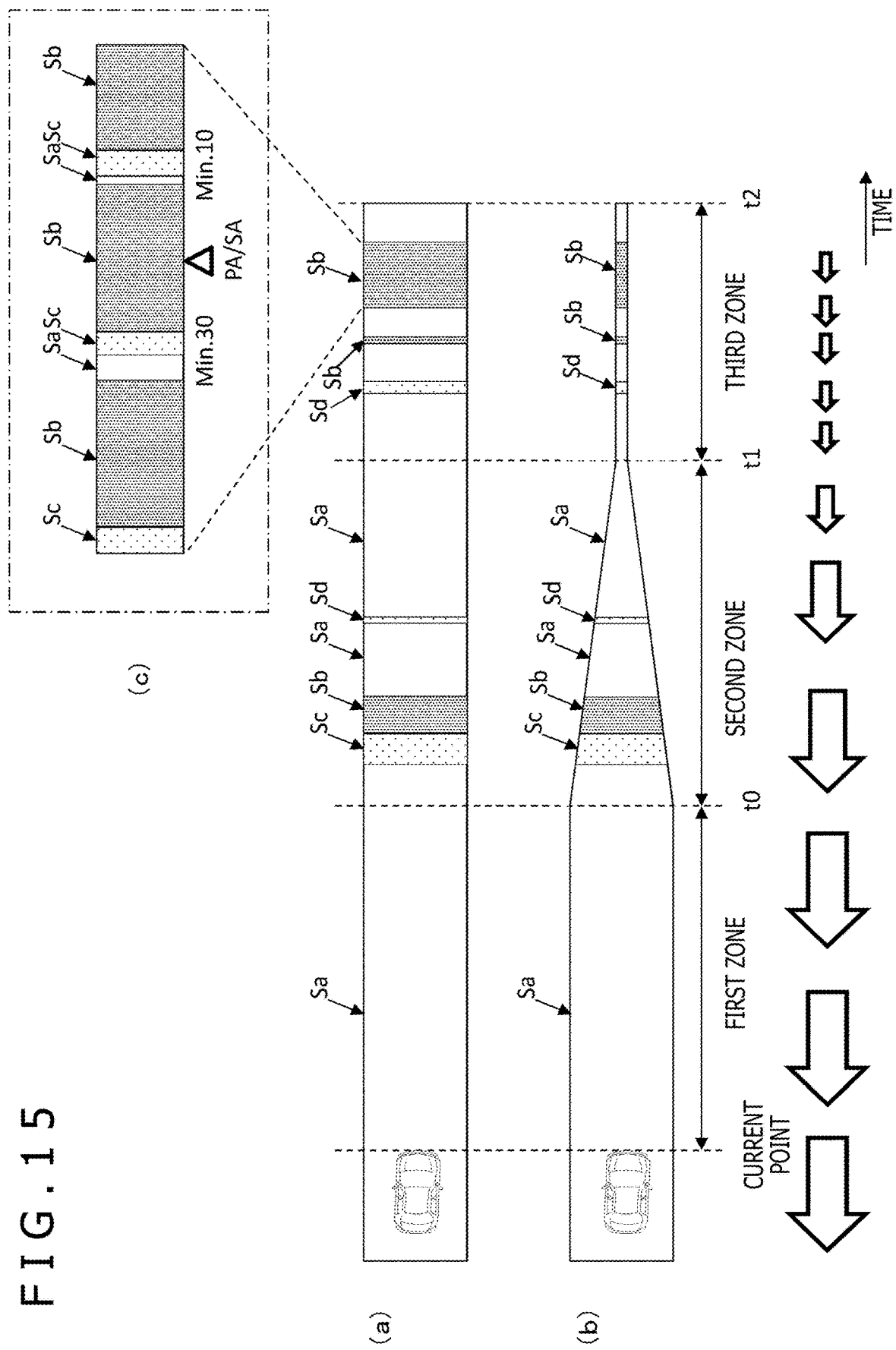
FIG. 15 depicts diagrams illustrating an example of a driving zone display to be displayed finally.

For example, driving zone display data as the one explained with reference to FIG. 14 to FIG. 16 earlier is displayed on an information processing apparatus such as a tablet terminal on which the driver is executing a secondary task. That is, the driving zone display data including different colors for different zones, such as green for automated driving allowed zones Sa, red for manual driving zones Sb, and yellow for transfer zones Sc and careful driving zones Sd, for example, is displayed along the time axis.

For example, acquisition of data necessary for those data displays and a display data generation process are executed at data processing sections such as the data processing section 11 in the configuration depicted in FIG. 1, data processing sections in the automated-driving control section 112 in the configuration depicted in FIG. 8, for example, the detecting section 131, the situation analyzing section 133, and the planning section 134, and the output control section 105. The display data is transmitted to a tablet terminal or the like used by a user via the communication section 103, and displayed thereon, for example. Note that the display data can displayed also on a display section included in the output section 106 under the control of the output control section 105.

Figure 25:
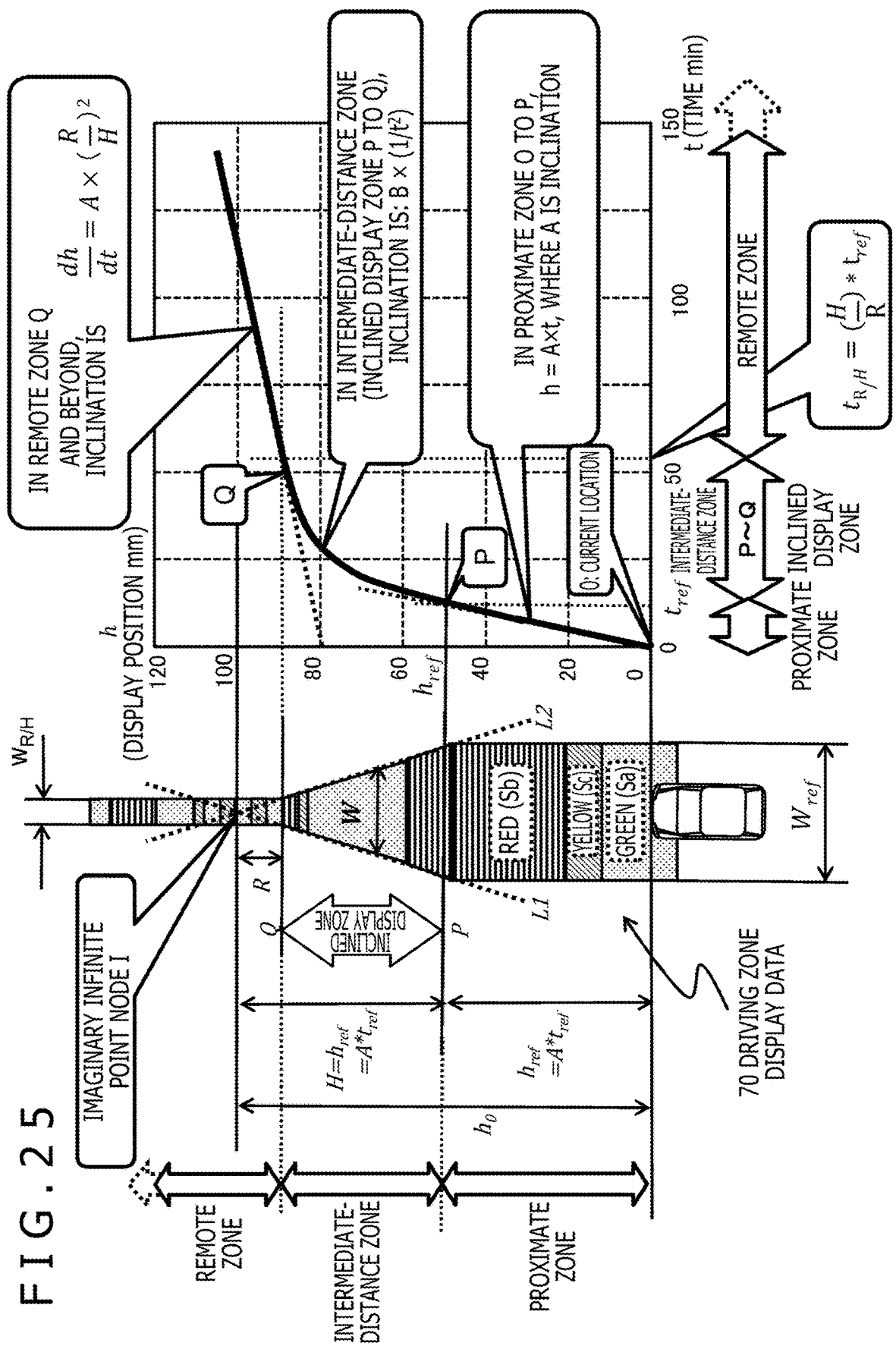
FIG. 25 is a diagram for explaining the detailed configuration of driving zone display data.

As explained with reference to FIG. 14(*d*), FIG. 15, and FIG. 16 earlier, for example, the driving zone display data displays a displayed zone divided into the three zones as depicted in FIG. 14(*d*), and the time axis of each zone is made different from each other. That is, driving zone display data 70 as the one depicted in a middle section in FIG. 25 is displayed. While equipment such as a tablet that the driver manipulates directly is explained mainly in the following display example, information may be displayed directly on vehicle-installed equipment such as a center console panel of a vehicle, and in that case, the information may actually be displayed taking visibility and an inclination of the display into consideration on the basis of the relative position relation of the driver.

Specifically, display processes such as the ones described later are executed.

The aim of display examples in this document is to provide information as a notice of the time of arrival at each point. In a case where a display in line with the time of arrival at each point is displayed, the time of arrival at each point is computed by dividing a moving distance by a driving speed along the route. The time of arrival at each point needs to be replaced with a value obtained by a conversion from a driving speed formed by the flow of a vehicle group that changes depending on the driving situation of each road zone. It should be noted, however, that because contents of description of a predicted arrival notice time from the current time are complicated, the conversion is omitted in the explanation of the following processes, and instead, a display process is described in detail considering that an arrival time is proportional to and equivalent to a "distance" over which the vehicle travels in a case where the vehicle drives at a constant fixed speed.

A proximate zone close to the user's automobile position is displayed along a first time axis as a time linear display immediate zone in which time (t) and the display position (h) are displayed in a proportional relation.

Similarly to the proximate zone, a remote zone that is remote is displayed along a second time axis as a time linear display remote zone in which time (t) and the display position (h) are displayed in a proportional relation.

It should be noted, however, that the remote zone is set such that time per unit display length is longer, that is, "distance per unit display length/passage time" is longer, than the proximate zone. For example, it is set such that, when the display length of 1 cm in the proximate zone corresponds to a length of time required for driving of 1 km, the display length of 1 cm in the remote zone corresponds to a length of time required for driving of 5 km and so on.

The zone represented with the first time axis represents a driving distance at the time of constant speed driving as seen in a bird's-eye view from up in the sky, and the zone represented with the third time axis represents a driving distance at the time of constant speed driving as seen from above in a bird's-eye view from a point far away from the zone. Accordingly, this is equivalent to a display that is reduced from the display along the first time axis.

Because the zone of the second time axis display is a display as seen from above in an inclined direction, the display is reduced as the distance increases in the infinite remote direction, and this allows the driver to recognize long and short distances intuitively with respect to the zone.

As a time inverse display zone, an intermediate-distance zone between the proximate zone and the remote zone is displayed along a time axis that changes gradually at a predetermined rate from the first time axis corresponding to the proximate zone to the second time axis corresponding to the remote zone.

With reference to FIG. 25, details of generation and update processes of the driving zone display data 70 depicted in FIG. 25 are explained.

The right side of FIG. 25 depicts a graph (time/display-position correspondence graph) in which the current time t0 a predicted arrival time (t: min) are set along the horizontal axis, and a display position (h: mm) of driving zone display data 80 in the display is set along the vertical axis. The display position (h: mm) along the vertical axis corresponds to the driving zone display data 70 depicted in the middle.

As depicted in FIG. 25, the driving zone display data 70 includes three zones:
a proximate zone;
an intermediate-distance zone; and
a remote zone.

The proximate zone is a zone close to the user's automobile position and is a zone displayed along the first time axis as a time linear display immediate zone.

A zone on the graph depicted on the right side from a current location (O) to (P) is equivalent to the proximate zone. This zone is a zone in which the time linear display is displayed, that is, a display position is determined in proportion to the passage of time.

As depicted in the time/display-position correspondence graph, the display position h is set in proportion to time t in this proximate zone. That is, the display position h of each driving zone (Sa to Sd) in the driving zone display data 70 is determined in accordance with the following (Formula 1).

$$h = A \times t \qquad \text{(Formula 1)}$$

In (Formula 1) described above, A is a coefficient and is a coefficient that determines the inclination of a straight line in a zone OP in the time/display-position correspondence graph.

Note that the inclination A has a value specified in advance.

Further, a branch point P between the proximate zone and the intermediate-distance zone and a branch point Q between the intermediate-distance zone and the remote zone are specified in advance.

For example, the proximate zone (O to P) is a driving zone of a period from the current time (time=0) 0 to time=($t_{ref}$). A zone over which the vehicle can drive in this period (t=0 to $t_{ref}$) is set as the proximate zone (h=0 to $h_{ref}$). Note that the process is performed on the assumption that the vehicle drives at a constant speed.

$$h_{ref} = A \times t_{ref}$$

The intermediate-distance zone (P to Q) ahead of the branch point P between the proximate zone and the intermediate-distance zone is a time inverse display zone, and a process of displaying the distance represented by a predetermined display height of the proximate zone while the distance is made longer gradually from P toward Q is performed. The display of the intermediate-distance zone is equivalent to a situation where a road planar surface that extends straight and forward is seen, or to a situation where the road planar surface of a straight road on a map is seen from an inclined direction in the advancing direction, and this is equivalent to a display in which the distance decreases toward the infinite point.

Two dotted lines L1 and L2 depicted in the driving zone display data depicted in the middle in FIG. 25 are lines that are drawn such that they converge toward a remote point from the branch point P between the proximate zone and the intermediate-distance zone. The point of convergence is defined as an imaginary infinite point node I.

The display position (display height) h of the imaginary infinite point node I in the driving zone display data 70 is defined as $h=h_0$.

At this time, the relation between the display position h of each zone (Sa to Sd) in the intermediate-distance zone (P to Q) and time t that has passed since the current time (t=0) can be represented by the following (Formula 2a).

$$h-h_0=-B\times(1/t) \quad \text{(Formula 2a)}$$

Note that B is a coefficient and is a value according to the inclination of the lines L1 and L2 depicted in FIG. 25. It should be noted, however, that, in order for the proximate zone (O to P) and the intermediate-distance zone (P to Q) to be smoothly and continuously connected at the branch point P between the proximate zone and the intermediate-distance zone, the coefficient B and the coefficient A need to be set such that a conditional expression described later is satisfied.

As can be understood from the graph depicted on the right side in FIG. 25, in the intermediate-distance zone (P to Q), the line of the time/display-position correspondence graph is a curve in which changes of the display position (h) gradually decrease along with the passage of time (t).

The inclination at each position in this curve, that is, (dh/dt), can be computed by differentiation in terms of time t based on (Formula 2a) described above, and is represented by the following (Formula 2b).

$$(dh/dt)=B\times(1/t)^2 \quad \text{(Formula 2b)}$$

Note that, in order for the proximate zone (O to P) and the intermediate-distance zone (P to Q) to be smoothly connected at the branch point P between the proximate zone and the intermediate-distance zone, in the time/display-position relational expression (t-h relational expression) of the proximate zone represented by (Formula 1) described above, that is, $$h=A\times t \quad \text{(Formula 1)}$$

and the time/display-position relational expression (t-h relational expression) of the intermediate-distance zone represented by (Formula 2a) described above, that is, $$h-h_0=-B\times(1/t) \quad \text{(Formula 2a)}$$

the position h and the inclination at the timing of time $t_{ref}$, that is, at the timing of the branch point P, need to match.

First, the inclination at the branch point P is examined.

The two values of the inclination of the proximate zone represented by (Formula 1) described above =A, and the inclination computed in accordance with (Formula 2b) described above $$(dh/dt)=B\times(1/t)^2 \quad \text{(Formula 2b)}$$

need to be caused to match.

Because time t at the branch point P between the proximate zone and the intermediate-distance zone is $$t=t_{ref}$$

as a condition for the inclinations to match, $$B\times(1/t_{ref})^2=A \quad \text{(Conditional expression a)}$$

needs to be satisfied.

Further, regarding the display position h of the branch point P between the proximate zone and the intermediate-distance zone also, the position h computed in accordance with the time/display-position relational expression (t-h relational expression) of the proximate zone (O to P) and the position h computed in accordance with the time/display-position relational expression (t-h relational expression) of the intermediate-distance zone (P to Q) need to match.

The display position h of the branch point P represented by (Formula 1) described above at time $t_{ref}$ is $$h=A\times t_{ref}$$

Meanwhile, the display position h of the branch point P depicted by (Formula 2a) described above at time $t_{ref}$ is $$h=-B\times(1/t_{ref})+h_o$$

In order for these to match, $$A\times t_{ref}=-B\times(1/t_{ref})+h_0 \quad \text{(Conditional expression b)}$$

needs to be satisfied.

If these two conditional expressions a and b are satisfied, the proximate zone (O to P) and the intermediate-distance zone (P to Q) are smoothly connected at the branch point P between the proximate zone and the intermediate-distance zone. The coefficients A and B are set to values that satisfy the two conditional expressions a and b.

Note that the intermediate-distance zone depicted in FIG. 25, that is, the inclined display zone, ends before the imaginary infinite point node I (ends at Q), and thereafter a time linear display, that is, a display of a proportional relation between time and the display position, is displayed as the remote zone (Q and beyond). It should be noted, however, that this remote zone (Q and beyond) is set such that, as can be understood from the graph depicted in FIG. 25, an increase of the display position per unit time is small.

That is, in the remote zone (Q and beyond) of the driving zone display data 70, data of a long time is displayed in a shorter display area, that is, data equivalent to a longer distance is displayed in a short display area.

The remote zone (Q and beyond) starts at the predetermined position (R) as measured from the display position ($h_0$) of the imaginary infinite point node I.

R is set to a value that satisfies conditional expressions c and d described later.

As depicted in the graph of FIG. 25, time ($t_{R/H}$) of the start position (Q) of the remote zone (Q and beyond) can be represented in the following manner.

$$t_{R/H}=(H/R)\times t_{ref}$$

Note that, in order for the intermediate-distance zone (P to Q) and the remote zone (Q and beyond) to be smoothly connected at the point Q as well, the display position (h) and the inclination (dh/dt) of the intermediate-distance zone (P to Q) and the remote zone (Q and beyond) at the point Q need to be caused to match.

First, the inclination (dh/dt) of the remote zone (Q and beyond) needs to be set to the inclination (dh/dt) of the branch point Q between the intermediate-distance zone (P to Q) and the remote zone (Q and beyond).

The inclination (dh/dt) of the intermediate-distance zone (P to Q) is computed by the definitional formula (Formula 2b) mentioned above, that is, $$(dh/dt)=B\times(1/t)^2 \qquad \text{(Formula 2b)}$$

Time t of the branch point Q, that is, the value of $$t_{R/H}=(H/R)\times t_{ref}$$

is assigned to (Formula 2b).

$$(dh/dt)=B\times(1/((H/R)\times t_{ref}))^2 \qquad \text{(Formula 3a)}$$

The inclination (dh/dt) of the remote zone (Q and beyond) is an inclination according to (Formula 3a) described above.

Note that, by converting (Formula 3a) described above on the basis of (Conditional expression a) explained earlier, that is, $$B\times(1/t_{ref})^2=A \qquad \text{(Conditional expression a)},$$

the inclination (dh/dt) of the remote zone (Q and beyond) is defined by the following (Formula 3b).

$$(dh/dt)=A\times(H/R)^2 \qquad \text{(Formula 3b)}$$

Note that, $$H=h_{ref}=A\times t_{ref}$$

holds.

In addition, in order to satisfy the condition of matching the display position (h) of the intermediate-distance zone (P to Q) and the remote zone (Q and beyond) at the point Q, the following (Conditional expression c) needs to be satisfied.

$$A\times(R/H)^2\times(t-(H/R)\times t_{ref})+A\times t_{ref}\times(2-(R/H))=A(R/H)^2\times t+2\times A\times t_{ref}\times(2-(R/H)) \qquad \text{(Conditional expression c)}$$

By setting R such that Conditional expression c is satisfied, the intermediate-distance zone (P to Q) and the remote zone (Q and beyond) are connected smoothly.

Figure 26:
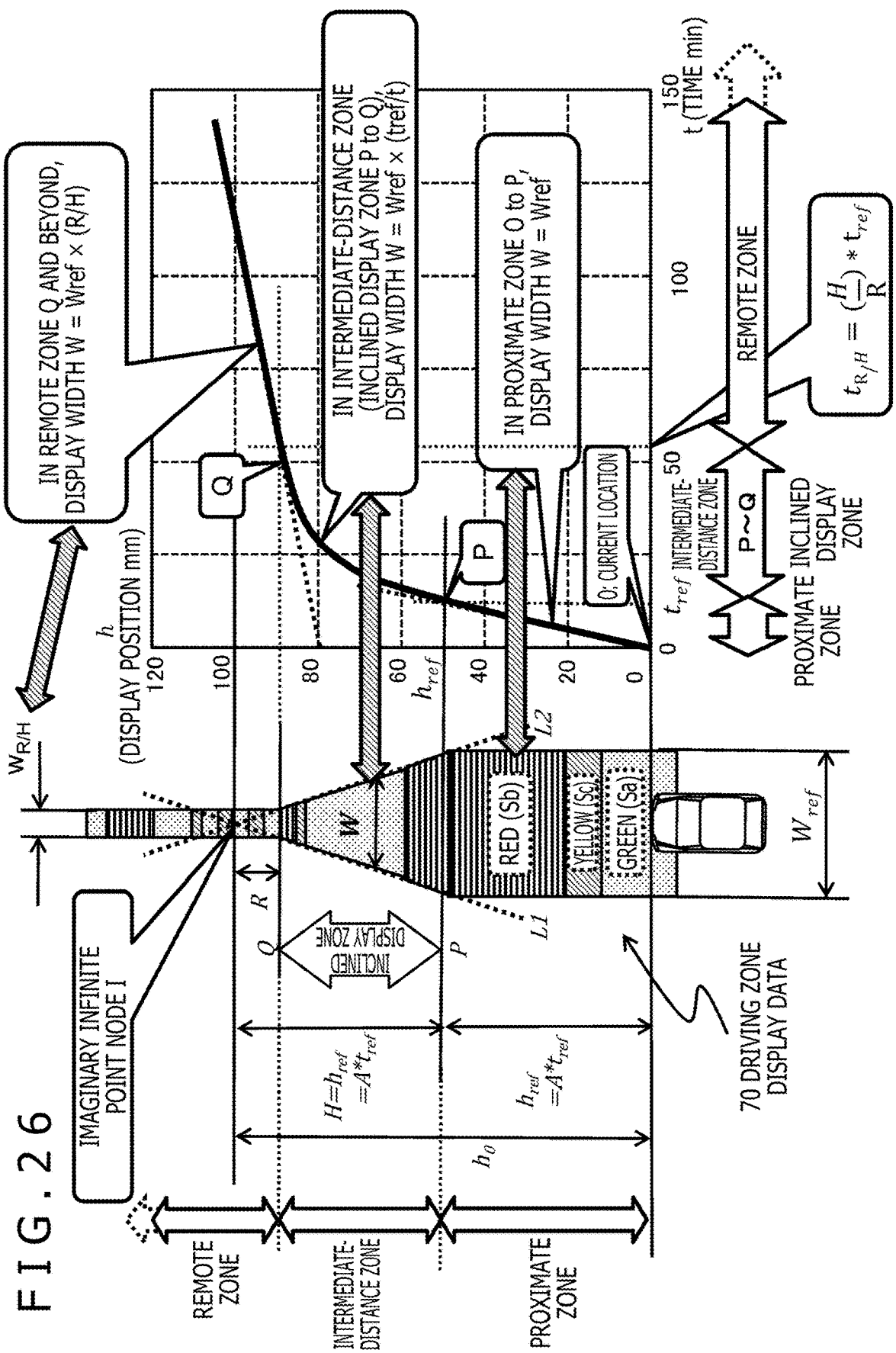
FIG. 26 is a diagram for explaining the detailed configuration of the driving zone display data.

Next, a display width W of each zone of the driving zone display data 70 is explained with reference to FIG. 26. The display widths of the proximate zone (O to P) and the remote zone (Q and beyond) are equivalent to displays which are bird's-eye views of the road widths as seen from up in the sky, and the display width of the intermediate-distance zone (P to Q) is equivalent to the convergence of a relevant road from a road width with a certain width that is represented by parallel lines to one point toward the infinite point according to long and short distances. These provide an effect of allowing the driver to intuitively sense the arrival time, along with the reduction of the display in the vertical direction.

First, the display width W of the driving zone display data 70 in the proximate zone (O to P) is the width W defined by the following (Formula 4).

$$W=W_{ref} \qquad \text{(Formula 4)}$$

The display width Wref can be set as desired.

The display width W from the branch point P between the proximate zone (O to P) and the intermediate-distance zone (P to Q) to the inside of the intermediate-distance zone (P to Q) is set such that it becomes narrower as the distance from the current position increases.

Specifically, the display width W of the intermediate-distance zone (P to Q) is the width W defined by the following (Formula 5).

$$W=W_{ref}\times(t_{ref}/t) \qquad \text{(Formula 5)}$$

Note that $t_{ref}$ is a length of time that is required for the vehicle to arrive at the branch point P between the proximate zone (O to P) and the intermediate-distance zone (P to Q).

The display width W at the point corresponding to time $t_{ref}$, that is, the branch point P between the proximate zone (O to P) and the intermediate-distance zone (P to Q), is $$W=W_{ref}$$

Thereafter, in the intermediate-distance zone (P to Q), the display width W gradually decreases in accordance with (Formula 5) described above, along with the passage of time.

As has been explained earlier, time t that is required for the vehicle to arrive at the branch point Q between the intermediate-distance zone (P to Q) and the remote zone (Q and beyond) is $$t=t_{R/H}=(H/R)\times t_{ref}$$

The display width at this position can be computed in accordance with the following formula on the basis of (Formula 5) described above.

$$\begin{aligned}W &= W_{ref}\times(t_{ref}/((H/R)\times t_{ref})) \\ &= W_{ref}\times(R/H)\end{aligned}$$

The display width W computed in accordance with the formula described above is equivalent to a display width $W_{R/H}$ of the remote zone (Q and beyond). That is, the display width $W_{R/H}$ of the remote zone (Q and beyond) is represented by the following (Formula 6).

$$W_{R/H}=W_{ref}\times(R/H) \qquad \text{(Formula 6)}$$

Note that, on the basis of (Formula 6) described above, the time/display-position relational expression (t-h relational expression) of the intermediate-distance zone explained earlier, that is, $$h-h_0=-B\times(1/t) \qquad \text{(Formula 2a)},$$

and the definitional formula (Formula 5) of the display width W of the intermediate-distance zone (P to Q), that is, $$W=W_{ref}\times(t_{ref}/t) \qquad \text{(Formula 5)}$$

the following relational expression (Formula 7) can be obtained.

$$\begin{aligned}W &= W_{ref}\times(t_{ref}/t) \\ &= -(W_{ref}\times(t_{ref}/B)\times(h-h_0))\end{aligned} \qquad \text{(Formula 7)}$$

(Formula 7) described above proves the following relation.

The proximate zone (O to P) and the remote zone (Q and beyond) which are time linear display zones in which time (t) and the display position (h) are displayed in proportional relations have display widths, that is, the display width $W_{ref}$ of the proximate zone (O to P), and the display width $W_{R/H}$ of the remote zone (Q and beyond)

which are displayed in relations in which they are reduced linearly in relation to the display position h.

By displaying the driving zone display data 70 in such a display mode, it becomes possible for the user (driver) to intuitively recognize that each zone is approaching along with driving, without feeling a sense of discomfort due to the combined effects of visual perspective of the widths.

Next, an example of a process of updating the driving zone display data 70 along with the passage of time is explained with reference to FIG. 27.

Figure 27:
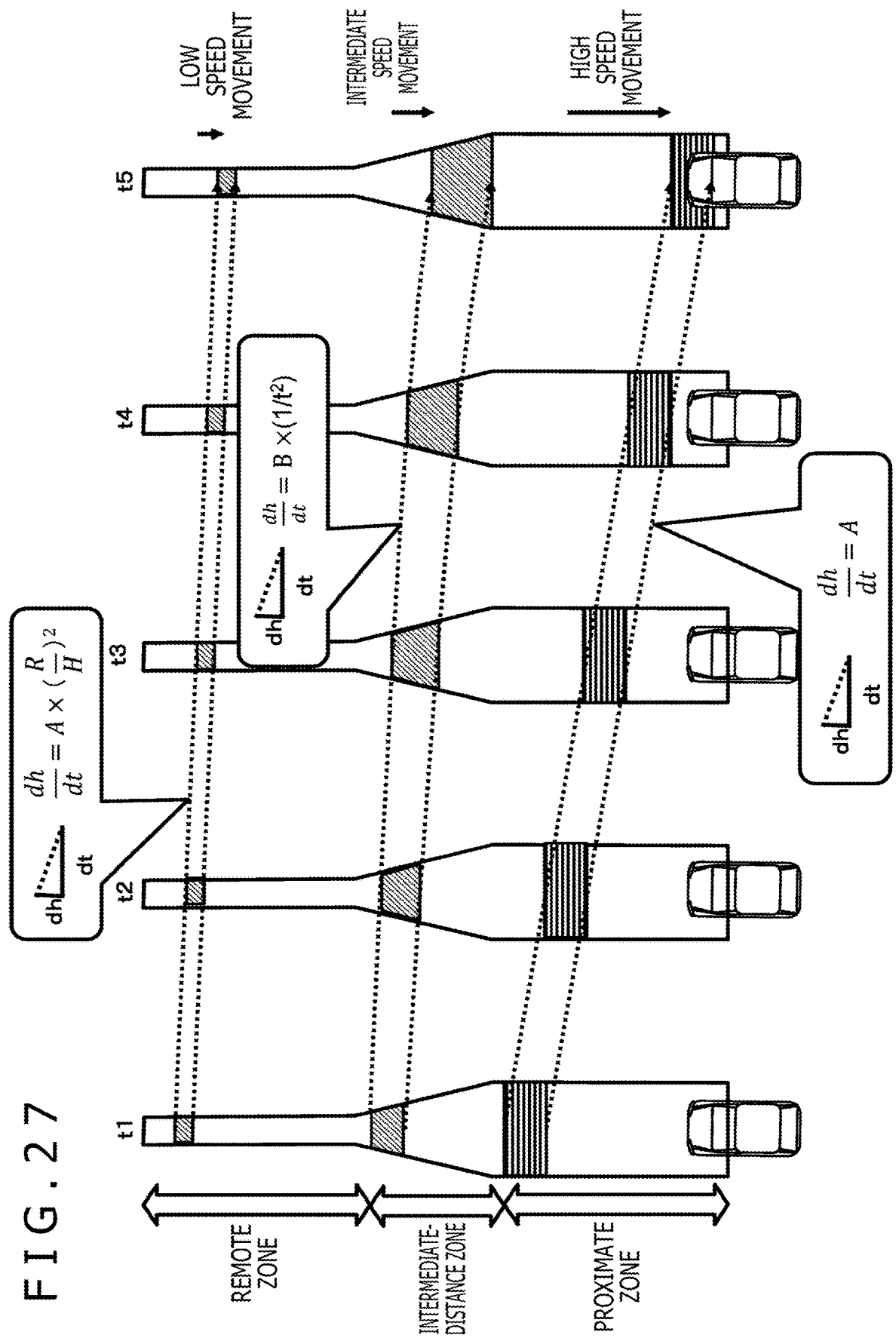
FIG. 27 is a diagram for explaining update examples of the driving zone display data that are made along with the passage of time.

FIG. 27 depicts changes of display positions of display zones of the driving zone display data 70 along with the passage of time.

Five pieces of driving zone display data 70 at times t1 to t5 are five pieces of data displayed at constant intervals after t1.

Note that, in order to make it easier to understand, only one zone data is depicted in each of the proximate zone, the intermediate-distance zone, and the remote zone.

The zone data (Sa to Sd) displayed in each of the proximate zone, the intermediate-distance zone and the remote zone is updated to approach the vehicle along with the passage of time. Note that it is assumed that the vehicle is driving at a constant speed.

The proximate zone is a zone of a time linear display, that is, a zone where the display position is determined in proportion to the passage of time. That is, the display position h of the zone data (Sa to Sd) displayed in the proximate zone is determined in accordance with the following (Formula 1) as explained with reference to FIG. 25 earlier.

$$h = A \times t \qquad \text{(Formula 1)}$$

Accordingly, the inclination (dh/dt) of a dotted line representing the temporal transition of the zone data (Sa to Sd) of the proximate zone depicted in the figure is $$(dh/dt) = A$$

The remote zone also is a zone of a time linear display, that is, a zone where the display position is determined in proportion to the passage of time. That is, as explained with reference to FIG. 25 earlier, the inclination (dh/dt) of a dotted line representing the temporal transition of the zone data (Sa to Sd) of the remote zone is represented by the following (Formula 3b).

$$(dh/dt) = A \times (H/R)^2 \qquad \text{(Formula 3b)}$$

Note that, because the inclination A of the proximate zone is larger than the inclination $A \times (H/R)^2$ of the remote zone, the zone data (Sa to Sd) of the proximate zone is updated such that it gets close to the user's automobile position faster than the zone data (Sa to Sd) of the remote zone does.

In addition, the intermediate-distance zone is not a zone of a time linear display, and the inclination (dh/dt) is represented by the following (Formula 2b) explained earlier.

$$(dh/dt) = B \times (1/t)^2 \qquad \text{(Formula 2b)}$$

The intermediate-distance zone is updated such that the closer an area is to the vehicle position, the faster the area gets close to the vehicle position. Accordingly, the display length of the zone data (Sa to Sd) of the intermediate-distance zone increases as the display position gets closer to the vehicle position as time passes.

The order of speed at which the display position of the zone data (Sa to Sd) gets close to the vehicle position is remote zone<intermediate-distance zone<proximate zone and the speed in the intermediate-distance zone increases as the display position gets closer to the vehicle position.

Note that, while the driving zone display data 70 is displayed as straight data in the examples depicted with reference to FIG. 25 to FIG. 27, different colors may be used to display the zone data (Sa to Sd) on the wristwatch type information terminal 50 as explained with reference to FIG. 21 to FIG. 23 earlier, in another possible configuration.

Figure 28:
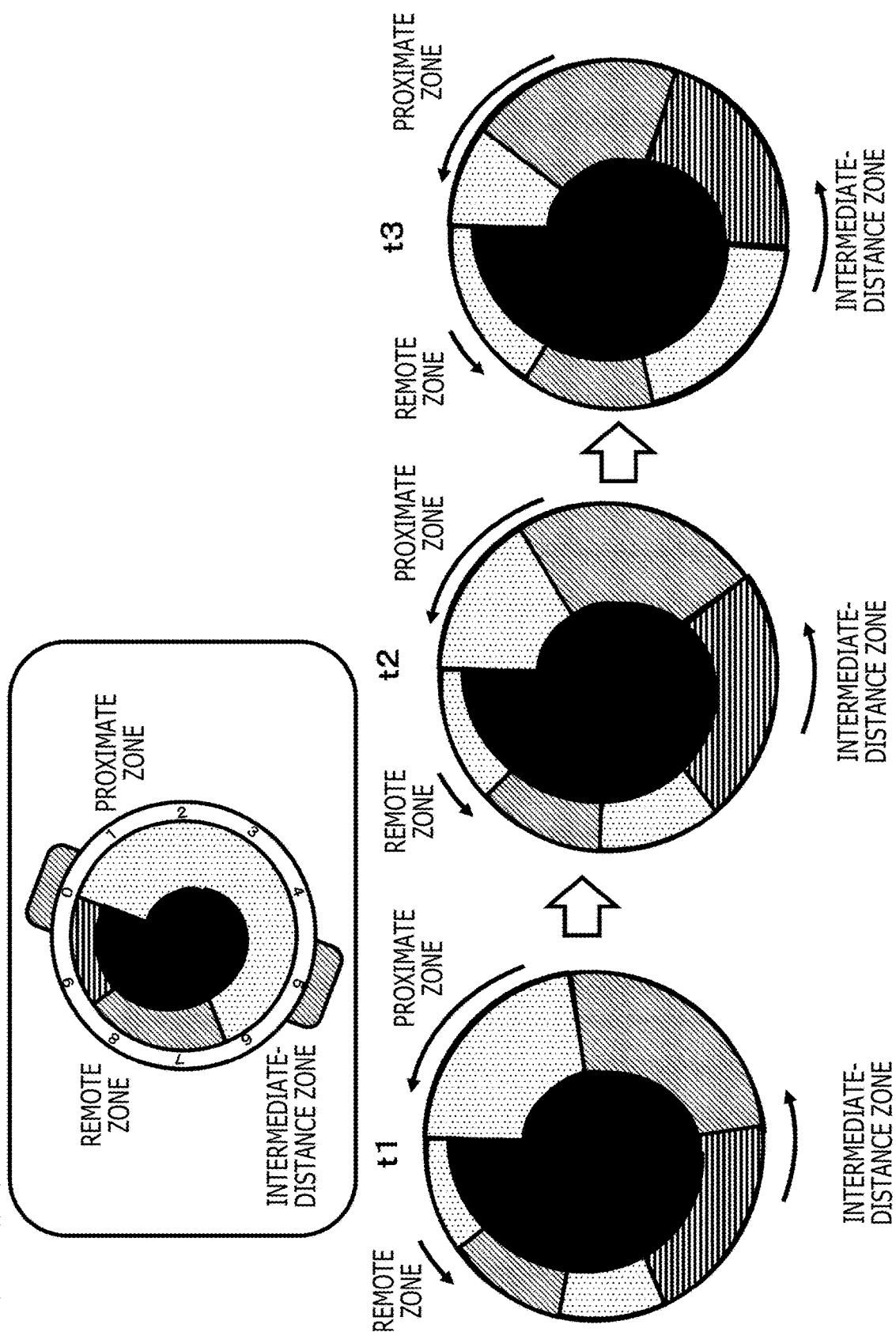
FIG. 28 is a diagram for explaining update examples of the driving zone display data on a wristwatch type terminal that are made along with the passage of time.

FIG. 28 depicts an example thereof.

A lower section in FIG. 28 depicts an example of updating display data along with the passage of time of times t1, t2, and t3.

Note that the display data moves counterclockwise along with the passage of time. In such a configuration, the order of speed at which the display position of the zone data (Sa to Sd) gets close to the vehicle position is remote zone<intermediate-distance zone<proximate zone.

[5-2. Display Example of Additional Information for Driving Zone Display Data]

Next, display examples of additional information for the driving zone display data are explained.

The display examples explained with reference to FIG. 25 to FIG. 28 are display examples in which only the driving zone display data 70 is displayed. That is, those are display examples of only the driving zone display data 70 including positional information of automated driving allowed zones Sa, manual driving zones Sb, zones Sc for transfer from automated driving to manual driving, and careful driving zones Sd.

Data processing sections such as the data processing section 11 in the configuration depicted in FIG. 1, data processing sections in the automated-driving control section 112 in the configuration depicted in FIG. 8, for example, the detecting section 131, the situation analyzing section 133, and the planning section 134, and the output control section 105 further generate information useful for a user (driver), as additional information, for the driving zone display data 70.

Specific examples of the display examples of additional information are explained with reference to FIG. 29 and the subsequent figures.

Figure 29:
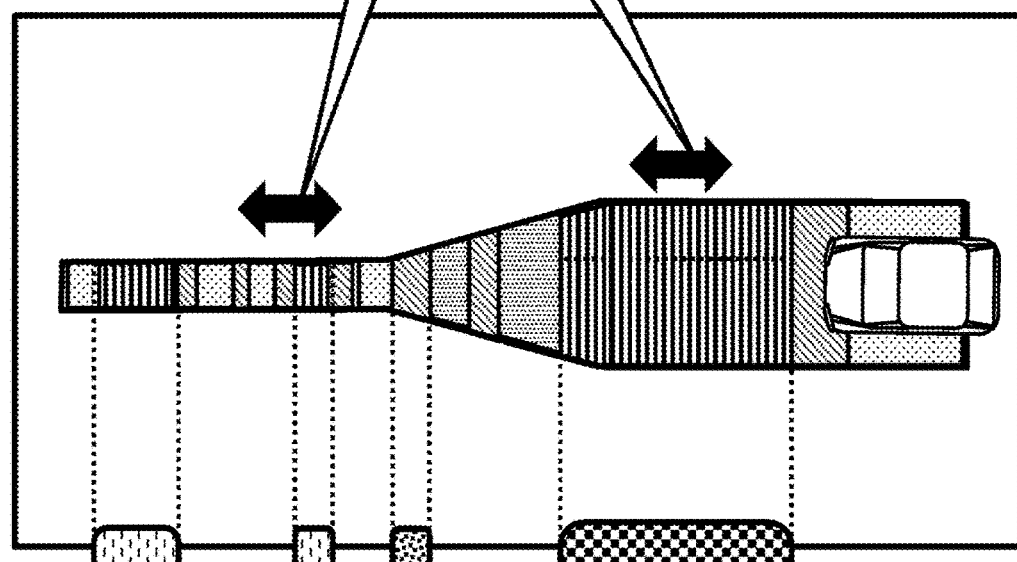
FIG. 29 is a diagram for explaining additional display examples of additional information for the driving zone display data.

FIG. 29 depicts the following additional information display example.

Additional information a: low speed bypass road provision zone at the time when it is impossible to return to manual driving (a local road that runs parallel with a freeway, etc.)

Additional information b: zone where there is a risk of rushing-out, zone where manual driving with attention is required Additional information c: return-to-manual-driving abandonment prohibition area (penalty target zone) (e.g., a zone where there is a possibility of a traffic jam, or road blockage because of lane reduction, etc.)

Additional information d: zone such as a traffic jam zone where there is a possibility of significant variations of a zone length For example, these pieces of additional information are displayed as a combination of a particular color area or an icon and explanatory information as the ones depicted in FIG. 29.

By the information, it becomes possible for the user (driver) to check detail information of the advancing direction of the vehicle.

Note that only icons may be displayed and explanations may be displayed in a case where the user performs a process of touching or clicking the icons.

Figure 30:
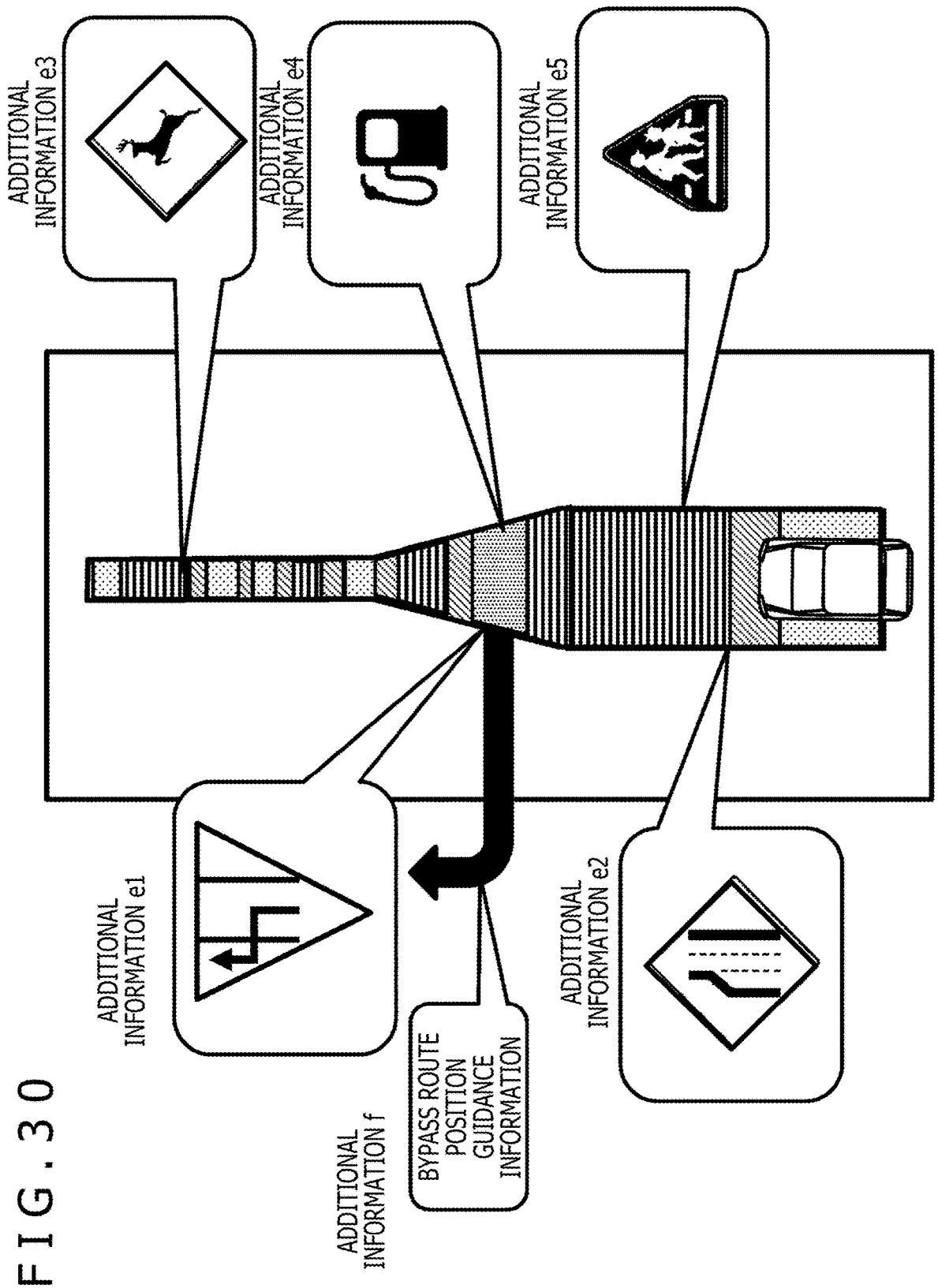
FIG. 30 is a diagram for explaining additional display examples of additional information for the driving zone display data.

Further, as depicted in FIG. 30, signs installed on a road, information regarding gas stations, service areas, engineering work, and the like, bypass route information, and the like may be displayed, in another possible configuration. FIG. 30 depicts the following additional information display example.

Additional information e1 to e5: sign information, gas station information

Additional information f: bypass route position guidance information

Note that the additional information e1 and the additional information f depicted in FIG. 30 are bypass route information regarding zones before entering a manual driving zone, for example, and are display information that can be used in a case where it is possible to enter another automated driving zone through a bypass route and in other cases.

Figure 31:
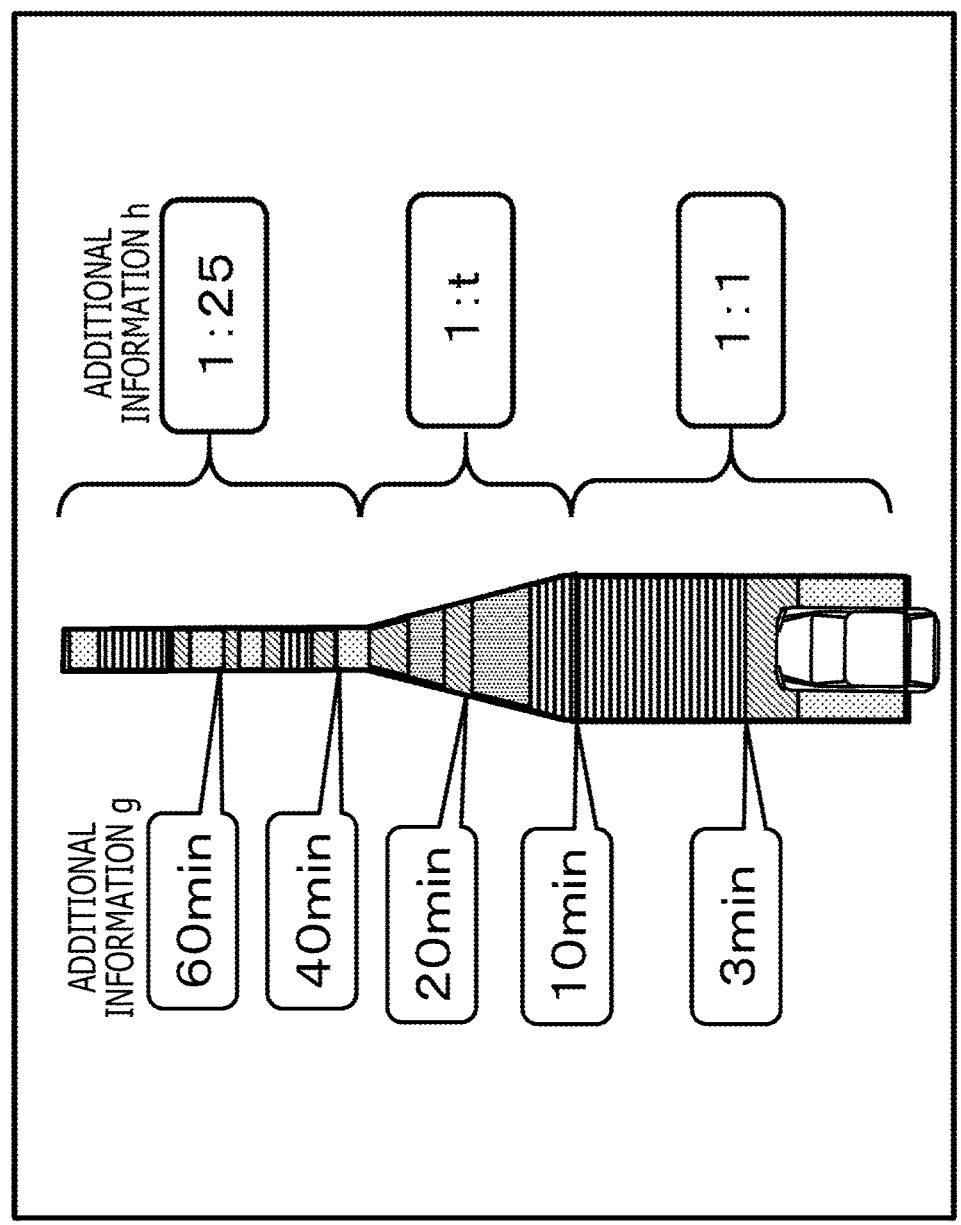
FIG. 31 is a diagram for explaining additional display examples of additional information for the driving zone display data.

Further, as additional information g depicted in FIG. 31, information regarding a time of arrival at each zone (Sa to Sd) displayed in the driving zone display data 70 may be displayed.

In addition, as additional information h depicted in FIG. 31, distance rate information of each display zone (the proximate zone to the remote zone) may be displayed further.

In the example depicted in the figure, while the rate of the proximate zone is 1:1, the rate of the remote zone is 1:25. This means that, for example, in a case where the actual zone length of a predetermined unit length of the proximate zone is 1 Km, the actual zone length of the same predetermined unit length of the remote zone is 25 Km.

It means with respect to the intermediate-distance zone that the actual zone length of the same predetermined unit length is t×1 Km.

Figure 32:
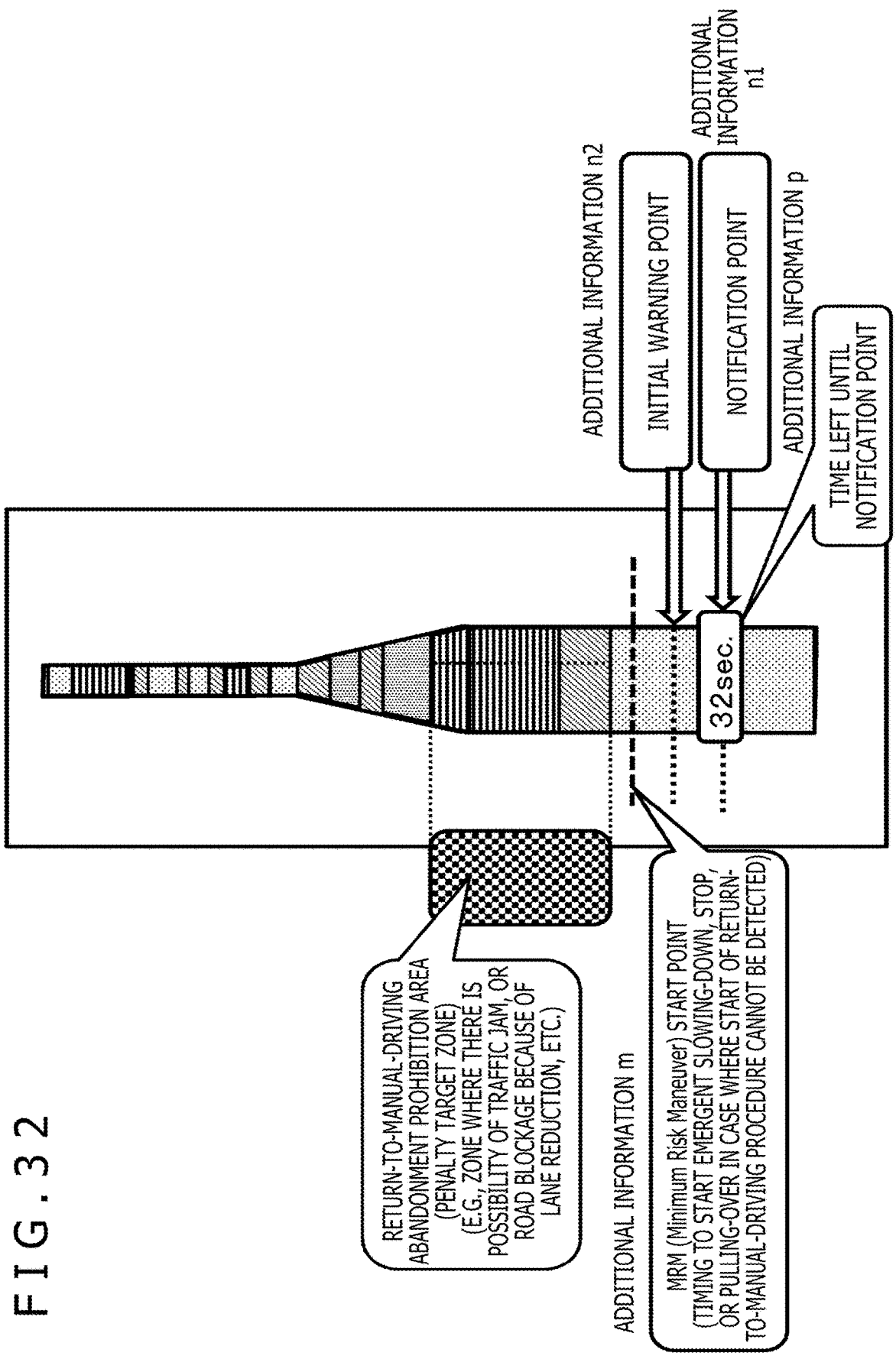
FIG. 32 is a diagram for explaining additional display examples of additional information for the driving zone display data.

Further, various types of timing information may be additionally displayed as additional information as depicted in FIG. 32. FIG. 32 depicts the following additional information display example.

Additional information m: MRM (Minimum Risk Maneuver) start point position (a timing to start emergent slowing-down, stop, or pulling-over in a case where the start of a return-to-manual-driving procedure cannot be detected)

Additional information n1: notification point (a notification point of a return-to-manual-driving request notification)

Additional information n2: warning point (a warning point of a return-to-manual-driving request)

Additional information p: length of time that is left until a notification point On the basis of these types of additional information, the user (driver) can check detail information regarding various notifications and warnings to be given, automated driving control processes, and the like.

Note that the display of these types of additional information may be displayed at different display positions or display timings on the basis of information regarding actions of the user (driver).

Figure 33:
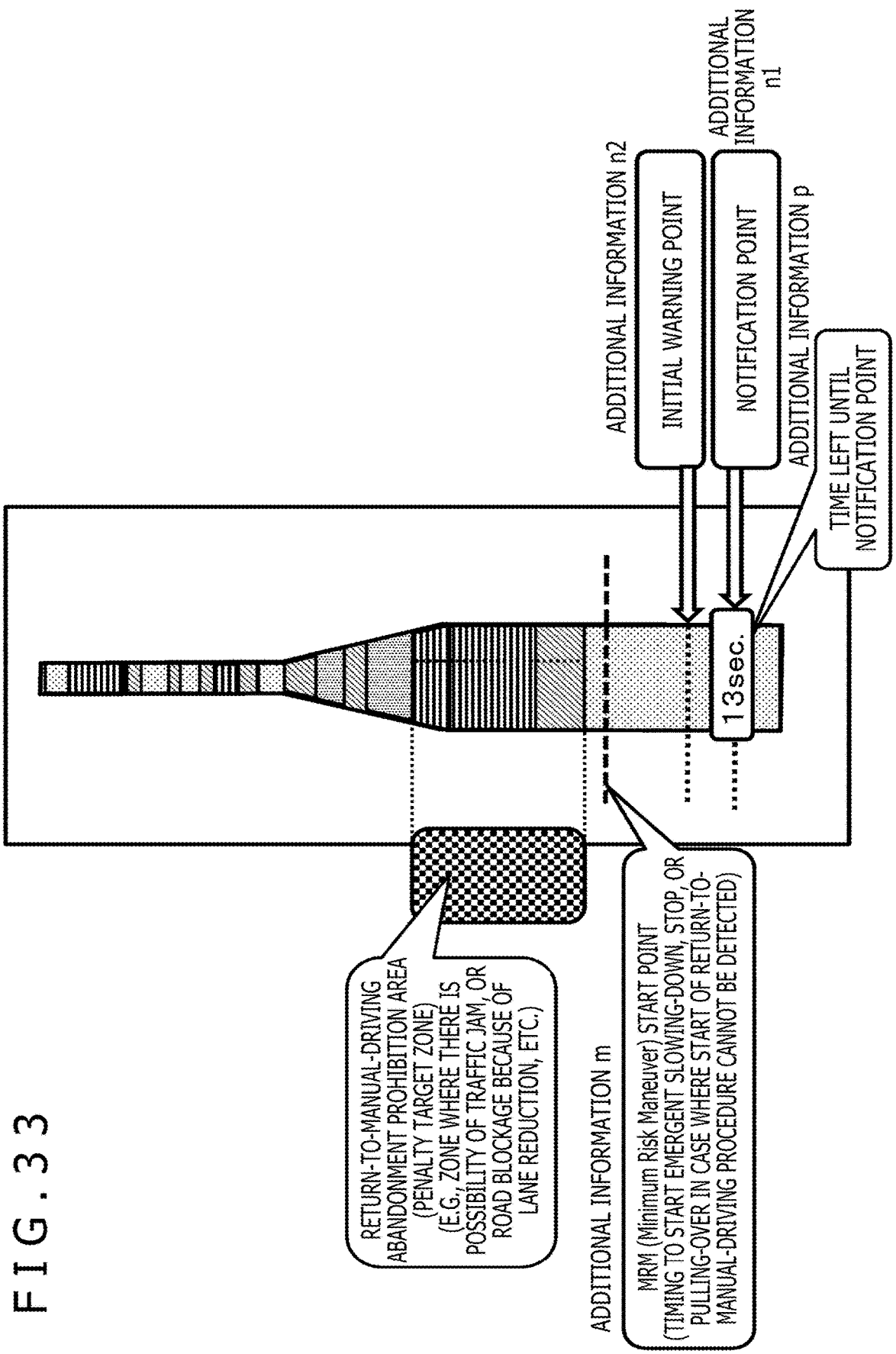
FIG. 33 is a diagram for explaining additional display examples of additional information for the driving zone display data.

For example, a display mode depicted in FIG. 32 is adopted in a case where the user (driver) is in a state in which she/he is seated on the driver's seat and can return to manual driving promptly, and a display mode as the one depicted in FIG. 33 is adopted in a case where the user (driver) is not in a state in which she/he can return to manual driving promptly because she/he is away from the driver's seat, is sleeping, or the like.

While additional information similar to that in FIG. 32 is displayed in FIG. 33, the display position and time information of each piece of the following information are close to the current position and the current time.

Additional information n1: notification point (a notification point of a return-to-manual-driving request notification)

Additional information n2: warning point (a warning point of a return-to-manual-driving request)

Additional information p: length of time that is left until a notification point By performing such a display, it becomes possible to make the user (driver) recognize that she/he is in a highly emergent state, and to cause the user (driver) to start preparation for a return to manual driving at an earlier timing.

Figure 34:
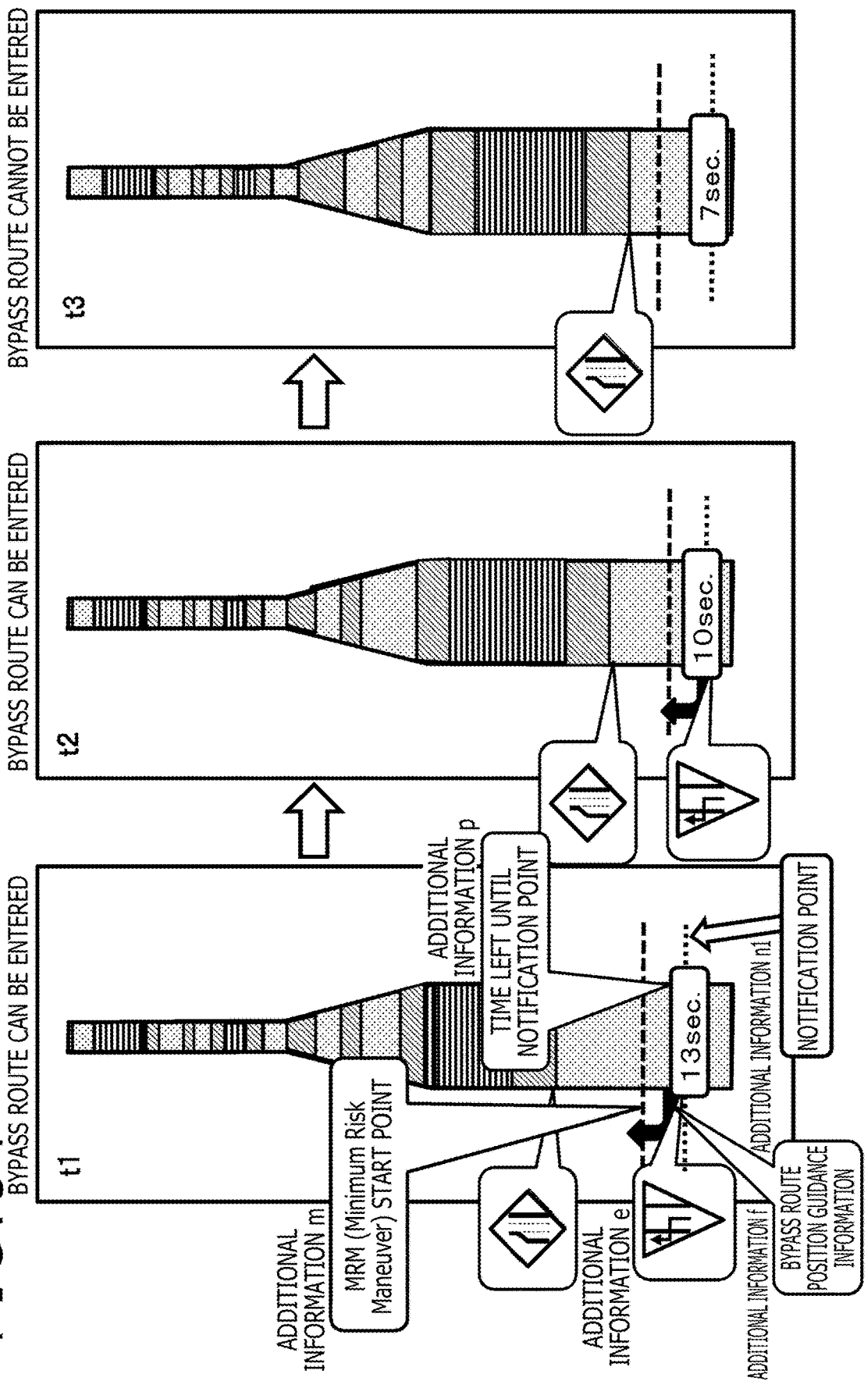
FIG. 34 is a diagram for explaining additional display examples of additional information for the driving zone display data.

FIG. 34 is a diagram depicting an example of a process for updating additional information along with the passage of time.

Specifically, an example of a process of updating display data having the following additional information along with the passage of time (t1 to t3) is depicted.

Additional information m: MRM (Minimum Risk Maneuver) start point position (a timing to start emergent slowing-down, stop, or pulling-over in a case where the start of a return-to-manual-driving procedure cannot be detected)

Additional information n1: notification point (a notification point of a return-to-manual-driving request notification)

Additional information p: length of time that is left until a notification point Additional information e: sign (a sign representing a bypass route)

Additional information f: bypass route position guidance information

The display examples of time t1 and time t2 are examples of display data that is displayed in a state in which entrance into a bypass route is possible.

These pieces of display data include the following additional information.

Additional information e: sign (a sign representing a bypass route)

Additional information f: bypass route position guidance information

The display example of time t3 is an example of display data that is displayed at a time point where it has become impossible to enter a bypass route.

The display data of time t3 is updated such that the following additional information is not displayed.

Additional information e: sign (a sign representing a bypass route)

Additional information f: bypass route position guidance information

In such a manner, the data processing sections execute display control of selecting and displaying only information available to the user (driver) at each time point.

Figure 35:
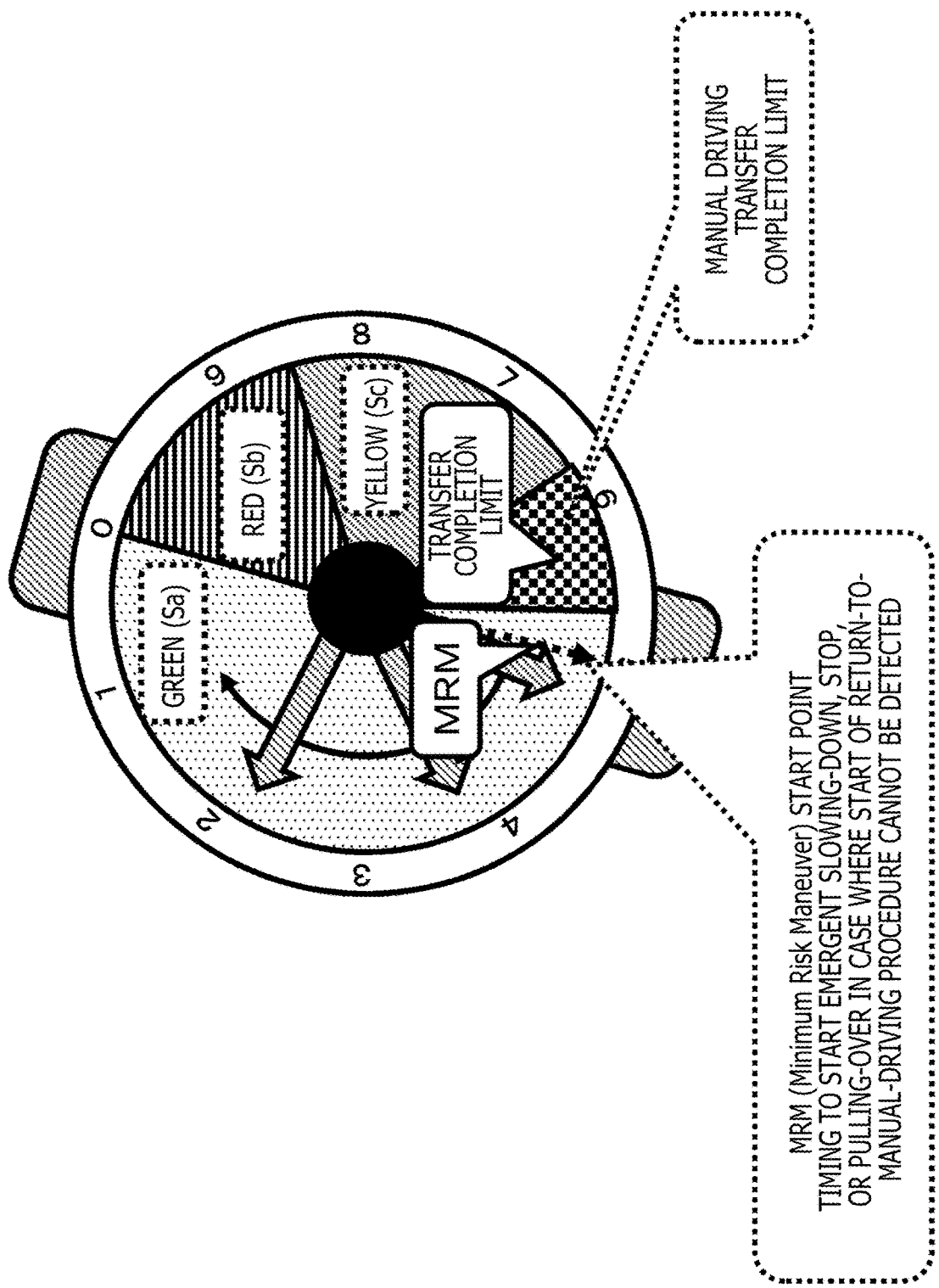
FIG. 35 is a diagram for explaining additional display examples of additional information for the driving zone display data displayed on a wristwatch type terminal.

Note that the display of additional information is similarly executed also in a case where a circular display is displayed on a wristwatch or the like as depicted in FIG. 35.

Note that, in the example depicted in FIG. 28 in which a display mode of a case of displaying a circular display on a wristwatch or the like is adopted, information related to the progress of time is rotated counterclockwise. In that case, information regarding immediately proximate timings is displayed in the quadrant from 3 o'clock to 0 o'clock, and information regarding timings immediately before transfer by the user can be visually obtained from the first quadrant to the second quadrant.

On the other hand, if the sensory aspect of humans regarding analog clocks is taken into consideration, humans intuitively feel remaining time from the remaining rotation angle of a second hand or the like that moves toward the direction of 0 o'clock/12 o'clock. Accordingly, it is also effective to present information by causing animations used for presenting information to rotate clockwise as depicted in FIG. 35. In addition, also in a circular display mode such as that on a wristwatch, additional information is executed similarly also in a case where a circular display of a display of MRM limit point time arrival time, a display of bypass possible limit point time arrival time, a display of transfer notification point arrival time, and the like is displayed on a wristwatch or the like.

[5-3. Examples of Processes of Notification and Warning Using Animations]

Next, an example of a process of notification and warning using animations

Data processing sections such as the data processing section 11 in the configuration depicted in FIG. 1, data processing sections in the automated-driving control section 112 in the configuration depicted in FIG. 8, for example, the detecting section 131, the situation analyzing section 133, the planning section 134, and the output control section 105 execute not only the process of generating the driving zone display data 70, but also a process of further generating and displaying display data using animations, in order to notify the user (driver) of a length of time that is left until a process for a return-to-manual-driving request notification to the user (driver) or the start of manual driving, and give a warning about it.

Examples of display data using animations are explained with reference to FIG. 36 and the subsequent figures.

Figure 36:
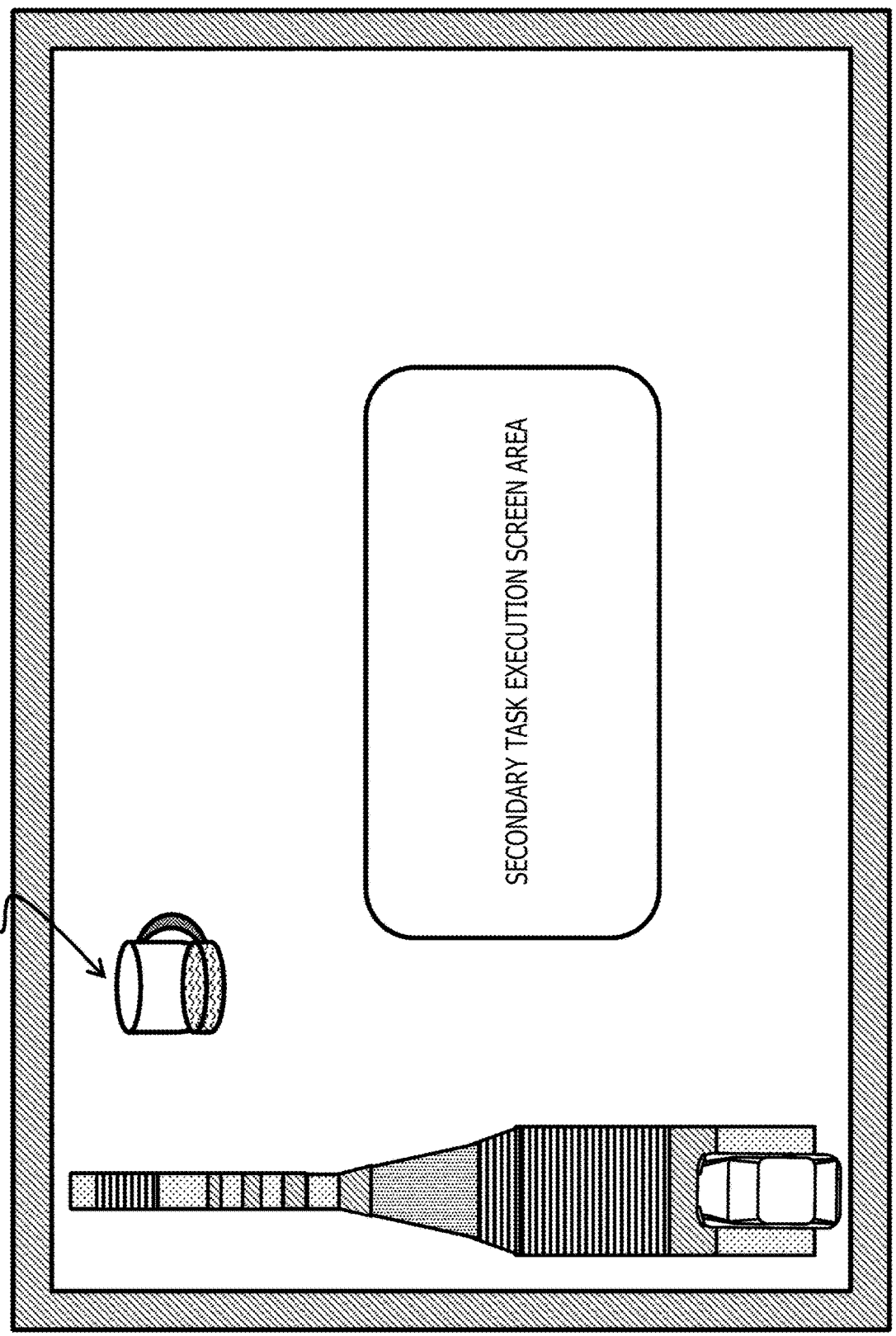
FIG. 36 is a diagram for explaining an example of display data using an animation.

FIG. 36 depicts an information terminal on which a user (driver) executes secondary tasks. It is assumed that the user is using a "secondary task execution screen area" of the terminal depicted in the figure, to execute various secondary tasks, for example, secondary tasks such as moving image viewing, document creation, or game playing.

At an upper section of a display section of the terminal, animation information 80 for a notification of remaining time until a manual-driving transfer point is displayed under the control of a data processing section.

The animation information 80 is animation information for notifying the user (driver) who is executing a secondary task of a length of time that is left until a manual driving transfer request notification is given, or a length of time that is left until a manual-driving transfer point arrives.

The animation information 80 represents a state that coffee is in a cup.

The data processing section 11 in the configuration depicted in FIG. 1, or a data processing section in the automated-driving control section 112 depicted in FIG. 8 updates the animation information 80 along with the passage of time.

Specific process examples of the updating are explained with reference to FIG. 37 and FIG. 38.

Figure 37:
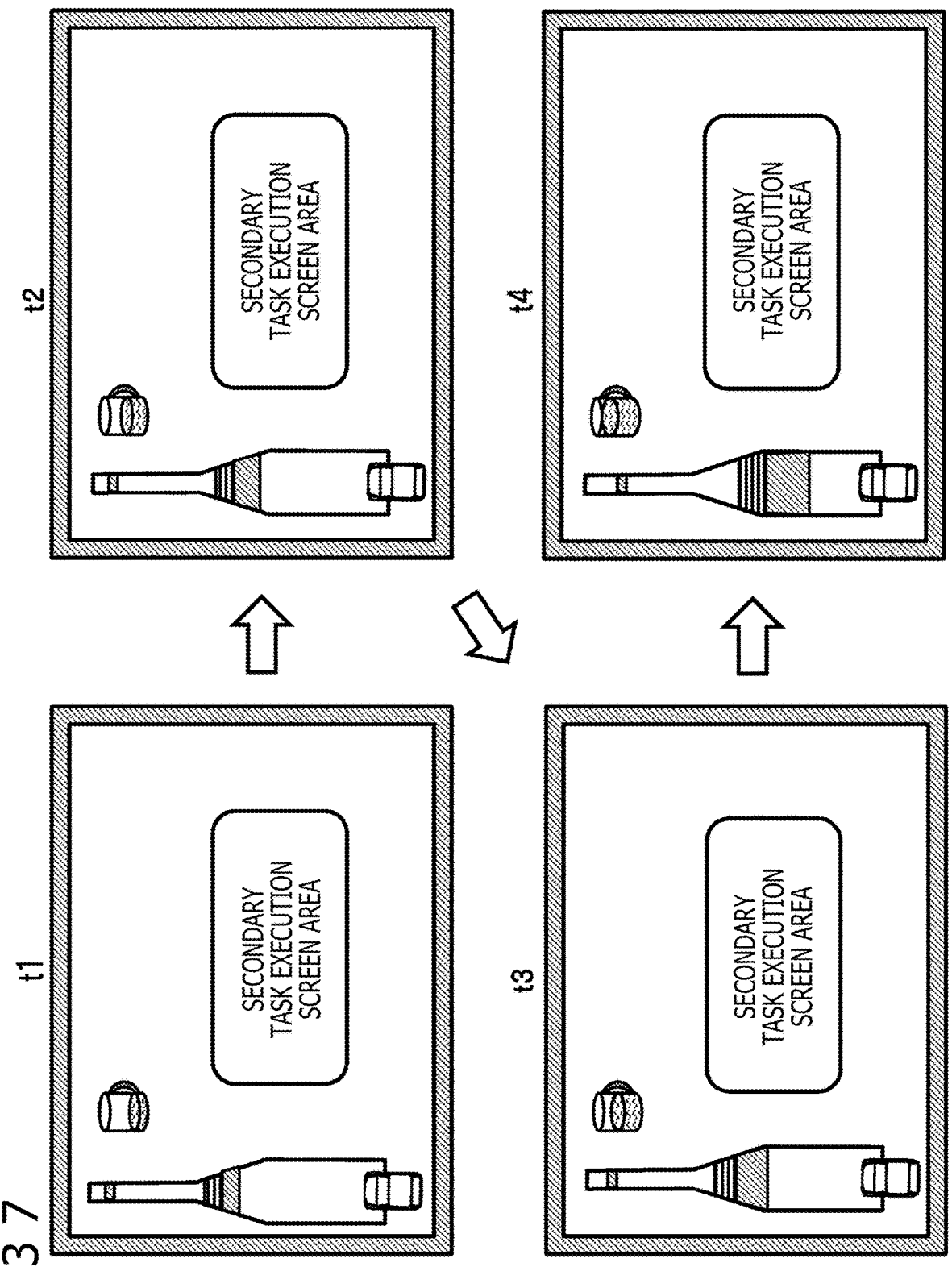
FIG. 37 depicts diagrams for explaining an example of display data using an animation.
Figure 38:
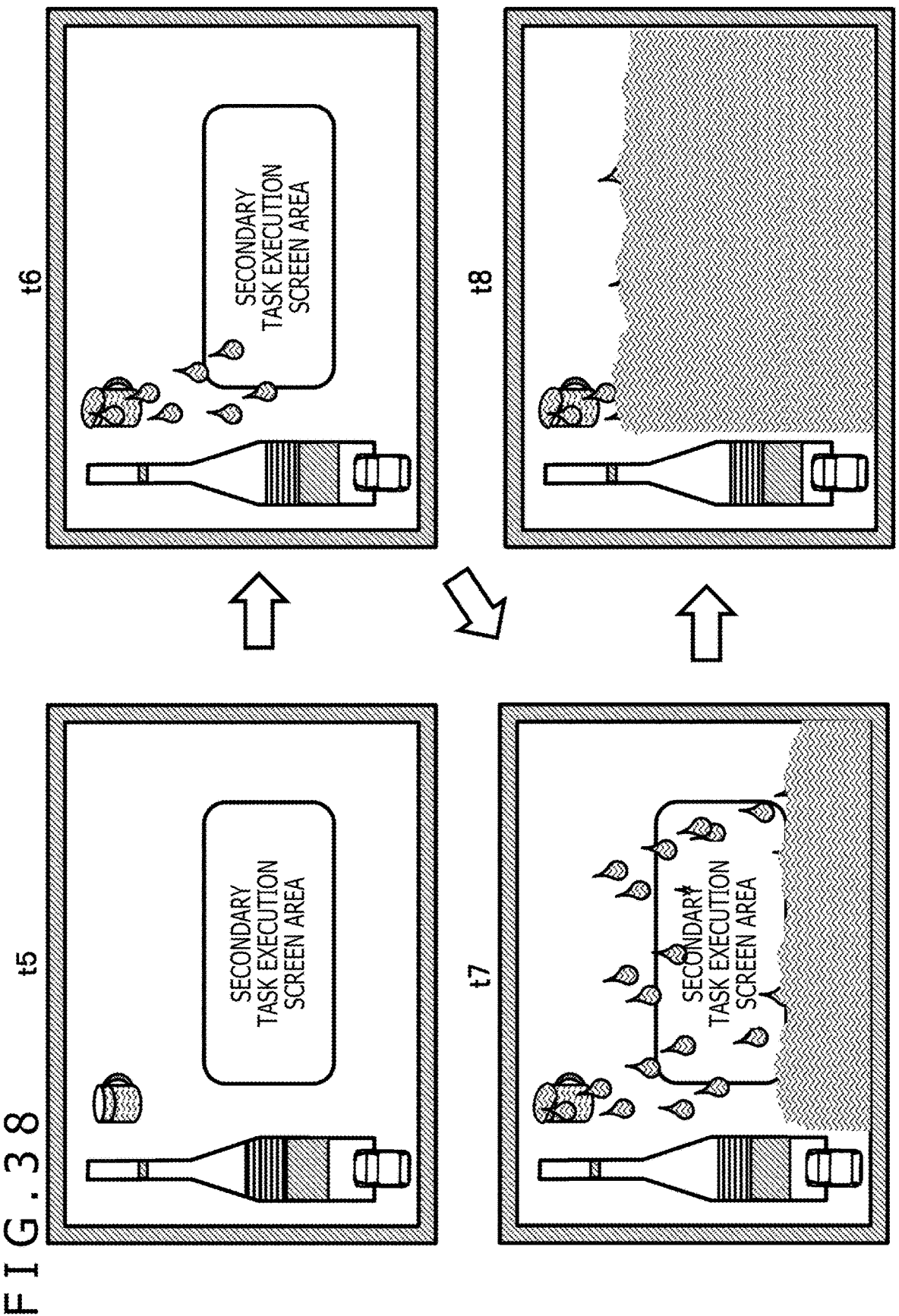
FIG. 38 depicts diagrams for explaining an example of display data using an animation.

FIG. 37 to FIG. 38 depict update examples of the animation information 80 along with the passage of time (t1 to t8).

As depicted in display data of time t1 to t4 in FIG. 37, the data processing section executes display control of displaying a state in which the amount of coffee in the cup is gradually increased along with the passage of time.

This is a display process for causing the user (driver) to notice that a length of time that is left until a manual-driving transfer point is becoming shorter along with the passage of time.

Further, as depicted in display data of time t5 to t8 in FIG. 38, the data processing section executes display control of displaying a state in which the amount of coffee in the cup is increased further along with the passage of time, the coffee overflows out of the cup, and the secondary task execution screen area is filled with coffee.

This is a display process for forcibly causing the user (driver) to stop the secondary task, and to return to manual driving by causing the user (driver) to notice that a length of time that is left until the manual-driving transfer point is becoming extremely short along with the passage of time.

By performing such display control, it becomes possible to forcibly cause the user (driver) to stop a secondary task, and to return to manual driving even in a case where the user (driver) is deeply absorbed in the secondary task.

[5-4. Other Display Process Examples]

Next, other display process examples are explained.

Driving zone display data and other display data are not limited to the display examples mentioned above, and can be subjected to various display processes.

Data processing sections such as the data processing section 11 in the configuration depicted in FIG. 1, data processing sections in the automated-driving control section 112 in the configuration depicted in FIG. 8, for example, the detecting section 131, the situation analyzing section 133, the planning section 134, and the output control section 105 generate driving zone display data and other display data, and generate display data for a terminal such as a display section in a vehicle, or a terminal carried by a user (driver), for example, a PC, a tablet terminal, or a smartphone (smartphone).

Examples of display data other than the display data mentioned above are explained with reference to FIG. 39 and the subsequent figures.

FIG. 39 is an output example of display data for a smartphone or a tablet terminal carried by a user (driver).

A display example of the driving zone display data 70 in a case where the smartphone or the tablet terminal is held in a vertically long state is depicted.

An area at a middle section of the terminal is a secondary task execution screen area used by the user. The user uses this area as an area for various secondary tasks such as a document creation area, or a moving image display area.

The driving zone display data 70 is displayed in a circumferential area of the secondary task execution screen area.

Assuming that the left lower section of the terminal depicted in the figure corresponds to the current location of the vehicle, driving zone information (Sa to Sd, etc.) of the proximate zone, the intermediate-distance zone and the remote zone is displayed such that the displayed information goes around from the left end section through the upper end section and the right end section to the lower end section.

Note that FIG. 39 depicts the following two driving zone display data display examples.

(a) Driving zone display data display example 1

(b) Driving zone display data display example 2

(a) Driving zone display data display example 1 is an example in which display widths of driving zone display data on the top side, bottom side, left side, and right side are set uniformly.

On the other hand, (b) Driving zone display data display example 2 is an example in which display widths of the driving zone display data on the top side, bottom side, left side, and right side are not set uniformly, and the data width on the left side which corresponds to the proximate zone is increased.

Figure 40:
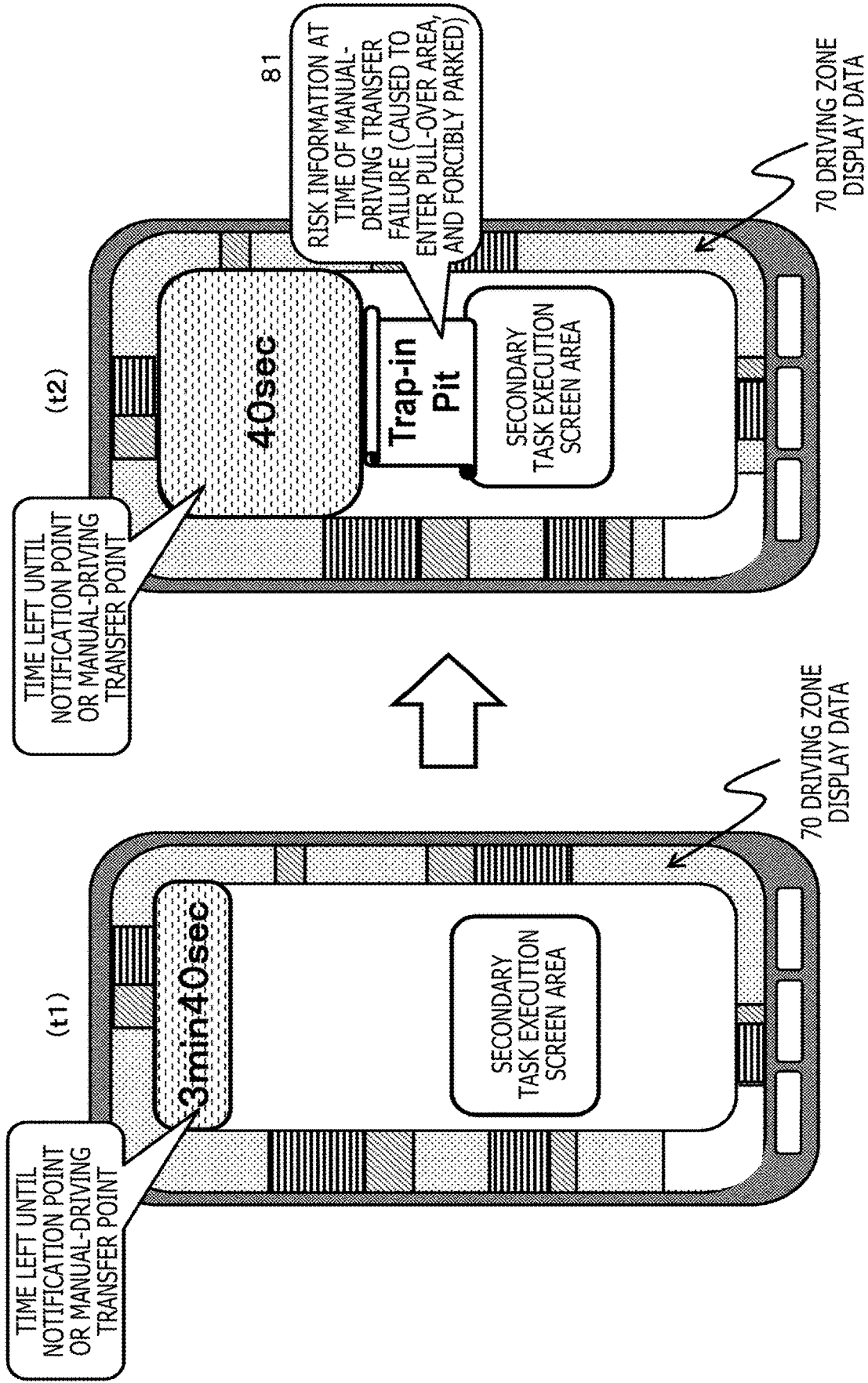
FIG. 40 depicts diagrams for explaining an example of display data on a terminal such as a smartphone.

Further, as depicted in FIG. 40, a length of time that is left until a notification point of a manual driving start request, or until a manual-driving transfer point may be displayed, in another possible configuration.

FIG. 40 depicts a display example of time (t1) and a display example of subsequent time (t2).

At time (t1), the remaining time is displayed as 3 min 40 sec. By checking this time, the user (driver) can start preparation for manual driving.

In the display of time (t2), the remaining time is displayed as 40 sec. Furthermore, as additional information, risk information 81=(Trap-in Pit) is displayed.

The risk information 81=(Trap-in Pit) is information regarding a risk that arises at the time of a manual-driving transfer failure, and is display data for informing the user that the vehicle enters a pull-over area and is forcibly parked at the time of a manual-driving transfer failure.

An example depicted in FIG. 41 is an example in which manual-driving transfer request messages 82a and 82b are displayed in a secondary task execution screen area.

The manual-driving transfer request message 82 is displayed larger as time passes.

In addition, fallen leaves are caused to fall in an area which the user is using as a secondary task execution area, and the secondary task of the user is hindered. The number of the fallen leaves increases as time passes, and it is attempted to cause the user to abandon continuation of the secondary task.

An example depicted in FIG. 42 is an example in which a sandglass is displayed as animations 83a and 83b that make it possible to visually recognize a length of time that is left until a notification point or a manual-driving transfer point arrives.

Along with the passage of time, sand in the sandglass falls, and at a time point when the upper space become empty, it becomes possible for the user to intuitively recognize that the remaining time=0, and this gives an effect of urging the user to return to manual driving earlier.

The example depicted in FIG. 43 is an example in which animations 84a and 84b imitating annoying Catherine wheels are displayed in a secondary task execution screen area. Along with the passage of time, the Catherine wheels spread over and run around in the work area on the screen, and this gives an effect of causing the user to abandon continuation of the secondary task.

Other than these displays that trigger abandonment of a secondary task depicted in the figures as examples, favorite customized settings that give notifications, notification markers of welcoming pets, markers indicating times of prayers of cultures rooted in and unique to areas of use or cultures there, markers of being chased by demons, and the like also give a mental effect of inducing handling and are effective as a functionality of urging the user to return earlier.

Furthermore, icon character services by which a user her/himself can select icon characters through networks may be used. Anything can be set, and is effective as long as, in addition to healing effects, an effect of urging a driver to suspend secondary tasks is attained, such as cat footprint marks, local specialty characters, shark tail fins, police cars and police motorcycle characters, further, demon marks, servant characters who forcibly advise the user to start preparation for transfer, and the like.

6. Configuration Example of Information Processing Apparatus

While the processes mentioned above can be executed by applying the configuration of the moving apparatus explained with reference to FIG. 8, some of the processes can be executed in an information processing apparatus that is attachable to and detachable from a moving apparatus, for example.

With reference to FIG. 44, a hardware configuration example of such an information processing apparatus is explained.

FIG. 44 is a diagram depicting a hardware configuration example of the information processing apparatus.

A CPU (Central Processing Unit) 501 functions as a data processing section that executes various types of processes in accordance with a program stored in a ROM (Read Only Memory) 502 or a storage section 508. For example, the CPU 501 executes processes according to sequences explained in the embodiments described above.

A RAM (Random Access Memory) 503 stores a program executed by the CPU 501, data, and the like. The CPU 501, the ROM 502, and the RAM 503 are interconnected by a bus 504.

The CPU 501 is connected to an input/output interface 505 via the bus 504, and the input/output interface 505 is connected with an input section 506 including various types of switches, a keyboard, a touch panel, a mouse, a microphone, and further, a situation data acquiring section such as sensors, cameras, a GPS, or an in-vehicle position measuring apparatus, and the like; and an output section 507 including a display, a speaker, and the like.

Note that the input section 506 receives, as an input, input information from a sensor 521.

In addition, the output section 507 also outputs drive information for a drive section 522 of the moving apparatus.

The CPU 501 receives, as inputs, commands, situation data, and the like input from the input section 506, executes various types of processes, and outputs processing results to the output section 507, for example.

The storage section 508 connected to the input/output interface 505 includes a hard disk and the like, for example, and stores a program executed by the CPU 501 and various types of data. A communication section 509 functions as a transmitting/receiving section for data communication via a network such as the Internet or a local area network, and communicates with external apparatuses.

A drive 510 connected to the input/output interface 505 drives a magnetic disk, an optical disk, a magneto-optical disk or a removable medium 511 such as a semiconductor memory such as a memory card, and executes recording or reading of data.

7. Summary of Configuration According to Present Disclosure

Thus far, embodiments according to the present disclosure have been explained in detail with reference to a particular embodiment. However, it is obvious that those skilled in the art can conceive of corrections or substitutions of embodiments within the scope not deviating from the gist of the present disclosure. That is, the present invention has been disclosed in exemplary forms, and should not be interpreted in a limited manner. To determine the gist of the present disclosure, the claims should be taken into consideration.

Note that the technology disclosed in the present specification can have configurations as the ones described later.

(1) An information processing apparatus including:

a data processing section that generates driving zone display data that allows identification of at least an automated driving allowed zone and a manual driving zone on a driving route of a vehicle, in which the data processing section generates one piece of driving zone display data that is generated by linking plural pieces of display data having different time axes according to driving scheduled time periods of the vehicle.

(2) The information processing apparatus according to (1), in which the data processing section is configured to generate time linear display data along a first time axis representing time (t) and a display position (h) in a proportional relation for a proximate zone whose driving scheduled time period of the vehicle comes early, and generate time linear display data along a second time axis representing time (t) and a display position (h) in a proportional relation for a remote zone whose driving scheduled time period of the vehicle comes late, and the data processing section generates display data in which a distance per unit display length of display data of the remote zone is made longer than a distance per unit display length of display data of the proximate zone.

(3) The information processing apparatus according to (2), in which the data processing section generates one piece of driving zone display data in which an intermediate-distance zone is set between the proximate zone and the remote zone, and display data of the intermediate-distance zone includes display data having a time axis that changes gradually at a predetermined rate from the first time axis corresponding to the proximate zone to the second time axis corresponding to the remote zone.

(4) The information processing apparatus according to any one of (1) to (3), in which the data processing section generates driving zone display data in which a display width (W) of the proximate zone whose driving scheduled time period of the vehicle comes early is set wider than a display width (W) of the remote zone whose driving scheduled time period of the vehicle comes late.

(5) The information processing apparatus according to (4), in which the data processing section generates display data in which a display width (W) of an intermediate-distance zone between the proximate zone and the remote zone is made identical to the width of the proximate zone, at a section connected with the proximate zone, is reduced along with an increase of a distance, and is made identical to the width of the remote zone, at a section connected with the remote zone.

(6) The information processing apparatus according to any one of (1) to (5), in which the data processing section generates driving zone display data including an automated driving allowed zone Sa, a manual driving zone Sb, a zone Sc for transfer from automated driving to manual driving, and a careful driving zone Sd.

(7) The information processing apparatus according to any one of (1) to (6), in which the data processing section generates straight driving zone display data extending in one direction according to the driving scheduled time periods of the vehicle.

(8) The information processing apparatus according to any one of (1) to (6), in which the data processing section generates circular driving zone display data circumferentially extending according to the driving scheduled time periods of the vehicle.

(9) The information processing apparatus according to any one of (1) to (6), in which the data processing section generates driving zone display data that lies along a display-section surrounding-section area.

(10) The information processing apparatus according to any one of (1) to (9), in which the data processing section generates display data generated by adding additional information to the driving zone display data.

(11) The information processing apparatus according to (10), in which the additional information includes at least any one of bypass route information, sign information, and information regarding a time of arrival at each point.

(12) The information processing apparatus according to (10) or (11), in which the additional information includes information representing an MRM (Minimum Risk Maneuver) start point that is a start point of a risk avoidance process.

(13) The information processing apparatus according to any one of (1) to (12), in which the data processing section generates animation information that allows recognition of a length of time that is left until a return-to-manual-driving request notification or until a manual driving zone.

(14) The information processing apparatus according to (13), in which the animation information includes an animation that changes to cover a secondary task execution screen area used by a user, as time passes.

(15) A moving apparatus that is capable of being switched between automated driving and manual driving, the moving apparatus including:

a driver information acquiring section that acquires driver information of a driver of the moving apparatus;

an environment information acquiring section that acquires surrounding environment information of the moving apparatus; and a data processing section that generates driving zone display data that allows identification of at least an automated driving allowed zone and a manual driving zone on a driving route of a vehicle, in which the data processing section generates one piece of driving zone display data that is driving zone display data that allows identification of at least an automated driving allowed zone and a manual driving zone on the driving route of the vehicle and that is generated by linking plural pieces of display data having different time axes according to driving scheduled time periods of the vehicle.

(16) The moving apparatus according to (15), in which the data processing section is configured to generate time linear display data along a first time axis representing time (t) and a display position (h) in a proportional relation for a proximate zone whose driving scheduled time period of the vehicle comes early, and generate time linear display data along a second time axis representing time (t) and a display position (h) in a proportional relation for a remote zone whose driving scheduled time period of the vehicle comes late, and the data processing section generates display data in which a distance per unit display length of display data of the remote zone is made longer than a distance per unit display length of display data of the proximate zone.

(17) The moving apparatus according to (16), in which the data processing section generates one piece of driving zone display data in which an intermediate-distance zone is set between the proximate zone and the remote zone, and display data of the intermediate-distance zone includes display data having a time axis that changes gradually at a predetermined rate from the first time axis corresponding to the proximate zone to the second time axis corresponding to the remote zone.

(18) An information processing method executed in an information processing apparatus, in which a data processing section generates one piece of driving zone display data that is driving zone display data that allows identification of at least an automated driving allowed zone and a manual driving zone on a driving route of a vehicle and that is generated by linking plural pieces of display data having different time axes according to driving scheduled time periods of the vehicle.

(19) An information processing method executed in a moving apparatus, in which the moving apparatus is a moving apparatus that is capable of being switched between automated driving and manual driving, the information processing method includes a driver-information acquisition step, performed by a driver information acquiring section, of acquiring driver information of a driver of the moving apparatus, and an environment information acquisition step, performed by an environment information acquiring section, of acquiring surrounding environment information of the moving apparatus, and a data processing section generates one piece of driving zone display data that is driving zone display data that allows identification of at least an automated driving allowed zone and a manual driving zone on a driving route of a vehicle and that is generated by linking plural pieces of display data having different time axes according to driving scheduled time periods of the vehicle.

(20) A program that causes information processing to be executed in an information processing apparatus, in which a data processing section is caused to generate one piece of driving zone display data that is driving zone display data that allows identification of at least an automated driving allowed zone and a manual driving zone on a driving route of a vehicle and that is generated by linking plural pieces of display data having different time axes according to driving scheduled time periods of the vehicle.

In addition, the series of processes explained in the specification can be executed by hardware, software, or a combined configuration of hardware and software. In a case where the processes are executed by software, a program in which a process sequence is recorded can be installed into a memory in a computer incorporated into dedicated hardware and can be executed thereon, or the program can be installed on a general-purpose computer that can execute various types of processes and can be executed thereon. For example, the program can be recorded in advance on a recording medium. Other than being installed on a computer from the recording medium, the program can be received via a network such as a LAN (Local Area Network) or the Internet and installed on a built-in recording medium such as a hard disk.

Note that various types of processes described in the specification may not only be executed in a temporal sequence according to the descriptions, but also be executed in parallel or separately as necessary or according to the processing capability of an apparatus to execute the processes. In addition, a system in the present specification has a logical collective configuration of plural apparatuses and is not limited to one that includes apparatuses of configurations that are housed within a single housing.

INDUSTRIAL APPLICABILITY

As explained thus far, the configuration of one embodiment according to the present disclosure realizes a configuration that generates driving zone display data that allows identification of at least an automated driving allowed zone and a manual driving zone on a driving route of a vehicle and that presents the driving zone display data to a user (driver).

Specifically, for example, a data processing section that generates driving zone display data that allows identification of at least an automated driving allowed zone and a manual driving zone on a driving route of a vehicle is included. The data processing section generates time linear display data representing time (t) and a display position (h) in a proportional relation for a proximate zone and a remote zone. The data processing section generates display data in which a distance per unit display length of the remote zone is made longer than a distance per unit display length of the proximate zone. Regarding an intermediate-distance zone between the proximate zone and the remote zone, the data processing section generates display data having a time axis that changes gradually at a predetermined rate from the first time axis corresponding to the proximate zone to a second time axis corresponding to the remote zone. Furthermore, by also displaying information including penalties to be risk factors as appropriate along with the approach information, a driver naturally learns to be careful to avoid risks and be mindful of checking; as a result, high carefulness maintenance and consciousness recovery that are necessary for a return to manual driving by a vehicle user in an automated driving mode according to a driving situation are expected.

This configuration realizes a configuration that generates driving zone display data that allows identification of at least an automated driving allowed zone and a manual driving zone on a driving route of a vehicle and that presents the driving zone display data to a user (driver).

REFERENCE SIGNS LIST

10: Automobile
11: Data processing section
12: Driver information acquiring section
13: Environment information acquiring section
14: Communication section
15: Notifying section
20: Driver
30: Server
50: Information terminal
70: Driving zone display data
80: Animation information
100: Moving apparatus
101: Input section
102: Data acquiring section
103: Communication section
104: Vehicle interior equipment
105: Output control section
106: Output section
107: Drive-system control section
108: Drive system
109: Body-system control section
110: Body system
111: Storage section
112: Automated-driving control section
121: Communication network
131: Detecting section
132: Current-position estimating section
133: Situation analyzing section
134: Planning section
135: Operation control section
141: Vehicle-exterior-information detecting section
142: Vehicle-interior-information detecting section 143: Vehicle-state detecting section
151: Map analyzing section
152: Traffic-rule recognizing section
153: Situation recognizing section
154: Situation predicting section
155: Safety identifying section
161: Route planning section
162: Action planning section
163: Operation planning section
171: Emergency avoiding section
172: Acceleration/deceleration control section
173: Direction control section
501: CPU
502: ROM
503: RAM
504: Bus
505: Input/output interface
506: Input section
507: Output section
508: Storage section
509: Communication section
510: Drive
511: Removable medium
521: Sensor
522: Drive section

The invention claimed is:

1. An information processing apparatus comprising:
a data processing section that generates driving zone display data that allows identification of at least an automated driving allowed zone and a manual driving zone on a driving route of a vehicle, wherein
the data processing section generates time linear display data along a first time axis representing time (t) and a display position (h) in a proportional relation for a proximate zone whose driving scheduled time period of the vehicle comes early, generates time linear display data along a second time axis representing time (t) and a display position (h) in a proportional relation for a remote zone whose driving scheduled time period of the vehicle comes late, generates display data in which a distance per unit display length of display data of the remote zone is made longer than a distance per unit display length of display data of the proximate zone, generates one piece of driving zone display data in which an intermediate-distance zone is set between the proximate zone and the remote zone, and display data of the intermediate-distance zone includes display data having a time axis that changes gradually at a predetermined rate from the first time axis corresponding to the proximate zone to the second time axis corresponding to the remote zone, receives an indication of a level of alertness of a driver, receives an indication of an overall medical condition of a driver, receives information regarding a position of the driver in a driver's seat, receives information regarding a location of the driver in the vehicle, determines a notification time of a scheduled transition from the automated driving allowed zone to the manual driving zone based on the position of the driver and the level of alertness of the driver, generates a notification to the driver at the notification time of the scheduled transition from the automated driving allowed zone to the manual driving zone wherein the notification time before the scheduled transition is longer if the level of alertness of the driver is lower and the notification time before the scheduled transition is shorter if the level of alertness of the driver is higher, and generates an emergency pull-over and stop in the event of driver or vehicle abnormalities.

2. The information processing apparatus according to claim 1, wherein
the data processing section generates driving zone display data in which a display width (W) of a proximate zone whose driving scheduled time period of the vehicle comes early is set wider than a display width (W) of a remote zone whose driving scheduled time period of the vehicle comes late.

3. The information processing apparatus according to claim 2, wherein
the data processing section generates display data in which a display width (W) of an intermediate-distance zone between the proximate zone and the remote zone is made identical to a width of the proximate zone, at a section connected with the proximate zone, is reduced along with an increase of a distance, and is made identical to a width of the remote zone, at a section connected with the remote zone.

4. The information processing apparatus according to claim 1, wherein
the data processing section generates driving zone display data including an automated driving allowed zone Sa, a manual driving zone Sb, a zone Sc for transfer from automated driving to manual driving, and a careful driving zone Sd.

5. The information processing apparatus according to claim 1, wherein
the data processing section generates straight driving zone display data extending in one direction according to the driving scheduled time periods of the vehicle.

6. The information processing apparatus according to claim 1, wherein
the data processing section generates circular driving zone display data circumferentially extending according to the driving scheduled time periods of the vehicle.

7. The information processing apparatus according to claim 1, wherein
the data processing section generates driving zone display data that lies along a display-section surrounding-section area.

8. The information processing apparatus according to claim 1, wherein
the data processing section generates display data generated by adding additional information to the driving zone display data.

9. The information processing apparatus according to claim 8, wherein
the additional information includes at least any one of bypass route information, sign information, and information regarding a time of arrival at each point.

10. The information processing apparatus according to claim 8, wherein
the additional information includes information representing an MRM (Minimum Risk Maneuver) start point that is a start point of a risk avoidance process.

11. The information processing apparatus according to claim 1, wherein
the data processing section generates animation information that allows recognition of a length of time that is left until a return-to-manual-driving request notification or until a manual driving zone.

12. The information processing apparatus according to claim 11, wherein the animation information includes an animation that changes to cover a secondary task execution screen area used by a user, as time passes.

13. A moving apparatus that is capable of being switched between automated driving and manual driving, the moving apparatus comprising:
a driver information acquiring section that acquires driver information of a driver of the moving apparatus;
an environment information acquiring section that acquires surrounding environment information of the moving apparatus; and
a data processing section that generates driving zone display data that allows identification of at least an automated driving allowed zone and a manual driving zone on a driving route of a vehicle, wherein
the data processing section time linear display data along a first time axis representing time (t) and a display position (h) in a proportional relation for a proximate zone whose driving scheduled time period of the vehicle comes early, generates time linear display data along a second time axis representing time (t) and a display position (h) in a proportional relation for a remote zone whose driving scheduled time period of the vehicle comes late, generates display data in which a distance per unit display length of display data of the remote zone is made longer than a distance per unit display length of display data of the proximate zone, generates one piece of driving zone display data in which an intermediate-distance zone is set between the proximate zone and the remote zone, and display data of the intermediate-distance zone includes display data having a time axis that changes gradually at a predetermined rate from the first time axis corresponding to the proximate zone to the second time axis corresponding to the remote zone, receives an indication of a level of alertness of a driver, receives an indication of an overall medical condition of a driver, receives information regarding a position of the driver in a driver's seat, receives information regarding a location of the driver in the vehicle, determines a notification time of a scheduled transition from the automated driving allowed zone to the manual driving zone based on the position of the driver and the level of alertness of the driver, generates a notification to the driver at the notification time of the scheduled transition from the automated driving allowed zone to the manual driving zone wherein the notification time before the scheduled transition is longer if the level of alertness of the driver is lower and the notification time before the scheduled transition is shorter if the level of alertness of the driver is higher, and generates an emergency pull-over and stop in the event of driver or vehicle abnormalities.

14. An information processing method executed in an information processing apparatus, wherein
a data processing section generates one piece of driving zone display data that is driving zone display data that allows identification of at least an automated driving allowed zone and a manual driving zone on a driving route of a vehicle and that is generated by time linear display data along a first time axis representing time (t) and a display position (h) in a proportional relation for a proximate zone whose driving scheduled time period of the vehicle comes early, generates time linear display data along a second time axis representing time (t) and a display position (h) in a proportional relation for a remote zone whose driving scheduled time period of the vehicle comes late, generates display data in which a distance per unit display length of display data of the remote zone is made longer than a distance per unit display length of display data of the proximate zone, generates one piece of driving zone display data in which an intermediate-distance zone is set between the proximate zone and the remote zone, and display data of the intermediate-distance zone includes display data having a time axis that changes gradually at a predetermined rate from the first time axis corresponding to the proximate zone to the second time axis corresponding to the remote zone, receives an indication of a level of alertness of a driver, receives an indication of an overall medical condition of a driver, receives information regarding a position of the driver in a driver's seat, receives information regarding a location of the driver in the vehicle, determines a notification time of a scheduled transition from the automated driving allowed zone to the manual driving zone based on the position of the driver and the level of alertness of the driver, generates a notification to the driver at the notification time of the scheduled transition from the automated driving allowed zone to the manual driving zone wherein the notification time before the scheduled transition is longer if the level of alertness of the driver is lower and the notification time before the scheduled transition is shorter if the level of alertness of the driver is higher, and generates an emergency pull-over and stop in the event of driver or vehicle abnormalities.

15. An information processing method executed in a moving apparatus, wherein
the moving apparatus is a moving apparatus that is capable of being switched between automated driving and manual driving,
the information processing method includes
a driver-information acquisition step, performed by a driver information acquiring section, of acquiring driver information of a driver of the moving apparatus, and
an environment information acquisition step, performed by an environment information acquiring section, of acquiring surrounding environment information of the moving apparatus, and
a data processing section generates one piece of driving zone display data that is generated by linking plural pieces of display data having different time axes according to driving scheduled time periods of the vehicle, generates time linear display data along a first time axis representing time (t) and a display position (h) in a proportional relation for a proximate zone whose driving scheduled time period of the vehicle comes early, generates time linear display data along a second time axis representing time (t) and a display position (h) in a proportional relation for a remote zone whose driving scheduled time period of the vehicle comes late, generates display data in which a distance per unit display length of display data of the remote zone is made longer than a distance per unit display length of display data of the proximate zone, generates one piece of driving zone display data in which an intermediate-distance zone is set between the proximate zone and the remote zone, and display data of the intermediate-distance zone includes display data having a time axis that changes gradually at a predetermined rate from the first time axis corresponding to the proximate zone to the second time axis corresponding to the remote zone, receives an indication of a level of alertness of a driver, receives an indication of an overall medical condition of a driver, receives information regarding a position of the driver in a driver's seat, receives information regarding a location of the driver in the vehicle, determines a notification time of a scheduled transition from the automated driving allowed zone to the manual driving zone based on the position of the driver and the level of alertness of the driver, generates a notification to the driver at the notification time of the scheduled transition from the automated driving allowed zone to the manual driving zone wherein the notification time before the scheduled transition is longer if the level of alertness of the driver is lower and the notification time before the scheduled transition is shorter if the level of alertness of the driver is higher, and generates an emergency pull-over and stop in the event of driver or vehicle abnormalities.

16. A non-transitory computer readable storage medium having computer readable instructions stored thereon that, when executed by an information processing apparatus, perform the steps of;
 (a) generating one piece of driving zone display data that is generated by linking plural pieces of display data having different time axes according to driving scheduled time periods of the vehicle,
 (b) generating a time linear display data along a first time axis representing time (t) and a display position (h) in a proportional relation for a proximate zone whose driving scheduled time period of the vehicle comes early, generates time linear display data along a second time axis representing time (t) and a display position (h) in a proportional relation for a remote zone whose driving scheduled time period of the vehicle comes late, generates display data in which a distance per unit display length of display data of the remote zone is made longer than a distance per unit display length of display data of the proximate zone, generates one piece of driving zone display data in which an intermediate-distance zone is set between the proximate zone and the remote zone, and display data of the intermediate-distance zone includes display data having a time axis that changes gradually at a predetermined rate from the first time axis corresponding to the proximate zone to the second time axis corresponding to the remote zone;
 (c) receiving an indication of a level of alertness of a driver;
 (d) receiving an indication of an overall medical condition of a driver;
 (e) receiving information regarding a position of the driver in a driver's seat;
 (f) receiving information regarding a location of the driver in the vehicle;
 (g) determining a notification time of a scheduled transition from the automated driving allowed zone to the manual driving zone based on the position of the driver and the level of alertness of the driver;
 (h) generating a notification to the driver at the notification time of the scheduled transition from the automated driving allowed zone to the manual driving zone wherein the notification time before the scheduled transition is longer if the level of alertness of the driver is lower and the notification time before the scheduled transition is shorter if the level of alertness of the driver is higher; and
 (i) generating an emergency pull-over and stop in the event of driver or vehicle abnormalities.

* * * * *